US010647797B2

(12) United States Patent
Fontaine et al.

(10) Patent No.: US 10,647,797 B2
(45) Date of Patent: May 12, 2020

(54) POLYMERIZATION PROCESS FOR PRODUCING ETHYLENE BASED POLYMERS

(71) Applicant: Dow Global Technologies LLC, Midland, MI (US)

(72) Inventors: Philip P. Fontaine, Lake Jackson, TX (US); Andrew Young, Lake Jackson, TX (US); Susan Brown, Lake Jackson, TX (US); Hien Do, Lake Jackson, TX (US); Johnathan DeLorbe, Lake Jackson, TX (US); Tulaza Vaidya, Lake Jackson, TX (US); Chunming Zhang, Midland, MI (US); Arvind Jaganathan, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 45 days.

(21) Appl. No.: 15/763,937

(22) PCT Filed: Sep. 28, 2016

(86) PCT No.: PCT/US2016/054088
§ 371 (c)(1),
(2) Date: Mar. 28, 2018

(87) PCT Pub. No.: WO2017/058858
PCT Pub. Date: Apr. 6, 2017

(65) Prior Publication Data
US 2018/0282452 A1 Oct. 4, 2018

Related U.S. Application Data

(60) Provisional application No. 62/234,910, filed on Sep. 30, 2015.

(51) Int. Cl.
C08F 210/16 (2006.01)
C08F 4/659 (2006.01)

(52) U.S. Cl.
CPC ............ *C08F 210/16* (2013.01); *C08F 4/659* (2013.01); *C08F 4/65908* (2013.01); *C08F 4/65912* (2013.01)

(58) Field of Classification Search
None
See application file for complete search history.

(56) References Cited

U.S. PATENT DOCUMENTS

| 5,064,802 | A | 11/1991 | Stevens et al. |
| 5,153,157 | A | 10/1992 | Hlatky et al. |
| 5,296,433 | A | 3/1994 | Siedle et al. |
| 5,321,106 | A | 6/1994 | Lapointe |
| 5,350,723 | A | 9/1994 | Neithamer et al. |
| 5,425,872 | A | 6/1995 | Devore et al. |
| 5,625,087 | A | 4/1997 | Devore et al. |
| 5,721,185 | A | 2/1998 | Lapointe et al. |
| 5,783,512 | A | 7/1998 | Jacobsen et al. |
| 5,883,204 | A | 3/1999 | Spencer et al. |
| 5,919,983 | A | 7/1999 | Rosen et al. |
| 6,103,657 | A | 8/2000 | Murray |
| 6,515,155 | B1 | 2/2003 | Klosin et al. |
| 6,696,379 | B1 | 2/2004 | Carnahan et al. |
| 6,869,904 | B2 | 3/2005 | Boussie et al. |
| 7,060,848 | B2 | 6/2006 | Boussie et al. |
| 7,163,907 | B1 | 1/2007 | Canich et al. |
| 7,951,882 | B2 | 5/2011 | Arriola et al. |
| 8,609,794 | B2 | 12/2013 | Klosin et al. |
| 8,729,201 | B2 | 5/2014 | Fontaine et al. |
| 9,029,487 | B2 | 5/2015 | Klosin et al. |
| 9,102,819 | B2 | 8/2015 | Kapur et al. |
| 9,522,855 | B2 | 12/2016 | Klosin et al. |
| 9,527,940 | B2 | 12/2016 | Demirors et al. |
| 9,527,941 | B2 | 12/2016 | Demirors et al. |
| 9,601,230 | B2 | 3/2017 | Nair et al. |
| 9,601,231 | B2 | 3/2017 | Klosin et al. |
| 9,605,098 | B2 | 3/2017 | Klosin et al. |
| 9,643,900 | B2 | 5/2017 | Arriola et al. |
| 2004/0005984 | A1 | 1/2004 | Boussie et al. |
| 2011/0039082 | A1 | 2/2011 | Yun et al. |
| 2011/0082249 | A1 | 4/2011 | Shan et al. |
| 2011/0282018 | A1 | 11/2011 | Klosin et al. |
| 2014/0330056 | A1 | 11/2014 | Klosin et al. |
| 2014/0357918 | A1 | 12/2014 | Klosin et al. |
| 2015/0337062 | A1 | 11/2015 | Demirors et al. |
| 2015/0337063 | A1 | 11/2015 | Demirors et al. |
| 2015/0344601 | A1 | 12/2015 | Demirors et al. |
| 2015/0344602 | A1 | 12/2015 | Demirors et al. |
| 2018/0186910 | A1 | 7/2018 | Figueroa |
| 2018/0194871 | A1 | 7/2018 | Figueroa |

FOREIGN PATENT DOCUMENTS

| CN | 102712795 A | 10/2012 |
| GB | 1069848 A | 5/1967 |

(Continued)

OTHER PUBLICATIONS

Office Action dated Jun. 10, 2019 pertaining to U.S. Appl. No. 15/740,996, filed Dec. 29, 2017, 33 pgs.
Balke et al.., Chromatography of Polymers, Chapter 13, pp. 199-219 (1992).
Bonvonsombat et al., "Regioselective Iodination of Phenol and Analogues Using N-Iodosuccinimide and p-toluenesulfonic Acid", Tetrahedrom Letters, 2009, 50: 22, 2664-2667.
Chinese Office Action dated Aug. 22, 2016 pertaining to Chinese Application No. 201380067366.4.
Chinese Office Action dated Jan. 25, 2018 pertaining to Chinese Application No. 201380065868.3.

(Continued)

*Primary Examiner* — Catherine S Branch
(74) *Attorney, Agent, or Firm* — Dinsmore & Shohl LLP

(57) ABSTRACT

The disclosure provides a procatalyst for the polymerization of ethylene and optionally one or more alpha-olefins having the structure shown in formula (I) below: wherein at least two of $Y_1$-$Y_3$ and at least two of $Y_4$-$Y_6$ are fluorine atoms and when only two of $Y_1$-$Y_3$ and only two of $Y_4$-$Y_6$ are fluorine atoms, the non-fluorine $Y_1$-$Y_6$ are selected from the group consisting of H atom, alkyl groups, aryl groups, heteroaryl groups, and alkoxy groups. Also provided is a polymerization process using the procatalyst.

13 Claims, No Drawings

(56) References Cited

FOREIGN PATENT DOCUMENTS

| | | | |
|---|---|---|---|
| JP | 2000159829 A | 6/2000 | |
| JP | 2001525859 A | 12/2001 | |
| JP | 2005523921 A | 8/2005 | |
| JP | 2011525212 A | 9/2011 | |
| JP | 2013521382 A | 6/2013 | |
| JP | 2013534934 A | 9/2013 | |
| JP | 2013541631 A | 11/2013 | |
| JP | 2013544940 A | 12/2013 | |
| WO | 2007136494 A2 | 11/2007 | |
| WO | 2007136496 A2 | 11/2007 | |
| WO | 2010061630 A1 | 6/2010 | |
| WO | 2011025784 A1 | 3/2011 | |
| WO | 2011041696 A1 | 4/2011 | |
| WO | 2011109563 A2 | 9/2011 | |
| WO | 2011146044 A1 | 11/2011 | |
| WO | 2011146291 A1 | 11/2011 | |
| WO | 2012004683 A2 | 1/2012 | |
| WO | 2012027448 A1 | 3/2012 | |
| WO | 2012064630 A2 | 5/2012 | |
| WO | 2013101375 A1 | 7/2013 | |
| WO | 2014105411 A1 | 7/2014 | |
| WO | 2014105412 A1 | 7/2014 | |
| WO | 2014105413 A1 | 7/2014 | |
| WO | 2014209927 A1 | 12/2014 | |
| WO | 2015045928 A1 | 4/2015 | |
| WO | 2015045930 A1 | 4/2015 | |

OTHER PUBLICATIONS

Chinese Office Action dated May 15, 2017 pertaining to Chinese Application No. 201380067366.4.
Chinese Office Action dated May 3, 2017 pertaining to Chinese Application No. 201380065868.3.
Chinese Office Action dated Sep. 1, 2016 pertaining to Chinese Application No. 201380065868.3.
Chinese Office Action dated Nov. 1, 2017 pertaining to Chinese Application No. 201480033642.X.
Chinese Office Action pertaining to Chinese Patent Application No. 201380065667.3 dated Oct. 27, 2016.
Chinese Office Action pertaining to Chinese Patent Application No. 201380065848.6 dated Sep. 1, 2016.
Chinese Office Action pertaining to Chinese Patent Application No. 201380067367.9 dated May 11, 2017.
Chinese Office Action dated Aug. 19, 2016 pertaining to Chinese Patent Application No. 201380067367.9.
EP Communication Pursuant to Rules 161(1) and 162 EPC dated Aug. 4, 2015 for EPO Application No. 13811737.9.
EPO Communication pursuant to Rules 161(1) and 162 EPC dated Aug. 4, 2015 pertaining to European Patent Application No. 13811736.1.
EPO Communication pursuant to Rules 161(1) and 162 EPC dated Aug. 4, 2015 pertaining to European Patent Application No. 13812379.9.
European Search Report pertaining to European Patent Application Serial No. 14741484.1 dated Aug. 24, 2017.
Giorgio Soave, Chemical Engineering Science, 1972, vol. 27, pp. 1197-1203.
Han et al., "Synthesis of diindeno-Fused 4H-Cyclopenta[def]phenanthren-4-ones and Related Compounds via Benzannulated Enediynyl Propargylic Alcohols", J. Org. Chem., 2005, 70: 6, 2406-2408.
International Preliminary Report on Patentability pertaining to PCT/US2013/0073982 dated Jun. 30, 2015.
International Preliminary Report on Patentability pertaining to PCT/US2013/073976 dated Jun. 30, 2015.
International Preliminary Report on Patentability pertaining to PCT/US2013/073977 dated Mar. 18, 2014.
International Preliminary Report on Patentability pertaining to PCT/US2013/073979 dated Jul. 9, 2015.
International Preliminary Report on Patentability pertaining to PCT/US2013/073980 dated Jun. 30, 2015.
International Preliminary Report on Patentability pertaining to PCT/US2014/044374 dated Jan. 7, 2016.
International Preliminary Report on Patentability pertaining to PCT/US2016/040568 dated Jan. 2, 2018.
International Preliminary Report on Patentability pertaining to PCT/US2016/040577 dated Jan. 2, 2018.
International Preliminary Report on Patentability pertaining to PCT/US2016/054088 dated Apr. 3, 2018.
International Preliminary Report on Patentability pertaining to PCT/US2016/054285 dated Apr. 3, 2018.
International Search Report and Written Opinion pertaining to PCT/US2013/073976 dated Mar. 18, 2014.
International Search Report and Written Opinion pertaining to PCT/US2013/073977 dated Jul. 9, 2015.
International Search Report and Written Opinion pertaining to PCT/US2013/073979 dated Mar. 18, 2014.
International Search Report and Written Opinion pertaining to PCT/US2013/073980 dated Mar. 18, 2014.
International Search Report and Written Opinion pertaining to PCT/US2013/073982 dated Mar. 18, 2014.
International Search Report and Written Opinion pertaining to PCT/US2014/044374 dated Aug. 28, 2014.
International Search Report and Written Opinion pertaining to PCT/US2016/040568 dated Sep. 26, 2016.
International Search Report and Written Opinion pertaining to PCT/US2016/040577 dated Sep. 30, 2016.
International Search Report and Written Opinion pertaining to PCT/US2016/054088 dated Dec. 19, 2016.
International Search Report and Written Opinion pertaining to PCT/US2016/054285 dated Dec. 21, 2016.
Japanese Office Action pertaining to Japan Patent Application No. 2015-550433 dated Jan. 9, 2018.
Japanese Office Action pertaining to Japan Patent Application No. 2015-550434 dated Jan. 9, 2018.
Monrabal et al., Macromol. Symp. 2007, 257, 71-79.
Office Action pertaining to U.S. Appl. No. 15/357,931 dated Apr. 16, 2018.
Supplementary Examination Report pertaining to Singapore Patent Application No. 11201503581P dated Sep. 18, 2017.
Thomas H. Mourey and Stephen T. Balke, Chromatography of Polymers, Chapter 12, pp. 180-198, (1992).
Yau, Wallace W., "Examples of Using 3D-GPC-TREF for Polyolefin Characterization", Macromol. Symp., 2007, 257, 29-45.
Zimm, Bruno H., Journal of Chemical Physics, vol. 16, 12, 1099-1116 (1948).
Office Action Pertaining to U.S. Appl. No. 15/433,198, dated May 22, 2018, 7 pages.
Notice of Allowance pertaining to U.S. Appl. No. 15/357,901, dated May 16, 2018, 29 pages.
Notice of Allowance and Fee(s) Due dated Nov. 14, 2019 pertaining to U.S. Appl. No. 15/740,996, filed Dec. 29, 2017, 8 pgs.

POLYMERIZATION PROCESS FOR PRODUCING ETHYLENE BASED POLYMERS

FIELD OF INVENTION

The disclosure relates to a procatalyst for the polymerization of ethylene and optionally one or more alpha-olefins (α-olefins) and a polymerization process using the same.

BACKGROUND OF THE INVENTION

Olefin based polymers such as polyethylene and/or polypropylene are produced via various catalyst systems. Selection of such catalyst systems used in the polymerization process of the olefin based polymers is an important factor contributing to the characteristics and properties of such olefin based polymers.

Polyethylene is known for use in the manufacture of a wide variety of articles. The polyethylene polymerization process can be varied in a number of respects to produce a wide variety of resultant polyethylene resins having different physical properties that render the various resins suitable for use in different applications. It is generally known that polyethylene can be produced in one or more conventional reactors e.g. loop reactors, spherical reactors, isothermal reactors, fluidized bed gas phase reactors, stirred tank reactors, batch reactors, in parallel, series, and/or any combinations thereof. In solution phase reactors, the ethylene monomers and optionally one or more comonomers and catalyst system are present in a liquid diluent, such as an alkane or isoalkane, for example isobutane.

Despite the research efforts in developing catalyst systems suitable for polyolefin, such as polyethylene and/or polypropylene polymerization, there is still a need for a procatalyst and a catalyst system exhibiting an improved α-olefin response (i.e. lower reactivity ratio).

SUMMARY OF THE INVENTION

In one embodiment, the present disclosure provides a procatalyst for the polymerization of ethylene and optionally one or more alpha-olefins having the structure shown in formula (I) below:

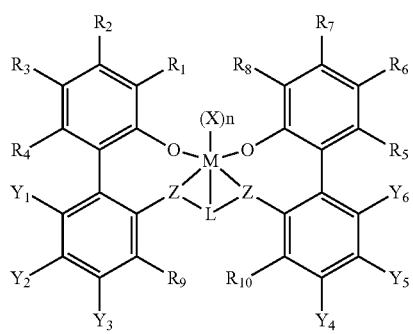

(I)

wherein:

M is titanium, zirconium, or hafnium, each independently being in a formal oxidation state of +2, +3, or +4; and n is an integer of from 0 to 3, and wherein when n is 0, X is absent; and each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (I) is, overall, neutral; and each Z independently is O, S, N($C_1$-$C_{40}$)hydrocarbyl, or P($C_1$-$C_{40}$)hydrocarbyl;

L is ($C_2$-$C_{40}$)hydrocarbylene or ($C_2$-$C_{40}$)heterohydrocarbylene, wherein the ($C_2$-$C_{40}$)hydrocarbylene has a portion that comprises a 2-carbon atom to 10-carbon atom linker backbone linking the Z atoms in formula (I) (to which L is bonded) and the ($C_2$-$C_{40}$)heterohydrocarbylene has a portion that comprises a 3-atom to 10-atom linker backbone linking the Z atoms in formula (I), wherein each of the 3 to 10 atoms of the 3-atom to 10-atom linker backbone of the ($C_2$-$C_{40}$)heterohydrocarbylene independently is a carbon atom or heteroatom, wherein each heteroatom independently is O, S, S(O), S(O)$_2$, Si($R^C$)$_2$, Ge($R^C$)$_2$, P($R^P$), or N($R^N$), wherein independently each $R^C$ is selected from the group consisting of ($C_1$-$C_{40}$)hydrocarbyl, each $R^P$ is ($C_1$-$C_{40}$) hydrocarbyl; and each $R^N$ is ($C_1$-$C_{40}$)hydrocarbyl or absent; and $R_{1-10}$ are each independently selected from the group consisting of a ($C_1$-$C_{40}$)hydrocarbyl, ($C_1$-$C_{40}$)heterohydrocarbyl, Si($R^C$)$_3$, Ge($R^C$)$_3$, P($R^P$)$_2$, N($R^N$)$_2$, $OR^C$, $SR^C$, NO$_2$, CN, CF$_3$, $R^C$S(O)—, $R^C$S(O)$_2$—, ($R^C$)$_2$C=N—, $R^C$C(O) O—, $R^C$OC(O)—, $R^C$C(O)N(R)—, ($R^C$)$_2$NC(O)—, halogen atom, hydrogen atom, and any combination thereof, and at least two of $Y_1$-$Y_3$ and at least two of $Y_4$-$Y_6$ are fluorine atoms and when only two of $Y_1$-$Y_3$ and only two of $Y_4$-$Y_6$ are fluorine atoms, the non-flourine $Y_1$-$Y_6$ are selected from the group consisting of H atom, alkyl groups, aryl groups, heteroaryl groups, and alkoxy groups; and each of the hydrocarbyl, heterohydrocarbyl, Si($R^C$)$_3$, Ge($R^C$)$_3$, P($R^P$)$_2$, N($R^N$)$_2$, $OR^C$, $SR^C$, $R^C$S(O)—, $R^C$S(O)$_2$—, ($R^C$)$_2$C=N—, $R^C$C(O)O—, $R^C$OC(O)—, $R^C$C (O)N(R)—, ($R^C$)$_2$NC(O)—, hydrocarbylene, and heterohydrocarbylene groups independently is unsubstituted or substituted with one or more $R^S$ substituents, each $R^S$ independently is a halogen atom, polyfluoro substitution, perfluoro substitution, unsubstituted ($C_1$-$C_{18}$)alkyl, F$_3$C—, FCH$_2$O—, F$_2$HCO—, F$_3$CO—, R$_3$Si—, R$_3$Ge—, RO—, RS—, RS(O)—, RS(O)$_2$—, R$_2$P—, R$_2$N—, R$_2$C=N—, NC—, RC(O)O—, ROC(O)—, RC(O)N(R)—, or R$_2$NC (O)—, or two of the $R^S$ are taken together to form an unsubstituted ($C_1$-$C_{18}$)hydrocarbylene wherein each R independently is an unsubstituted ($C_1$-$C_{18}$)hydrocarbyl; and optionally two or more R groups of the $R_{1-10}$ groups (for example, from $R_{1-4}$, $R_{5-8}$) can combine together into ring structures with such ring structures having from 2 to 50 atoms in the ring excluding any hydrogen atoms.

In another embodiment, the disclosure provides a polymerization process for producing ethylene based polymers comprising polymerizing ethylene and optionally one or more α-olefins in the presence of a catalyst system in a reactor system having one or more reactors, wherein the catalyst system comprises one or more inventive procatalysts.

DETAILED DESCRIPTION OF THE INVENTION

In a first embodiment, the disclosure provides a procatalyst for the polymerization of ethylene and optionally one or more alpha-olefins having the structure shown in formula (I) below:

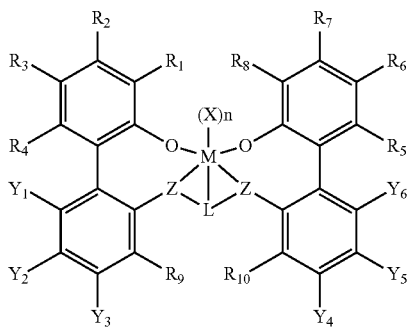

(I)

M is titanium, zirconium, or hafnium, each independently being in a formal oxidation state of +2, +3, or +4; and n is an integer of from 0 to 3, and wherein when n is 0, X is absent; and each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (I) is, overall, neutral; and each Z independently is O, S, N($C_1$-$C_{40}$)hydrocarbyl, or P($C_1$-$C_{40}$)hydrocarbyl;

L is ($C_2$-$C_{40}$)hydrocarbylene or ($C_2$-$C_{40}$)heterohydrocarbylene, wherein the ($C_2$-$C_{40}$)hydrocarbylene has a portion that comprises a 2-carbon atom to 10-carbon atom linker backbone linking the Z atoms in formula (I) (to which L is bonded) and the ($C_2$-$C_{40}$)heterohydrocarbylene has a portion that comprises a 3-atom to 10-atom linker backbone linking the Z atoms in formula (I), wherein each of the 3 to 10 atoms of the 3-atom to 10-atom linker backbone of the ($C_2$-$C_{40}$)heterohydrocarbylene independently is a carbon atom or heteroatom, wherein each heteroatom independently is O, S, S(O), S(O)$_2$, Si($R^C$)$_2$, Ge($R^C$)$_2$, P($R^P$), or N($R^N$), wherein independently each $R^C$ is selected from the group consisting of ($C_1$-$C_{40}$)hydrocarbyl. As used herein, the $R^C$ includes the situation wherein two $R^C$ groups are joined together to form a diradical ring in and wherein the Si is within the ring. Each $R^P$ is ($C_1$-$C_{40}$)hydrocarbyl; and each $R^N$ is ($C_1$-$C_{40}$)hydrocarbyl or absent; and $R_{1-10}$ are each independently selected from the group consisting of a ($C_1$-$C_{40}$)hydrocarbyl, ($C_1$-$C_{40}$)heterohydrocarbyl, Si($R^C$)$_3$, Ge($R^C$)$_3$, P($R^P$)$_2$, N($R^N$)$_2$, O$R^C$, S$R^C$, NO$_2$, CN, CF$_3$, $R^C$S(O)—, $R^C$S(O)$_2$—, ($R^C$)$_2$C=N—, $R^C$C(O)O—, $R^C$OC(O)—, $R^C$C(O)N(R)—, ($R^C$)$_2$NC(O)—, halogen atom, hydrogen atom, and any combination thereof, and at least two of $Y_1$-$Y_3$ and at least two of $Y_4$-$Y_6$ are fluorine atoms and when only two of $Y_1$-$Y_3$ and only two of $Y_4$-$Y_6$ are fluorine atoms, the non-flourine $Y_1$-$Y_6$ are selected from the group consisting of H atom, alkyl groups, aryl groups, heteroaryl groups, and alkoxy groups, and optionally two or more R groups of the $R_{1-10}$ groups (for example, from $R_{1-4}$, $R_{5-8}$) can combine together into ring structures with such ring structures having from 2 to 50 atoms in the ring excluding any hydrogen atoms.

As used herein, the term "($C_x$-$C_y$)hydrocarbyl" means a hydrocarbon radical of from x to y carbon atoms and the term "($C_x$-$C_y$)hydrocarbylene" means a hydrocarbon diradical of from x to y carbon atoms and the term "($C_x$-$C_y$)alkyl" means an alkyl group of from x to y carbon atoms and the term "($C_x$-$C_y$)cycloalkyl" means a cycloalkyl group of from x to y carbon atoms.

As used herein, the term "($C_1$-$C_{40}$)hydrocarbyl" means a hydrocarbon radical of from 1 to 40 carbon atoms and the term "($C_2$-$C_{40}$)hydrocarbylene" means a hydrocarbon diradical of from 2 to 40 carbon atoms, wherein each hydrocarbon radical and diradical independently is aromatic (6 carbon atoms or more) or non-aromatic, saturated or unsaturated, straight chain or branched chain, cyclic (including mono- and poly-cyclic, fused and non-fused polycyclic, including bicyclic; 3 carbon atoms or more) or acyclic, or a combination of two or more thereof; and each hydrocarbon radical and diradical independently is the same as or different from another hydrocarbon radical and diradical, respectively, and independently is unsubstituted or substituted by one or more $R^S$.

Preferably, a ($C_1$-$C_{40}$)hydrocarbyl independently is an unsubstituted or substituted ($C_1$-$C_{40}$)alkyl, ($C_3$-$C_{40}$)cycloalkyl, ($C_3$-$C_{20}$)cycloalkyl-($C_1$-$C_{20}$)alkylene, ($C_6$-$C_{40}$)aryl, or ($C_6$-$C_{20}$)aryl-($C_1$-$C_{20}$)alkylene. More preferably, each of the aforementioned ($C_1$-$C_{40}$)hydrocarbyl groups independently has a maximum of 20 carbon atoms (i.e., ($C_1$-$C_{20}$)hydrocarbyl), and still more preferably a maximum of 12 carbon atoms.

The terms "($C_1$-$C_{40}$)alkyl" and "($C_1$-$C_{18}$)alkyl" mean a saturated straight or branched hydrocarbon radical of from 1 to 40 carbon atoms or from 1 to 18 carbon atoms, respectively, that is unsubstituted or substituted by one or more $R^S$. Examples of unsubstituted ($C_1$-$C_{40}$)alkyl are unsubstituted ($C_1$-$C_{20}$)alkyl; unsubstituted ($C_1$-$C_{10}$)alkyl; unsubstituted ($C_1$-$C_5$)alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted ($C_1$-$C_{40}$)alkyl are substituted ($C_1$-$C_{20}$)alkyl, substituted ($C_1$-$C_{10}$)alkyl, trifluoromethyl, and ($C_{45}$)alkyl. The ($C_{45}$)alkyl is, for example, a ($C_{27}$-$C_{40}$)alkyl substituted by one $R^S$, which is a ($C_{18}$-$C_5$)alkyl, respectively. Preferably, each ($C_1$-$C_5$)alkyl independently is methyl, trifluoromethyl, ethyl, 1-propyl, 1-methylethyl, or 1,1-dimethylethyl.

The term "($C_6$-$C_{40}$)aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2 or 3 rings, respectively; wherein the 1 ring is aromatic and the 2 or 3 rings independently are fused or non-fused and at least one of the 2 or 3 rings is aromatic. Examples of unsubstituted ($C_6$-$C_{40}$)aryl are unsubstituted ($C_6$-$C_{20}$)aryl; unsubstituted ($C_6$-$C_{18}$)aryl; 2-($C_1$-$C_5$)alkyl-phenyl; 2,4-bis($C_1$-$C_5$)alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted ($C_6$-$C_{40}$)aryl are substituted ($C_6$-$C_{20}$)aryl; substituted ($C_6$-$C_{18}$)aryl; 2,4-bis[($C_{20}$)alkyl]-phenyl; polyfluorophenyl; pentafluorophenyl; and fluoren-9-one-1-yl.

The term "($C_3$-$C_{40}$)cycloalkyl" means a saturated cyclic hydrocarbon radical of from 3 to 40 carbon atoms that is unsubstituted or substituted by one or more $R^S$. Other cycloalkyl groups (e.g., ($C_3$-$C_{12}$)cycloalkyl)) are defined in an analogous manner. Examples of unsubstituted ($C_3$-$C_{40}$) cycloalkyl are unsubstituted ($C_3$-$C_{20}$)cycloalkyl, unsubstituted ($C_3$-$C_{10}$)cycloalkyl, cyclopropyl, cyclobutyl, cyclopentyl, cyclohexyl, cycloheptyl, cyclooctyl, cyclononyl, and cyclodecyl. Examples of substituted ($C_3$-$C_{40}$)cycloalkyl are substituted ($C_3$-$C_{20}$)cycloalkyl, substituted ($C_3$-$C_{10}$)cycloalkyl, cyclopentanon-2-yl, and 1-fluorocyclohexyl.

Examples of ($C_1$-$C_{40}$)hydrocarbylene are unsubstituted or substituted ($C_6$-$C_{40}$)arylene, ($C_3$-$C_{40}$)cycloalkylene, and ($C_1$-$C_{40}$)alkylene (e.g., ($C_1$-$C_{20}$)alkylene). In some embodiments, the diradicals are on a same carbon atom (e.g., —$CH_2$—) or on adjacent carbon atoms (i.e., 1,2-diradicals), or are spaced apart by one, two, or more intervening carbon atoms (e.g., respective 1,3-diradicals, 1,4-diradicals, etc.). Preferred is a 1,2-, 1,3-, 1,4-, or an alpha,omega-diradical, and more preferably a 1,2-diradical. The alpha, omega-diradical is a diradical that has maximum carbon backbone spacing between the radical carbons. More preferred is a 1,2-diradical, 1,3-diradical, or 1,4-diradical version of ($C_6$-$C_{18}$)arylene, ($C_3$-$C_{20}$)cycloalkylene, or ($C_2$-$C_{20}$)alkylene.

The term "($C_3$-$C_{40}$)cycloalkylene" means a cyclic diradical (i.e., the radicals are on ring atoms) of from 3 to 40 carbon atoms that is unsubstituted or substituted by one or more $R^S$. Examples of unsubstituted ($C_3$-$C_{40}$)cycloalkylene are 1,3-cyclopropylene, 1,1-cyclopropylene, and 1,2-cyclohexylene. Examples of substituted ($C_3$-$C_{40}$)cycloalkylene are 2-oxo-1,3-cyclopropylene and 1,2-dimethyl-1,2-cyclohexylene.

The term "($C_1$-$C_{40}$)heterohydrocarbyl" means a heterohydrocarbon radical of from 1 to 40 carbon atoms and the term "($C_1$-$C_{40}$)heterohydrocarbylene" means a heterohydrocarbon diradical of from 1 to 40 carbon atoms, and each heterohydrocarbon independently has one or more heteroatoms O; S; S(O); $S(O)_2$; $Si(R^C)_2$; $Ge(R^C)_2$; $P(R^P)$; and $N(R^N)$, wherein independently each $R^C$ is unsubstituted ($C_1$-$C_{40}$)hydrocarbyl, each $R^P$ is unsubstituted ($C_1$-$C_{40}$)hydrocarbyl; and each $R^N$ is unsubstituted ($C_1$-$C_{40}$)hydrocarbyl or absent (e.g., absent when N comprises —N= or tri-carbon substituted N). The heterohydrocarbon radical and each of the heterohydrocarbon diradicals independently is on a carbon atom or heteroatom thereof, although preferably is on a carbon atom when bonded to a heteroatom in formula (I) or to a heteroatom of another heterohydrocarbyl or heterohydrocarbylene. Each ($C_1$-$C_{40}$)heterohydrocarbyl and ($C_1$-$C_{40}$)heterohydrocarbylene independently is unsubstituted or substituted (by one or more $R^S$), aromatic or non-aromatic, saturated or unsaturated, straight chain or branched chain, cyclic (including mono- and poly-cyclic, fused and non-fused polycyclic) or acyclic, or a combination of two or more thereof; and each is respectively the same as or different from another.

Preferably, the ($C_1$-$C_{40}$)heterohydrocarbyl independently is unsubstituted or substituted ($C_1$-$C_{40}$)heteroalkyl, ($C_1$-$C_{40}$)hydrocarbyl-O—, ($C_1$-$C_{40}$)hydrocarbyl-S—, ($C_1$-$C_{40}$)hydrocarbyl-S(O)—, ($C_1$-$C_{40}$)hydrocarbyl-S(O)$_2$—, ($C_1$-$C_{40}$)hydrocarbyl-Si($R^C$)$_2$—, ($C_1$-$C_{40}$)hydrocarbyl-Ge($R^C$)$_2$—, ($C_1$-$C_{40}$)hydrocarbyl-N($R^N$)—, ($C_1$-$C_{40}$)hydrocarbyl-P($R^P$)—, ($C_2$-$C_{40}$)heterocycloalkyl, ($C_2$-$C_{19}$)heterocycloalkyl-($C_1$-$C_{20}$)alkylene, ($C_3$-$C_{20}$)cycloalkyl-($C_1$-$C_{19}$)heteroalkylene, ($C_2$-$C_{19}$)heterocycloalkyl-($C_1$-$C_{20}$)heteroalkylene, ($C_1$-$C_{40}$)heteroaryl, ($C_1$-$C_{19}$)heteroaryl-($C_1$-$C_{20}$)alkylene, ($C_6$-$C_{20}$)aryl-($C_1$-$C_{19}$)heteroalkylene, or ($C_1$-$C_{19}$)heteroaryl-($C_1$-$C_{20}$)heteroalkylene. The term "($C_1$-$C_{40}$)heteroaryl" means an unsubstituted or substituted (by one or more $R^S$) mono-, bi- or tricyclic heteroaromatic hydrocarbon radical of from 1 to 40 total carbon atoms and from 1 to 4 heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., ($C_4$-$C_{12}$)heteroaryl) are defined in an analogous manner. The monocyclic heteroaromatic hydrocarbon radical is a 5-membered or 6-membered ring. The 5-membered ring has from 1 to 4 carbon atoms and from 4 to 1 heteroatoms, respectively, each heteroatom being O, S, N, or P, and preferably O, S, or N. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 4 or 5 carbon atoms and 2 or 1 heteroatoms, the heteroatoms being N or P, and preferably N. Examples of 6-membered ring heteroaromatic hydrocarbon radical are pyridine-2-yl; pyrimidin-2-yl; and pyrazin-2-yl. The bicyclic heteroaromatic hydrocarbon radical preferably is a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical preferably is a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,6,6-ring system is acrydin-9-yl.

In some embodiments the ($C_1$-$C_{40}$)heteroaryl is 2,7-disubstituted carbazolyl or 3,6-disubstituted carbazolyl or unsubstituted carbazoles, more preferably wherein each $R^S$ independently is phenyl, methyl, ethyl, isopropyl, or tertiary-butyl, still more preferably 2,7-di(tertiary-butyl)-carbazolyl, 3,6-di(tertiary-butyl)-carbazolyl, 2,7-di(tertiary-octyl)-carbazolyl, 3,6-di(tertiary-octyl)-carbazolyl, 2,7-diphenylcarbazolyl, 3,6-diphenylcarbazolyl, 2,7-bis(2,4,6-trimethylphenyl)-carbazolyl or 3,6-bis(2,4,6-trimethylphenyl)-carbazolyl.

The aforementioned heteroalkyl and heteroalkylene groups are saturated straight or branched chain radicals or diradicals, respectively, containing ($C_1$-$C_{40}$) carbon atoms, or fewer carbon atoms as the case may be, and one or more of the heteroatoms Si($R^C$)$_2$, Ge($R^C$)$_2$, P($R^P$), N($R^N$), N, O, S, S(O), and S(O)$_2$ as defined above, wherein each of the heteroalkyl and heteroalkylene groups independently are unsubstituted or substituted by one or more $R^S$.

Examples of unsubstituted ($C_2$-$C_{40}$)heterocycloalkyl are unsubstituted ($C_2$-$C_{20}$)heterocycloalkyl, unsubstituted ($C_2$-$C_{10}$)heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" means fluorine atom (F), chlorine atom (Cl), bromine atom (Br), or iodine atom (I) radical. Preferably each halogen atom independently is the Br, F, or Cl radical, and more preferably the F or Cl radical. The term "halide" means fluoride (F$^-$), chloride (Cl$^-$), bromide (Br$^-$), or iodide (I$^-$) anion.

Unless otherwise indicated herein the term "heteroatom" means O, S, S(O), S(O)$_2$, Si($R^C$)$_2$, Ge($R^C$)$_2$, P($R^P$), or N($R^N$), wherein independently each $R^C$ is unsubstituted ($C_1$-$C_{40}$)hydrocarbyl, each $R^P$ is unsubstituted ($C_1$-$C_{40}$)hydrocarbyl; and each $R^N$ is unsubstituted ($C_1$-$C_{40}$)hydrocarbyl or absent (absent when N comprises —N=). Preferably, there are no O—O, S—S, or O—S bonds, other than O—S bonds in an S(O) or S(O)$_2$ diradical functional group, in the metal-ligand complex of formula (I). More preferably, there are no O—O, N—N, P—P, N—P, S—S, or O—S bonds, other than O—S bonds in an S(O) or S(O)$_2$ diradical functional group, in the metal-ligand complex of formula (I).

Preferably, there are no O—O, S—S, or O—S bonds, other than O—S bonds in an S(O) or S(O)$_2$ diradical functional group, in the metal-ligand complex of formula (I). More preferably, there are no O—O, N—N, P—P, N—P, S—S, or O—S bonds, other than O—S bonds in an S(O) or S(O)$_2$ diradical functional group, in the metal-ligand complex of formula (I).

The term "saturated" means lacking carbon-carbon double bonds, carbon-carbon triple bonds, and (in heteroatom-containing groups) carbon-nitrogen, carbon-phosphorous, and carbon-silicon double or triple bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds or triple bonds, not including any such double bonds that may be present in substituents $R^S$, if any, or in (hetero)aromatic rings, if any.

M is titanium, zirconium, or hafnium. In one embodiment, M is zirconium or hafnium, and in another embodiment M is hafnium. In some embodiments, M is in a formal oxidation state of +2, +3, or +4. In some embodiments, n is 0, 1, 2, or 3. Each X independently is a monodentate ligand that is neutral, monoanionic, or dianionic; or two Xs are taken together to form a bidentate ligand that is neutral, monoanionic, or dianionic. X and n are chosen in such a way that the metal-ligand complex of formula (I) is, overall, neutral. In some embodiments each X independently is the monodentate ligand. In one embodiment when there are two or more X monodentate ligands, each X is the same. In some embodiments the monodentate ligand is the monoanionic ligand. The monoanionic ligand has a net formal oxidation state of −1. Each monoanionic ligand may independently be hydride, $(C_1-C_{40})$hydrocarbyl carbanion, $(C_1-C_{40})$heterohydrocarbyl carbanion, halide, nitrate, carbonate, phosphate, sulfate, HC(O)O$^-$, $(C_1-C_{40})$hydrocarbylC(O)O$^-$, HC(O)N(H)$^-$, $(C_1-C_{40})$hydrocarbylC(O)N(H)$^-$, $(C_1-C_{40})$hydrocarbylC(O)N(($C_1-C_{20}$)hydrocarbyl)$^-$, $R^KR^LB^-$, $R^KR^LN^-$, $R^KO^-$, $R^KS^-$, $R^KR^LP^-$, or $R^MR^KR^LSi^-$, wherein each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{40})$heterohydrocarbylene and $R^M$ is as defined above.

In some embodiments at least one monodentate ligand of X independently is the neutral ligand. In one embodiment, the neutral ligand is a neutral Lewis base group that is $R^XNR^KR^L$, $R^KOR^L$, $R^KSR^L$, or $R^XPR^KR^L$, wherein each $R^X$ independently is hydrogen, $(C_1-C_{40})$hydrocarbyl, $[(C_1-C_{10})$hydrocarbyl]$_3$Si, $[(C_1-C_{10})$hydrocarbyl]$_3$Si$(C_1-C_{10})$hydrocarbyl, or $(C_1-C_{40})$heterohydrocarbyl and each $R^K$ and $R^L$ independently is as defined above.

In some embodiments, each X is a monodentate ligand that independently is a halogen atom, unsubstituted $(C_1-C_{20})$hydrocarbyl, unsubstituted $(C_1-C_{20})$hydrocarbylC(O)O—, or $R^KR^LN$— wherein each of $R^K$ and $R^L$ independently is an unsubstituted $(C_1-C_{20})$hydrocarbyl. In some embodiments each monodentate ligand X is a chlorine atom, $(C_1-C_{10})$hydrocarbyl (e.g., $(C_1-C_6)$alkyl or benzyl), unsubstituted $(C_1-C_{10})$hydrocarbylC(O)O—, or $R^KR^LN$— wherein each of $R^K$ and $R^L$ independently is an unsubstituted $(C_1-C_{10})$hydrocarbyl.

In some embodiments there are at least two X and the two X are taken together to form the bidentate ligand. In some embodiments the bidentate ligand is a neutral bidentate ligand. In one embodiment, the neutral bidentate ligand is a diene of formula $(R^D)_2C=C(R^D)—C(R^D)=C(R^D)_2$, wherein each $R^D$ independently is H, unsubstituted $(C_1-C_6)$ alkyl, phenyl, or naphthyl. In some embodiments the bidentate ligand is a monoanionic-mono(Lewis base) ligand. The monoanionic-mono(Lewis base) ligand may be a 1,3-dionate of formula (D): $R^E—C(O^-)=CH—C(=O)—R^E$ (D), wherein each $R^D$ independently is H, unsubstituted $(C_1-C_6)$ alkyl, phenyl, or naphthyl. In some embodiments the bidentate ligand is a dianionic ligand. The dianionic ligand has a net formal oxidation state of −2. In one embodiment, each dianionic ligand independently is carbonate, oxalate (i.e., $^-O_2CC(O)O^-$), $(C_2-C_{40})$hydrocarbylene dicarbanion, $(C_1-C_{40})$heterohydrocarbylene dicarbanion, phosphate, or sulfate.

As previously mentioned, number and charge (neutral, monoanionic, dianionic) of X are selected depending on the formal oxidation state of M such that the metal-ligand complex of formula (I) is, overall, neutral.

In some embodiments each X is the same, wherein each X is methyl; ethyl; 1-propyl; 2-propyl; 1-butyl; 2,2,-dimethylpropyl; trimethylsilylmethyl; phenyl; benzyl; or chloro. In some embodiments n is 2 and each X is the same.

In some embodiments at least two X are different. In some embodiments n is 2 and each X is a different one of methyl; ethyl; 1-propyl; 2-propyl; 1-butyl; 2,2,-dimethylpropyl; trimethylsilylmethyl; phenyl; benzyl; and chloro.

The integer n indicates number of X. In one embodiment, n is 2 or 3 and at least two X independently are monoanionic monodentate ligands and a third X, if present, is a neutral monodentate ligand. In some embodiments n is 2 and two X are taken together to form a bidentate ligand. In some embodiments, the bidentate ligand is 2,2-dimethyl-2-silapropane-1,3-diyl or 1,3-butadiene.

Each Z independently is O, S, N$(C_1-C_{40})$hydrocarbyl, or P$(C_1-C_{40})$hydrocarbyl. In some embodiments each Z is different. In some embodiments one Z is O and one Z is NCH$_3$. In some embodiments one Z is O and one Z is S. In some embodiments one Z is S and one Z is N$(C_1-C_{40})$hydrocarbyl (e.g., NCH$_3$). In some embodiments each Z is the same. In some embodiments each Z is O. In some embodiments each Z is S. In some embodiments each Z is N$(C_1-C_{40})$hydrocarbyl (e.g., NCH$_3$). In some embodiments at least one, and in some embodiments each Z is P$(C_1-C_{40})$ hydrocarbyl (e.g., PCH$_3$).

L is $(C_2-C_{40})$hydrocarbylene or $(C_2-C_{40})$ heterohydrocarbylene, wherein the $(C_2-C_{40})$hydrocarbylene has a portion that comprises a 2-carbon atom to 10-carbon atom linker backbone linking the Z atoms in formula (I) (to which L is bonded) and the $(C_2-C_{40})$heterohydrocarbylene has a portion that comprises a 3-atom to 10-atom linker backbone linking the Z atoms in formula (I), wherein each of the from 3 to 10 atoms of the 3-atom to 10-atom linker backbone of the $(C_2-C_{40})$heterohydrocarbylene independently is a carbon atom or heteroatom, wherein each heteroatom independently is, O, S, S(O), S(O)$_2$, Si$(R^C)_2$, Ge$(R^C)_2$, P$(R^P)$, or N$(R^N)$, wherein independently each $R^C$ is $(C_1-C_{40})$hydrocarbyl, each $R^P$ is $(C_1-C_{40})$hydrocarbyl; and each $R^N$ is $(C_1-C_{40})$ hydrocarbyl or absent. For example, when L has three atoms, at least two of the atoms are carbon atoms and one atom is O or S.

In some embodiments L is the $(C_3-C_{40})$hydrocarbylene. Preferably the aforementioned portion that comprises a 3-carbon atom to 10-carbon atom linker backbone of the $(C_3-C_{40})$hydrocarbylene of L comprises a 3-carbon atom to 10-carbon atom, and more preferably a 3-carbon atom or 4-carbon atom linker backbone linking the Z atoms in formula (I) to which L is bonded. In some embodiments L comprises the 3-carbon atom linker backbone (e.g., L is —CH$_2$CH$_2$CH$_2$—; —CH(CH$_3$)CH$_2$CH(CH$_3$)—; —CH(CH$_3$)CH(CH$_3$)CH(CH$_3$)—; —CH$_2$C(CH$_3$)$_2$CH$_2$—); 1,3-cyclopentane-diyl; or 1,3-cyclohexane-diyl. In some embodiments L comprises the 4-carbon atom linker backbone (e.g., L is —CH$_2$CH$_2$CH$_2$CH$_2$—; —CH$_2$C(CH$_3$)$_2$C(CH$_3$)$_2$CH$_2$—; 1,2-bis(methylene)cyclohexane; or 2,3-bis(methylene)-bicyclco[2.2.2]octane). In some embodiments L comprises the 5-carbon atom linker backbone (e.g., L is —CH$_2$CH$_2$CH$_2$CH$_2$CH$_2$— or 1,3-bis(methylene)cyclohexane). In some embodiments L comprises the 6-carbon atom linker backbone (e.g., L is —CH$_2$CH$_2$CH$_2$CH$_2$CH$_2$CH$_2$— or 1,2-bis(ethylene)cyclohexane).

In some embodiments, L is the (C$_2$-C$_{40}$)hydrocarbylene and the (C$_2$-C$_{40}$)hydrocarbylene of L is a (C$_2$-C$_{12}$)hydrocarbylene, and more preferably (C$_2$-C$_8$)hydrocarbylene. In some embodiments, the (C$_2$-C$_{40}$)hydrocarbylene is an unsubstituted (C$_2$-C$_{40}$)alkylene. In some embodiments, the (C$_2$-C$_{40}$)hydrocarbylene is a substituted (C$_2$-C$_{40}$)alkylene. In some embodiments, the (C$_2$-C$_{40}$)hydrocarbylene is an unsubstituted (C$_2$-C$_{40}$)cycloalkylene or substituted (C$_2$-C$_{40}$)cycloalkylene, wherein each substituent independently is R$^S$, wherein preferably the R$^S$ independently is (C$_1$-C$_4$)alkyl.

In some embodiments L is an unsubstituted (C$_2$-C$_{40}$)alkylene, and in some other embodiments, L is an acyclic unsubstituted (C$_2$-C$_{40}$)alkylene, and still more preferably the acyclic unsubstituted (C$_2$-C$_{40}$)alkylene is, —CH$_2$CH$_2$CH$_2$—, cis —CH(CH$_3$)CH$_2$CH(CH$_3$)—, trans —CH(CH$_3$)CH$_2$CH(CH$_3$)—, —CH(CH$_3$)CH$_2$CH(CH$_3$)$_2$—, —CH(CH$_3$)CH(CH$_3$)CH(CH$_3$)—, —CH$_2$C(CH$_3$)$_2$CH$_2$—, —CH$_2$CH$_2$CH$_2$CH$_2$—, or —CH$_2$C(CH$_3$)$_2$C(CH$_3$)$_2$CH$_2$—. In some embodiments L is trans-1,2-bis(methylene)cyclopentane, cis-1,2-bis(methylene)cyclopentane, trans-1,2-bis(methylene)cyclohexane, or cis-1,2-bis(methylene)cyclohexane. In some embodiments, the (C$_1$-C$_{40}$)alkylene-substituted (C$_2$-C$_{40}$)alkylene is exo-2,3-bis(methylene)bicyclo[2.2.2]octane or exo-2,3-bis(methylene)-7,7-dimethyl-bicyclo[2.2.1]heptane. In some embodiments, L is the unsubstituted (C$_3$-C$_{40}$)cycloalkylene, and in some other embodiments, L is cis-1,3-cyclopentane-diyl or cis-1,3-cyclohexane-diyl. In some embodiments, L is the substituted (C$_2$-C$_{40}$)cycloalkylene, and more preferably L is a (C$_1$-C$_{40}$)alkylene-substituted (C$_2$-C$_{40}$)cycloalkylene, and in some other embodiments, L is the (C$_1$-C$_{40}$)alkylene-substituted (C$_2$-C$_{40}$)cycloalkylene that is exo-bicyclo[2.2.2]octan-2,3-diyl.

In some embodiments L is the (C$_2$-C$_{40}$)heterohydrocarbylene. In some embodiments, the aforementioned portion that comprises a 3-atom to 6-atom linker backbone of the (C$_2$-C$_{40}$)heterohydrocarbylene of L comprises a from 3-atom to 5-atom, and in some other embodiments a 3-atom or 4-atom linker backbone linking the Z atoms in formula (I) to which L is bonded. In some embodiments L comprises the 3-atom linker backbone (e.g., L is —CH$_2$CH$_2$CH(OCH$_3$)—, —CH$_2$Si(CH$_3$)$_2$CH$_2$—, or —CH$_2$Ge(CH$_3$)$_2$CH$_2$—). The "—CH$_2$Si(CH$_3$)$_2$CH$_2$—" may be referred to herein as a 1,3-diradical of 2,2-dimethyl-2-silapropane. In some embodiments L comprises the 4-atom linker backbone (e.g., L is —CH$_2$CH$_2$OCH$_2$— or —CH$_2$P(CH$_3$)CH$_2$CH$_2$—). In some embodiments L comprises the 5-atom linker backbone (e.g., L is —CH$_2$CH$_2$OCH$_2$CH$_2$— or —CH$_2$CH$_2$N(CH$_3$)CH$_2$CH$_2$—). In some embodiments L comprises the 6-atom linker backbone (e.g., L is —CH$_2$CH$_2$C(OCH$_3$)$_2$CH$_2$CH$_2$CH$_2$—, —CH$_2$CH$_2$CH$_2$S(O)$_2$CH$_2$CH$_2$—, or —CH$_2$CH$_2$S(O)CH$_2$CH$_2$CH$_2$—). In some embodiments, each of the from 3 to 6 atoms of the 3-atom to 6-atom linker backbone is a carbon atom. In some embodiments, at least one heteroatom is the Si(R$^C$)$_2$. In some embodiments, at least one heteroatom is the O. In some embodiments, at least one heteroatom is the N(R$^N$). In some embodiments, there are no O—O, S—S, or O—S bonds, other than O—S bonds in the S(O) or S(O)$_2$ diradical functional group, in —Z-L-Z—. In some other embodiments, there are no O—O, N—N, P—P, N—P, S—S, or O—S bonds, other than O—S bonds in an S(O) or S(O)$_2$ diradical functional group, in —Z-L-Z—. In some embodiments, the (C$_2$-C$_{40}$)heterohydrocarbylene is (C$_2$-C$_{10}$)heterohydrocarbylene, and in some other embodiments (C$_2$-C$_8$)heterohydrocarbylene. In some embodiments the (C$_2$-C$_8$)heterohydrocarbylene of L is —CH$_2$Si(CH$_3$)$_2$CH$_2$—; —CH$_2$CH$_2$Si(CH$_3$)$_2$CH$_2$—; or CH$_2$Si(CH$_3$)$_2$CH$_2$CH$_2$—. In some embodiments, the (C$_2$-C$_8$oms)heterohydrocarbylene of L is —CH$_2$Si(CH$_3$)$_2$CH$_2$—, —CH$_2$Si(CH$_2$CH$_3$)$_2$CH$_2$—, —CH$_2$Si(isopropyl)$_2$CH$_2$—, —CH$_2$Si(tetramethylene)CH$_2$—, or —CH$_2$Si(pentamethylene)CH$_2$—. The —CH$_2$Si(tetramethylene)CH$_2$— is named 1-silacyclopentan-1,1-dimethylene. The —CH$_2$Si(pentamethylene)CH$_2$— is named 1-silacyclohexan-1,1-dimethylene.

In some embodiments the metal-ligand complex of formula (I) is a metal-ligand complex of any one of the following formulas:

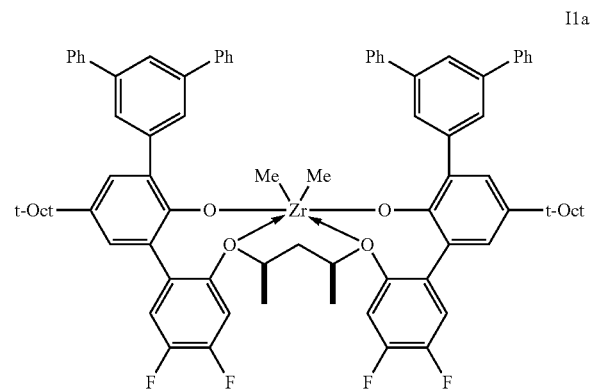

IIa

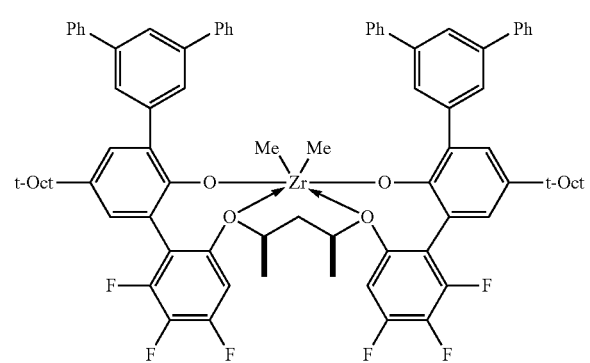

IIb

-continued
I2
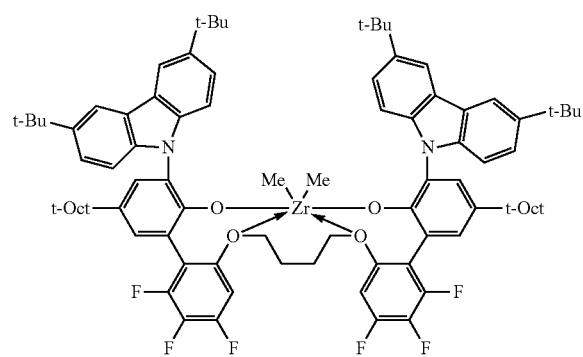
I3
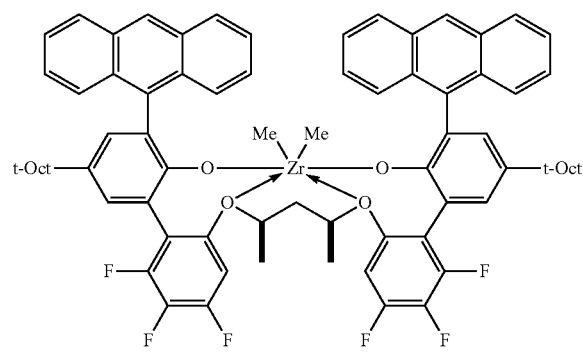
I4
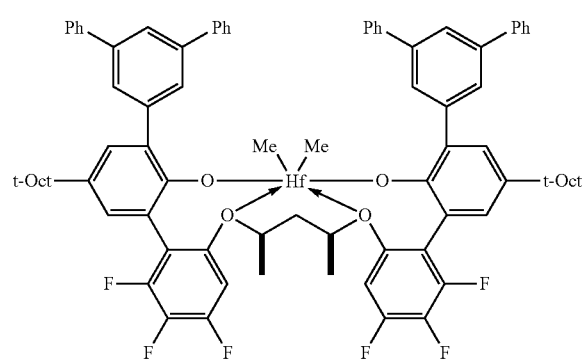
I5
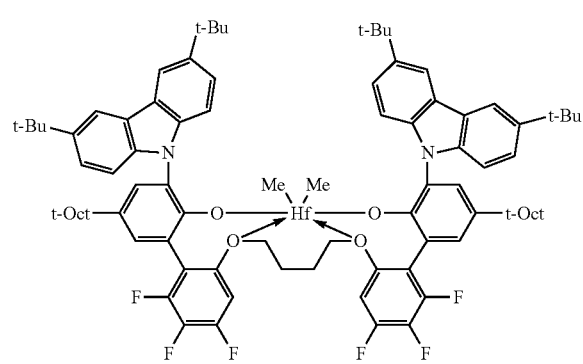
-continued
I6
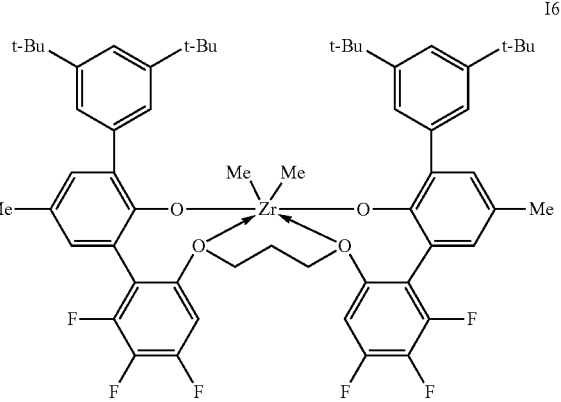
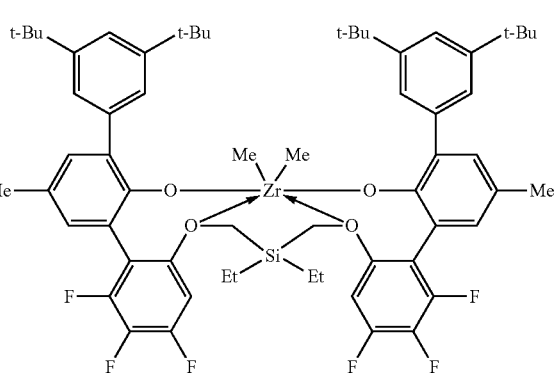
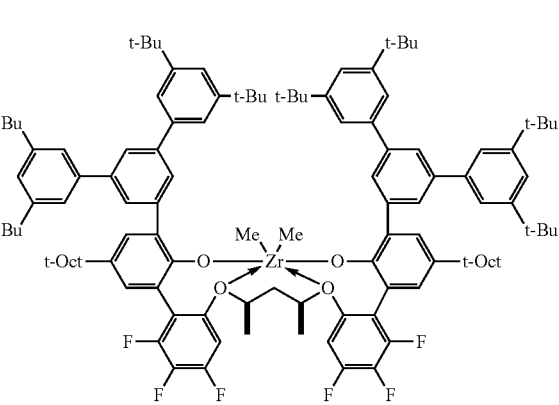
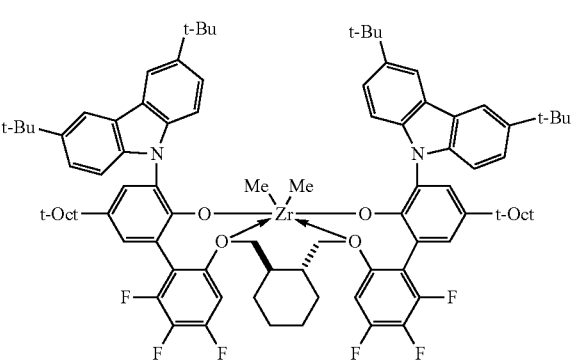

13
-continued
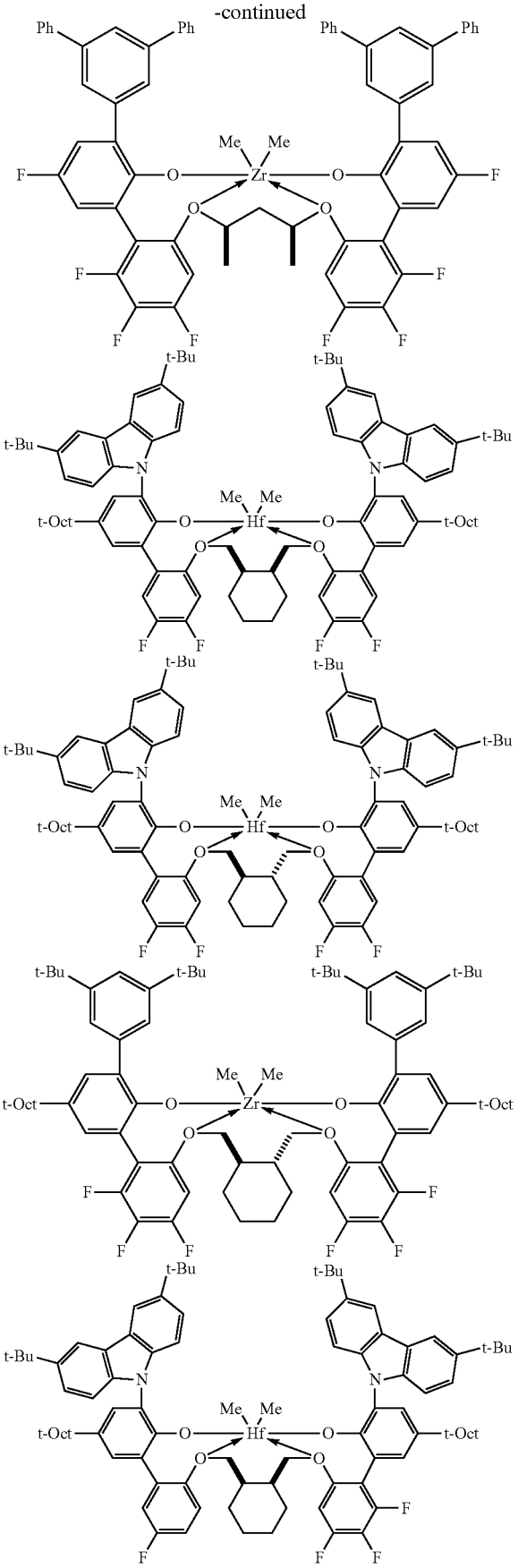
14
-continued
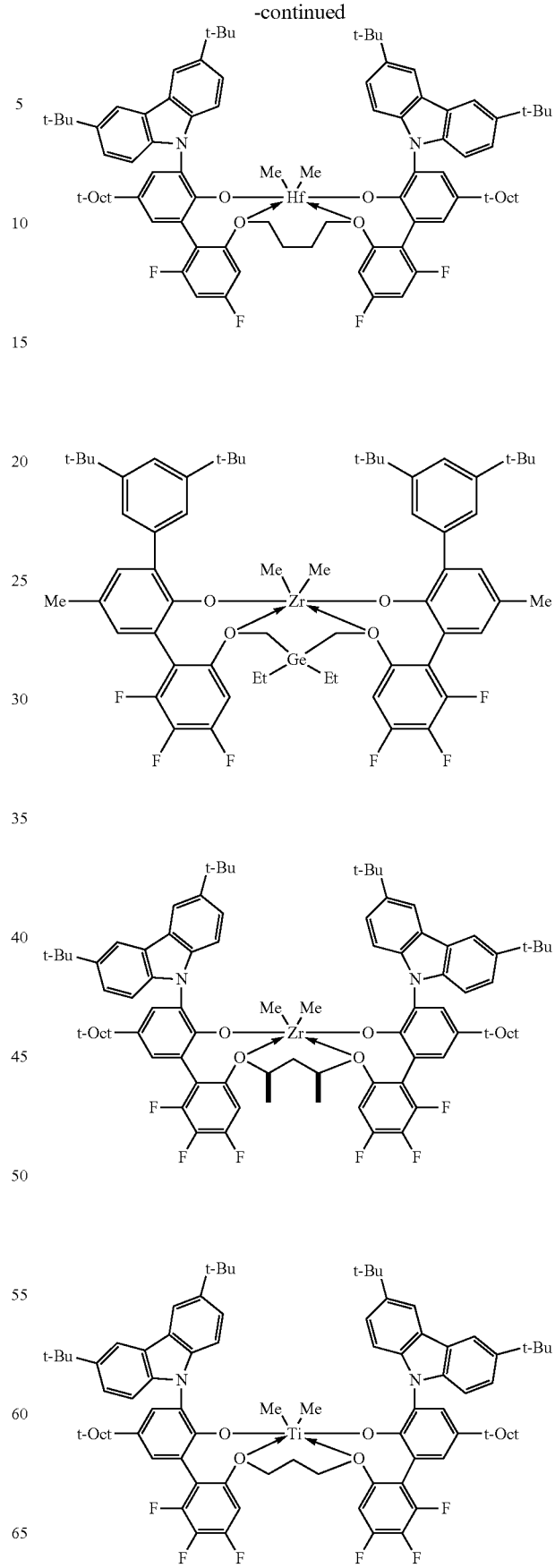

-continued

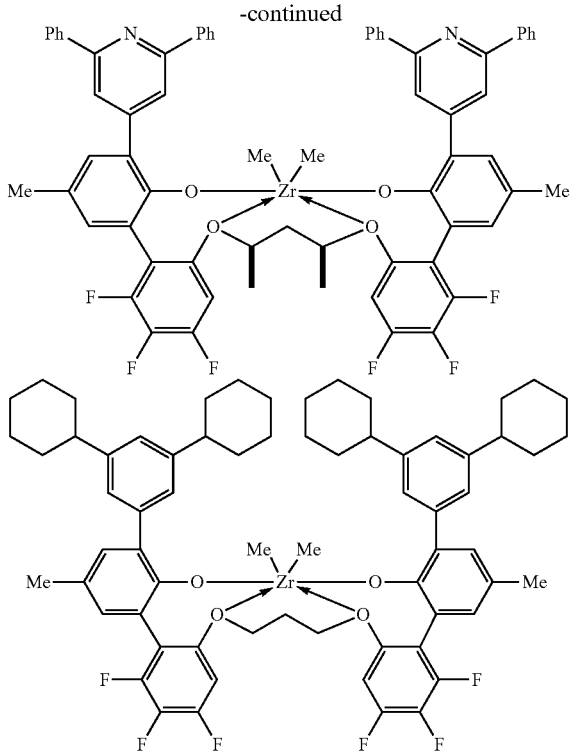

In some embodiments, the ligands of the invention may be prepared using known procedures. Specifically, the ligands of the invention may be prepared using a variety of synthetic routes, depending on the variation desired in the ligand. In general, building blocks are prepared that are then linked together with a bridging group. Variations in the R group substituents can be introduced in the synthesis of the building blocks.

Variations in the bridge can be introduced with the synthesis of the bridging group. Specific ligands within the scope of this invention may be prepared according to the general schemes shown below, where building blocks are first prepared and then coupled together. There are several different ways to use these building blocks. In one embodiment, generally, each of the optionally substituted phenyl rings is prepared as a separate building block. The desired optionally substituted phenyls are then combined into biphenyl building blocks, which are then bridged together. In another embodiment, the optionally substituted phenyl building blocks are bridged together and then additional optionally substituted phenyl building blocks are added to form the bridged bi-aryl structures. The starting materials or reagents used are generally commercially available, or are prepared via routine synthetic means, as described herein.

In the schemes below, the term ligand refers to the organic precursor to the pro-catalyst. The pro-catalyst is derived from a reaction of the ligand with a suitable metallic (titanium, zirconium, or hafnium) precursor. Common abbreviations are listed in the key system below.

PG: generic protecting group, common examples include:

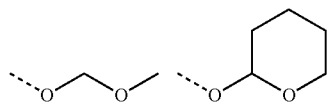

methoxymethyl ether (MOM) tetrahydropyranyl ether (THP)

R, L, M, Z, X: as defined above

Me: methyl; Et: ethyl; Ph: phenyl; i-Pr: iso-propyl; t-Bu: tert-butyl; t-Oct: tert-octyl;

Ts: toluene sulfonate; THF: tetrahydrofuran; $Et_2O$: diethyl ether; DMF: dimethylformamide;

$CH_2Cl_2$: dichloromethane; MeOH: methanol; $CH_3CN$: acetonitrile;

EtOAc: ethyl acetate; $C_6D_6$: deuterated benzene; $CDCl_3$: deuterated chloroform; DIAD: diisopropyl azodicarboxylate; $PPh_e$: triphenylphosphine; NaI: sodium iodide; NaOCl: sodium hypochlorite; $Na_2S_2O_3$: sodium thiosulfate; $NaHSO_3$: sodium bisulfite; CuI: copper(I) iodide; $SiO_2$: silica gel; NaOH: sodium hydroxide; $K_2CO_3$: potassium carbonate; $Na_2CO_3$: sodium carbonate; $K_3PO_4$: potassium phosphate tribasic; brine: saturated aqueous sodium chloride; $Na_2SO_4$: sodium sulfate; $MgSO_4$: magnesium sulfate; HCl: hydrogen chloride; sat. aq. $NH_4Cl$: saturated aqueous ammonium chloride; PTSA: para-toluene sulfonic acid; NIS: N-iodosuccinimide; $P_2O_5$: phosphorous pentoxide; $Pd(PPh_3)_4$: tetrakis(triphenylphosphine)palladium(O); $Pd(Pt-Bu_3)_2$: bis(tri-tert-butylphosphine)palladium(O); n-BuLi: n-butyllithium; $HfCl_4$: hafnium(IV) chloride; $ZrCl_4$: zirconium(IV) chloride; $N_2$: nitrogen gas;

GC: gas chromatography; LC: liquid chromatography; TLC: thin layer chromatography;

NMR: nuclear magnetic resonance; mmol: millimoles; mL: milliliters; M: molar; N: normal;

min: minutes; h: hours

Co-Catalyst Component

The procatalyst comprising the metal-ligand complex of formula (I) may be rendered catalytically active, in some embodiments, by contacting it to, or combining it with, the activating co-catalyst or by using an activating technique such as those that are known in the art for use with metal-based olefin polymerization reactions. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Aluminoxanes and their preparations are known at, for example, U.S. Pat. No. 6,103,657. Examples of preferred polymeric or oligomeric alumoxanes are methylalumoxane, triisobutylaluminum-modified methylalumoxane, and isobutylalumoxane.

Exemplary Lewis acid activating co-catalysts are Group 13 metal compounds containing from 1 to 3 hydrocarbyl substituents as described herein. In some embodiments, exemplary Group 13 metal compounds are tri(hydrocarbyl)-substituted-aluminum or tri(hydrocarbyl)-boron compounds. In some other embodiments, exemplary Group 13 metal compounds are tri(hydrocarbyl)-substituted-aluminum or tri(hydrocarbyl)-boron compounds are tri(($C_1$-$C_{10}$)alkyl)aluminum or tri(($C_6$-$C_{18}$)aryl)boron compounds and halogenated (including perhalogenated) derivatives thereof. In some other embodiments, exemplary Group 13 metal compounds are tris(fluoro-substituted phenyl)boranes, in other embodiments, tris(pentafluorophenyl)borane. In some embodiments, the activating co-catalyst is a tris(($C_1$-$C_{20}$)

hydrocarbyl) borate (e.g., trityl tetrafluoroborate) or a tri ((C$_1$-C$_{20}$)hydrocarbyl)ammonium tetra((C$_1$-C$_{20}$)hydrocarbyl)borane (e.g., bis(octadecyl)methylammonium tetrakis (pentafluorophenyl)borane). As used herein, the term "ammonium" means a nitrogen cation that is a ((C$_1$-C$_{20}$) hydrocarbyl)$_4$N$^+$, a ((C$_1$-C$_{20}$)hydrocarbyl)$_3$N(H)$^+$, a ((C$_1$-C$_{20}$)hydrocarbyl)$_2$N(H)$_2^+$, (C$_1$-C$_{20}$)hydrocarbylN(H)$_3^+$, or N(H)$_4^+$, wherein each (C$_1$-C$_{20}$)hydrocarbyl may be the same or different.

Exemplary combinations of neutral Lewis acid activating co-catalysts include mixtures comprising a combination of a tri((C$_1$-C$_4$)alkyl)aluminum and a halogenated tri((C$_6$-C$_{18}$) aryl)boron compound, especially a tris(pentafluorophenyl) borane. Other exemplary embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Exemplary embodiments ratios of numbers of moles of (metal-ligand complex): (tris(pentafluoro-phenylborane): (alumoxane) [e.g., (Group 4 metal-ligand complex):(tris(pentafluoro-phenylborane): (alumoxane)] are from 1:1:1 to 1:10:30, other exemplary embodiments are from 1:1:1.5 to 1:5:10.

Many activating co-catalysts and activating techniques have been previously taught with respect to different metal-ligand complexes in the following USPNs: U.S. Pat. Nos. 5,064,802; 5,153,157; 5,296,433; 5,321,106; 5,350,723; 5,425,872; 5,625,087; 5,721,185; 5,783,512; 5,883,204; 5,919,983; 6,696,379; and 7,163,907. Examples of suitable hydrocarbyloxides are disclosed in U.S. Pat. No. 5,296,433. Examples of suitable Bronsted acid salts for addition polymerization catalysts are disclosed in U.S. Pat. Nos. 5,064,802; 5,919,983; 5,783,512. Examples of suitable salts of a cationic oxidizing agent and a non-coordinating, compatible anion as activating co-catalysts for addition polymerization catalysts are disclosed in U.S. Pat. No. 5,321,106. Examples of suitable carbenium salts as activating co-catalysts for addition polymerization catalysts are disclosed in U.S. Pat. No. 5,350,723. Examples of suitable silylium salts as activating co-catalysts for addition polymerization catalysts are disclosed in U.S. Pat. No. 5,625,087. Examples of suitable complexes of alcohols, mercaptans, silanols, and oximes with tris(pentafluorophenyl)borane are disclosed in U.S. Pat. No. 5,296,433. Some of these catalysts are also described in a portion of U.S. Pat. No. 6,515,155 B1 beginning at column 50, at line 39, and going through column 56, at line 55, only the portion of which is incorporated by reference herein.

In some embodiments, the procatalyst comprising the metal-ligand complex of formula (I) may be activated to form an active catalyst composition by combination with one or more cocatalyst such as a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. Exemplary suitable cocatalysts include, but are not limited to modified methyl aluminoxane (MMAO), bis(hydrogenated tallow alkyl)methyl, tetrakis(pentafluorophenyl)borate(1-) amine (RIBS-2), triethyl aluminum (TEA), and any combinations thereof.

In some embodiments, one or more of the foregoing activating co-catalysts are used in combination with each other. An especially preferred combination is a mixture of a tri((C$_1$-C$_4$)hydrocarbyl)aluminum, tri((C$_1$-C$_4$)hydrocarbyl) borane, or an ammonium borate with an oligomeric or polymeric alumoxane compound.

The ratio of total number of moles of the metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl)borane that are employed to the total number of moles of the metal-ligand complexes of formula (I) form 0.5:1 to 10:1, in some other embodiments, from 1:1 to 6:1, in some other embodiments, from 1:1 to 5:1. The remaining activating co-catalysts are generally employed in approximately mole quantities equal to the total mole quantities of one or more metal-ligand complexes of formula (I).

Polymerization Process Conditions

Any conventional polymerization processes may be employed to conduct the inventive process. Such conventional polymerization processes include, but are not limited to, solution polymerization process, gas phase polymerization process, slurry phase polymerization process, and combinations thereof using one or more conventional reactors e.g. loop reactors, isothermal reactors, fluidized bed gas phase reactors, stirred tank reactors, batch reactors in parallel, series, and/or any combinations thereof.

The inventive process may occur in a solution-phase polymerization process using one or more loop reactors, isothermal reactors, and combinations thereof.

In general, the solution phase polymerization process occurs in one or more well-stirred reactors such as one or more loop reactors or one or more spherical isothermal reactors at a temperature in the range of from 120 to 300° C.; for example, from 160 to 215° C., and at pressures in the range of from 300 to 1500 psi; for example, from 400 to 750 psi. The residence time in solution phase polymerization process is typically in the range of from 2 to 30 min; for example, from 10 to 20 min. Ethylene, one or more solvents, one or more catalyst systems, e.g. a inventive catalyst system, optionally one or more cocatalysts, and optionally one or more comonomers are fed continuously to the one or more reactors. Exemplary solvents include, but are not limited to, isoparaffins. For example, such solvents are commercially available under the name ISOPAR E from ExxonMobil Chemical Co., Houston, Tex. The resultant mixture of the ethylene based polymer and solvent is then removed from the reactor and the ethylene based polymer is isolated. Solvent is typically recovered via a solvent recovery unit, i.e. heat exchangers and vapor liquid separator drum, and is then recycled back into the polymerization system.

In one embodiment, the inventive process occurs in a solution polymerization reactor in a dual reactor system, for example a dual loop reactor system, wherein ethylene and optionally one or more α-olefins are polymerized in the presence of the inventive catalyst system, as described herein, and optionally one or more cocatalysts. In one embodiment, the ethylene based polymer may be produced via solution polymerization in a dual reactor system, for example a dual loop reactor system, wherein ethylene and optionally one or more α-olefins are polymerized in the presence of the inventive catalyst system, as described herein, and optionally one or more other catalysts. The inventive catalyst system, as described herein, can be used in the first reactor, or second reactor, optionally in combination with one or more other catalysts. In one embodiment, the ethylene based polymer may be produced via solution polymerization in a dual reactor system, for example a dual loop reactor system, wherein ethylene and optionally one or more α-olefins are polymerized in the presence of the inventive catalyst system, as described herein, in both reactors.

In another embodiment, the inventive process occurs in a solution polymerization reactor in a single reactor system, for example a single loop reactor system, wherein ethylene and optionally one or more α-olefins are polymerized in the presence of the inventive catalyst system, as described herein, and optionally one or more cocatalysts.

In another embodiment, the inventive process occurs in a solution polymerization in a single reactor system, for example a single loop reactor system, wherein ethylene and optionally one or more α-olefins are polymerized in the presence of the inventive catalyst system, as described herein, optionally one or more other catalysts, and optionally one or more cocatalysts.

The procatalyst comprising the metal-ligand complex of formula (I) may be activated to form an active catalyst composition by combination with one or more cocatalysts, as described above, for example, a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. Exemplary suitable cocatalysts include, but are not limited to modified methyl aluminoxane (MMAO), bis(hydrogenated tallow alkyl)methyl, tetrakis(pentafluorophenyl)borate(1-) amine (RIBS-2), triethyl aluminum (TEA), and combinations thereof.

In another embodiment, the inventive process may occur in a solution polymerization reactor in a dual reactor system, for example a dual loop or spherical reactor system, wherein ethylene and optionally one or more α-olefins are polymerized in the presence of one or more catalyst systems.

In another embodiment, the inventive process may occur in a solution polymerization reactor in a multiple reactor system wherein the reactors are connected in series.

In another embodiment, the inventive process may occur in a solution polymerization reactor in a multiple reactor system wherein the reactors are connected in parallel.

In another embodiment, the inventive process may occur in a solution polymerization reactor in a single reactor system, for example a single loop reactor system, wherein ethylene and optionally one or more α-olefins are polymerized in the presence of one or more catalyst systems.

The inventive process may further occur in the presence of one or more additives. Such additives include, but are not limited to, antistatic agents, color enhancers, dyes, lubricants, pigments, primary antioxidants, secondary antioxidants, processing aids, UV stabilizers, and combinations thereof.

EXAMPLES

The following examples illustrate the present invention but are not intended to limit the scope of the invention.

Comparative Example C1

C1-1. Preparation of 2-(4-(2,4,4-trimethylpentan-2-yl)phenoxy)tetrahydro-2H-pyran

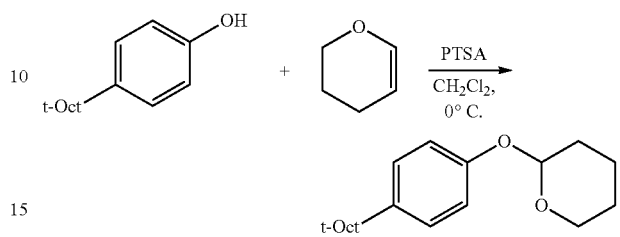

To a stirred solution of 10.0 g (48.5 mmol) of 4-(2,4,4-trimethylpentan-2-yl)phenol and in 24 mL of $CH_2Cl_2$, at 0° C., was added, 0.092 g (0.48 mmol) of PTSA monohydrate, and then 5.31 mL (58.2 mmol) of 3,4-dihydropyran was added dropwise. The resulting solution was stirred at 0° C. for approximately 30 min. Then triethylamine (0.1 mL) was added, and the resulting mixture was concentrated, and then diluted with 100 mL of $Et_2O$, and successively washed with 100 mL each of 2 M NaOH, water, and brine. The resulting organic portion was then dried over $MgSO_4$, filtered, and concentrated, affording the product as a light yellow solid (14.05 g, quantitative yield). $^1H$ NMR (400 MHz, $CDCl_3$) δ 7.26 (d, J=8.8 Hz, 2H), 6.96 (d, J=8.8 Hz, 2H), 5.37 (t, J=3.4 Hz, 1H), 3.93 (ddd, J=11.4, 9.2, 3.1 Hz, 1H), 3.59 (dtd, J=11.4, 4.3, 1.5 Hz, 1H), 2.00 (m, 1H), 1.84 (m, 2H), 1.68-1.50 (m, 3H), 1.34 (s, 6H), 0.71 (s, 9H). $^{13}C\{^1H\}$ NMR (101 MHz, $CDCl_3$) δ 154.86, 143.25, 127.07, 115.78, 96.69, 62.19, 57.15, 38.12, 32.44, 31.91, 31.79, 31.75, 30.63, 25.41, 19.09.

C1-2. Preparation of 4,4,5,5-tetramethyl-2-(2-((tetrahydro-2H-pyran-2-yl)oxy)-5-(2,4,4-trimethylpentan-2-yl)phenyl)-1,3,2-dioxaborolane

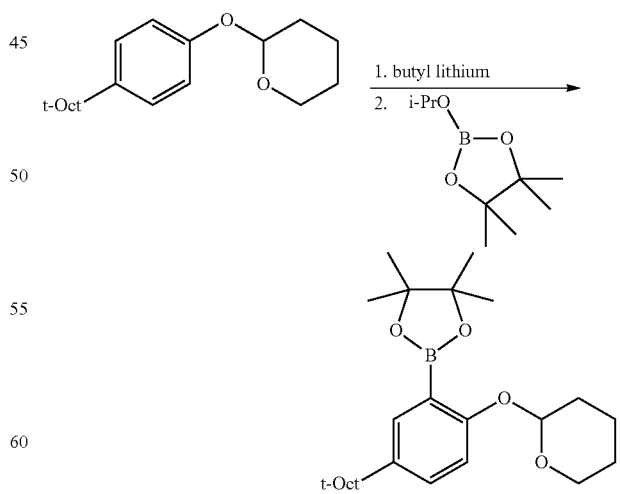

An oven dried 1 L flask under $N_2$ was charged with the protected phenolic substrate (10.0 g, 34.4 mmol) and 344 mL of anhydrous THF. The resulting solution was cooled to 0° C., and n-BuLi (17.9 mL, 2.5 M solution in hexane, 44.8 mmol) was added slowly via syringe. The resulting solution was allowed to warm slowly to room temperature with stirring over 2 h, at which point 2-isopropoxy-4,4,5,5-tetramethyl-1,3,2-dioxaborolane (9.13 mL, 44.8 mmol) was added via syringe. This mixture was then stirred overnight at room temperature, then quenched with 4 mL of $H_2O$. The volatiles were removed under vacuum, taking care not to heat the mixture excessively. The resulting residue was dissolved in 200 mL $CH_2Cl_2$, then washed with brine (3×200 mL). The organic layer was dried over $MgSO_4$, filtered and concentrated. The crude product was purified by column chromatography on $SiO_2$, eluting with 1→10% EtOAc/hexane gradient. Collected 8.04 g (56% yield) of product as a clear oil which eventually solidified. $^1$H NMR (400 MHz, $CDCl_3$) δ 7.60 (d, J=2.6 Hz, 1H), 7.35 (dd, J=8.7, 2.7 Hz, 1H), 7.00 (d, J=8.7 Hz, 1H), 5.44 (t, J=2.9 Hz, 1H), 4.00 (td, J=11.1, 2.8 Hz, 1H), 3.56 (m, 1H), 2.17 (m, 1H), 1.94 (m, 1H), 1.84 (m, 1H), 1.70 (s, 2H), 1.69-1.57 (m, 3H), 1.35 (br s, 18H), 0.71 (s, 9H). $^{13}C\{^1H\}$ NMR (101 MHz, $CDCl_3$) δ 159.48, 142.90, 133.68, 130.18, 127.07, 115.25, 96.81, 83.30, 61.60, 57.08, 38.15, 32.46, 31.98, 31.79, 31.65, 30.44, 25.74, 25.11, 25.00, 18.38.

C1-3. Preparation of 2-((5'-phenyl-5-(2,4,4-trimethylpentan-2-yl)-[1,1':3',1"-terphenyl]-2-yl)oxy)tetrahydro-2H-pyran

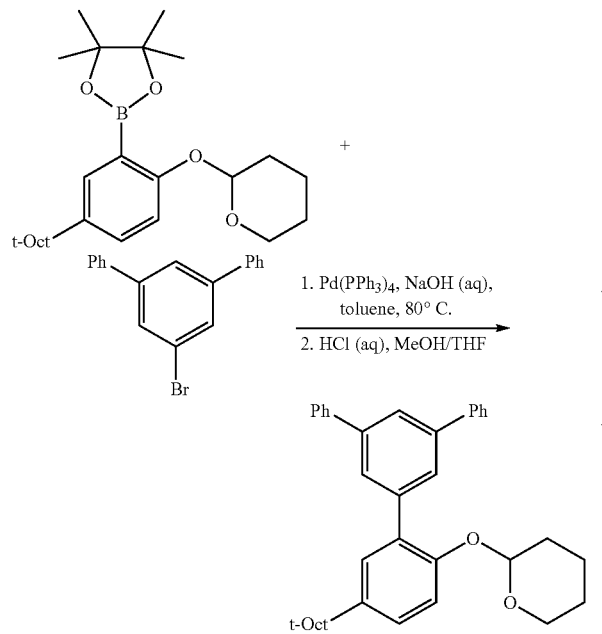

To a 100 mL round bottom flask containing the borylated substrate (5.00 g, 12.0 mmol) under $N_2$ was added 3,5-diphenyl-1-bromobenzene (3.90 g, 12.6 mmol), NaOH (2.88 g, 72.0 mmol), $Pd(PPh_3)_4$ (278 mg, 0.24 mmol), 50 mL of degassed toluene, and 10 mL of degassed water. The system was sparged with $N_2$, and then was heated to 110° C. for 24 h. The reaction was cooled and the volatiles were removed by rotary evaporation. The residue was taken up in $Et_2O$, washed with brine, dried over anhydrous $MgSO_4$, filtered through a pad of $SiO_2$ then concentrated to furnish the crude material. This was further purified by chromatography on $SiO_2$, eluting with 100% hexane followed by 5→10% EtOAc/hexane. The product was isolated as a white solid (5.1 g, 81.9% yield). $^1$H NMR (400 MHz, $CDCl_3$) δ 7.79 (m, 3H), 7.71 (m, 4H), 7.48 (m, 4H), 7.43 (d, J=2.5 Hz, 1H), 7.39 (m, 2H), 7.32 (dd, J=8.7, 2.5 Hz, 1H), 7.18 (d, J=8.7 Hz, 1H), 5.43 (t, J=2.7 Hz, 1H), 3.88 (td, J=10.7, 10.2, 2.7 Hz, 1H), 3.59 (m, 1H), 1.86-1.75 (m, 3H), 1.74 (s, 2H), 1.63 (m, 1H), 1.54-1.44 (m, 2H), 1.40 (s, 6H), 0.76 (s, 9H). $^{13}C\{^1H\}$ NMR (101 MHz, $CDCl_3$) δ 151.79, 143.81, 141.53, 141.35, 140.40, 130.63, 128.93, 128.89, 127.76, 127.46, 127.41, 126.58, 124.59, 115.37, 97.20, 62.17, 57.20, 38.30, 32.57, 32.02, 31.77, 30.59, 25.40, 18.76.

C1-4. Preparation of 4,4,5,5-tetramethyl-2-(5'-phenyl-2-((tetrahydro-2H-pyran-2-yl)oxy)-5-(2,4,4-trimethylpentan-2-yl)-[1,1':3',1"-terphenyl]-3-yl)-1,3,2-dioxaborolane

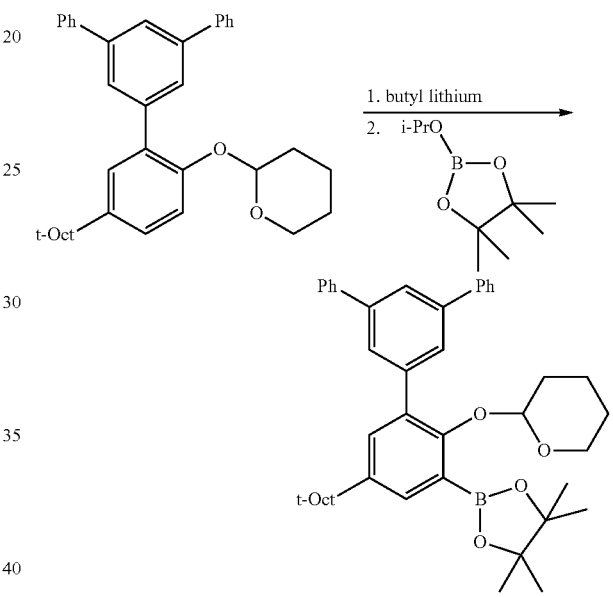

The substrate (8.05 g, 15.5 mmol) was dissolved in 155 mL of anhydrous THF in an oven dried 500 mL flask under $N_2$, and was cooled to 0° C. To this was added n-BuLi (8.07 mL, 2.5M solution in hexane, 20.2 mmol) dropwise via syringe. The solution was allowed to warm slowly to room temperature with stirring over 2 h, at which point 2-isopropoxy-4,4,5,5-tetramethyl-1,3,2-dioxaborolane (4.12 mL, 20.2 mmol) was added via syringe and the resulting mixture was stirred overnight at room temperature. The reaction was quenched with 4 mL $H_2O$, and the volatiles removed under vacuum, taking care not to heat the mixture excessively. The crude residue was dissolved in 200 mL $CH_2Cl_2$, and washed with brine (3×200 mL). The organic layer was dried over $MgSO_4$, filtered and concentrated, furnishing the product (9.0 g, 90% yield) as a white powder. $^1$H NMR (400 MHz, $CDCl_3$) δ 7.81 (d, J=1.8 Hz, 2H), 7.76-7.69 (m, 6H), 7.50-7.44 (m, 5H), 7.40-7.34 (m, 2H), 5.02 (t, J=3.1 Hz, 1H), 3.08-2.94 (m, 2H), 1.99 (m, 1H), 1.75 (ap d, J=6.0 Hz, 2H), 1.72-1.58 (m, 2H), 1.45-1.31 (m, 3H), 1.41 (s, 6H), 1.38 (s, 6H), 1.37 (s, 6H), 0.74 (s, 9H). $^{13}C\{^1H\}$ NMR (101 MHz, $CDCl_3$) δ 157.24, 145.08, 141.50, 141.46, 141.43, 134.73, 134.07, 132.05, 128.90, 128.16, 127.48, 127.40, 124.42, 104.87, 83.75, 62.22, 57.20, 38.42, 32.59, 32.04, 31.82, 31.47, 30.58, 25.49, 25.21, 24.79, 19.05.

C1-5. Preparation of meso-4,4'-pentane-2,4-diylbis(oxy))bis(3-bromo-1-fluorobenzene)

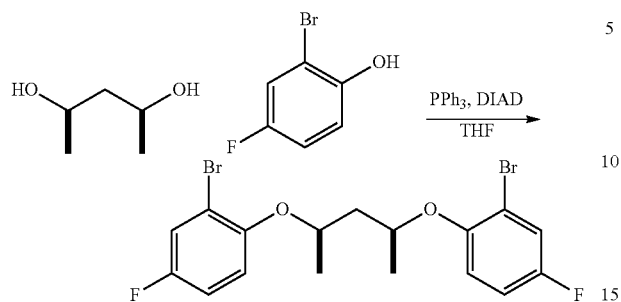

A 2-L three-necked round bottom flask, equipped with a thermometer, a magnetic stirrer, an addition funnel, and a N$_2$ pad, was charged with 2,4-pentanediol (30.46 g, 292.5 mmol, 1 equiv), 2-bromo-4-fluorophenol (114.39 g, 598.9 mmol, 2.04 equiv), triphenylphosphine (157.12 g, 599.0 mmol, 2.04 equiv), and THF (600 mL), and the contents cooled to 2° C. in an ice-water bath. A solution of DIAD (121.11 g, 598.9 mmol, 2.04 equiv) in THF (130 mL), in the addition funnel, was added, at such a rate, to maintain the reaction below 5° C. (the addition took approximately 4 h). The resulting mixture was stirred at 2-5° C. for an additional 1 h, and a sample was taken for GC-MS analysis, which indicated the reaction was near to completion. After stirring overnight, at ambient temperature, volatiles were removed under reduced pressure. Cyclohexane (700 mL) was added to the residue and the slurry was stirred at room temperature for 30 min. The insoluble solid was filtered, rinsed with cyclohexane (100 mL×3). The cyclohexane solution was washed with 1N NaOH (200 mL), water (200 mL), 1N HCl (200 mL), water (500 mL×2), and then concentrated, under reduced pressure, to give an oil residue. The oil residue was dissolved in hexane (100 mL) and then passed through a pad of SiO$_2$ (315 g), eluting with hexane (300 mL), and hexane-EtOAc (20:1 in volume, hexane 2 L+EtOAc 100 mL), concentrated, and dried, to give the desired bottom group (123.8 grams, 94% yield). $^1$H NMR (400 MHz, CDCl$_3$) δ 7.14 (dd, J=8.4, 3.9 Hz, 2H), 6.64 (dt, J=9.1, 3.9 Hz, 2H), 6.48 (dd, J=9.0, 3.7 Hz, 2H), 4.22 (m, 2H), 2.17 (dt, J=13.6, 6.5 Hz, 1H), 1.45 (dt, J=13.6, 5.6 Hz, 1H), and 0.98 (d, J=6.1 Hz, 6H). $^{13}$C{$^1$H} NMR (101 MHz, CDCl$_3$) δ 156.9 (d, J$_{CF}$=235.8 Hz), 150.9 (d, J$_{CF}$=2.8 Hz), 120.9 (d, J$_{CF}$=25.8 Hz), 115.62 (d, J$_{CF}$=7.7 Hz), 114.9 (d, J$_{CF}$=21.5 Hz), 113.7 (d, J$_{CF}$=10.1 Hz), 72.8, 42.7, and 19.6. $^{19}$F{$^1$H} NMR (376 MHz, CDCl$_3$) δ: −121.33.

C1-6. Preparation of Comparative Ligand C1

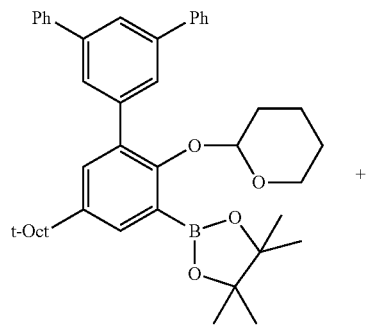

+

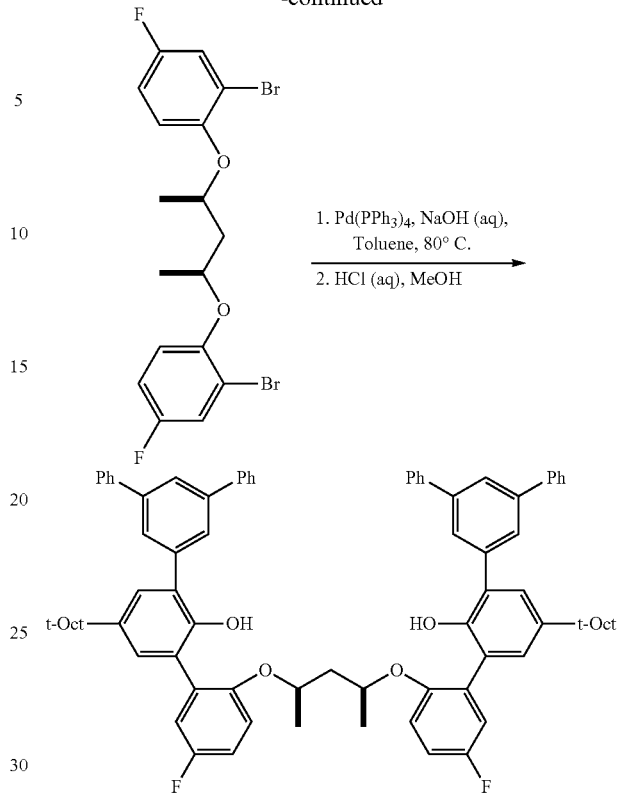

To a 250 mL flask containing the boronate ester (3.15 g, 4.89 mmol) under N$_2$ was added the aryl bromide (1.00 g, 2.22 mmol), NaOH (0.533 g, 13.3 mmol), Pd(PPh$_3$)$_4$ (0.103 g, 0.089 mmol), 9.3 mL of degassed toluene, and 1.8 mL of degassed water. The system was sparged with N$_2$. The reaction was heated to 110° C. for 24 h. The reaction was cooled and the volatiles were removed by rotary evaporation. The residue was taken up in Et$_2$O (100 mL), washed with brine (100 mL), dried over MgSO$_4$, filtered through a pad of SiO$_2$, then concentrated to give protected ligand. For THP deprotection step, this material was dissolved in 20 mL of THF, and 20 mL of MeOH was added, followed by approximately 5 drops of concentrated HCl. This mixture was heated under reflux for 1 hour, then cooled and concentrated under vacuum. Et$_2$O (80 mL) was added, and the resulting solution was washed with water (50 mL). The organic portion was separated and dried over MgSO$_4$, filtered and concentrated under vacuum. This crude material was further purified by column chromatography on SiO$_2$, eluting with a 1→8% EtOAc/hexane gradient, furnishing the product (2.46 g, 95.5% yield) as a white solid. $^1$H NMR (400 MHz, CDCl$_3$) δ 7.80 (t, J=1.7 Hz, 2H), 7.76 (d, J=1.7 Hz, 4H), 7.68 (m, 8H), 7.45 (m, 10H), 7.37 (m, 4H), 7.17 (d, J=2.4 Hz, 2H), 7.03 (dd, J=9.0, 3.0 Hz, 2H), 6.78 (m, 4H), 6.33 (s, 2H), 4.32 (q, J=6.2 Hz, 2H), 1.74 (s, 4H), 1.39 (s, 6H), 1.38 (s, 6H), 1.04 (d, J=6.1 Hz, 6H), 0.75 (s, 18H). $^{13}$C{$^1$H} NMR (101 MHz, CDCl$_3$) δ 159.25, 156.85, 149.73, 149.70, 148.27, 142.62, 141.82, 141.37, 140.18, 131.69, 131.61, 129.54, 129.06, 128.95, 128.75, 127.65, 127.56, 127.49, 125.78, 125.76, 125.01, 119.11, 118.88, 117.63, 117.54, 115.69, 115.47, 74.45, 57.19, 42.45, 38.29, 32.59, 32.09, 31.88, 31.85, 19.82. $^{19}$F{$^1$H} NMR (376 MHz, CDCl$_3$) δ −120.52.

C1-6. Preparation of Comparative Example C1

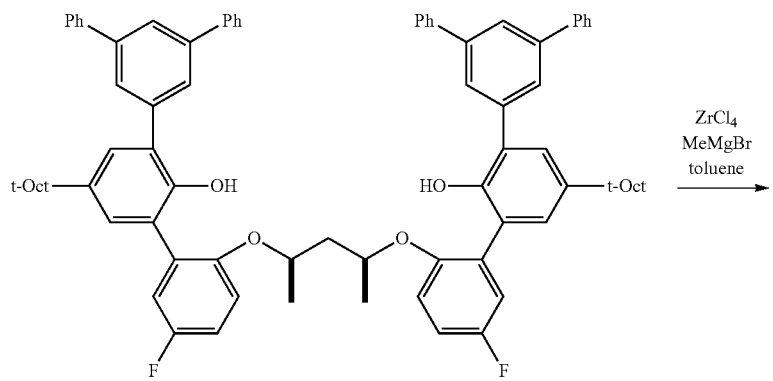

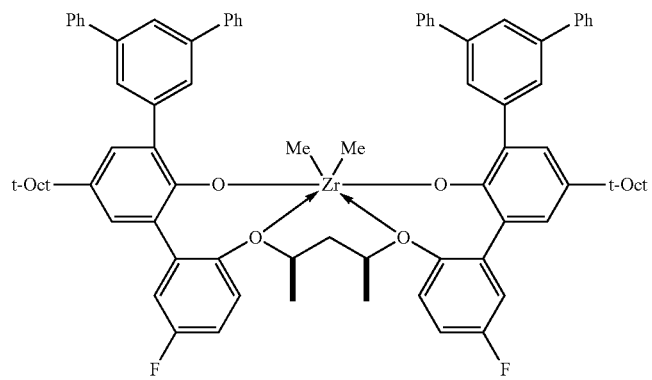

C1

To a vial equipped with a stir bar in a glovebox was added ZrCl$_4$ (0.201 g, 0.864 mmol) and anhydrous toluene (22 mL). The mixture was cooled to −30° C. and to this was added MeMgBr (1.21 mL, 3.0M solution in Et$_2$O, 3.63 mmol). The resultant suspension was stirred for 2 min after which ligand C1 (1.00 g, 0.864 mmol) was added to the cold suspension with stirring. The reaction was warmed to room temperature and stirred overnight. The reaction was then concentrated to afford a dark solid, which was washed with hexane (100 mL). To the resulting solid material was added toluene (100 mL), and the resulting suspension was filtered. The filtrate was concentrated to furnish the product as a brown solid (0.634 g, 58%). $^1$H NMR (400 MHz, C$_6$D$_6$) δ 8.36 (s, 2H), 8.26 (s, 2H), 7.97 (t, J=1.8 Hz, 1H), 7.92 (t, J=1.7 Hz, 1H), 7.73 (d, J=2.5 Hz, 1H), 7.69 (d, J=2.5 Hz, 1H), 7.66 (m, 8H), 7.22 (m, 9H), 7.12 (m, 6H), 7.03 (dd, J=8.9, 3.1 Hz, 1H), 6.62 (m, 2H), 5.81 (dd, J=8.9, 5.1 Hz, 1H), 5.56 (dd, J=8.9, 5.1 Hz, 1H), 4.33 (p, J=6.8 Hz, 1H), 3.61 (m, 1H), 1.78-1.54 (m, 4H), 1.34 (s, 6H), 1.33 (s, 2H), 1.31 (s, 3H), 1.23 (m, 1H), 0.80 (s, 9H), 0.72 (s, 9H), 0.65 (d, J=6.0 Hz, 3H), 0.61 (m, 1H), 0.40 (d, J=6.8 Hz, 3H), −0.08 (s, 3H), −0.24 (s, 3H). $^{19}$F{$^1$H} NMR (376 MHz, C$_6$D$_6$) δ −114.27, −114.44.

Comparative Example C2

C2-1. Preparation of 3,6-bis(1,1-dimethylethyl)-9H-carbazole

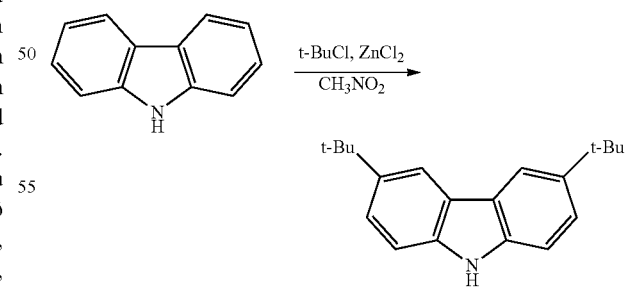

A 500 mL, three-necked round bottom flask, equipped with an overhead stirrer, N$_2$ bubbler, and an addition funnel, was charged with 20.02 g (120.8 mmol) of carbazole, 49.82 g (365.5 mmol) of ZnCl$_2$, and 300 mL of nitromethane at room temperature. To the resulting dark brown slurry, was added, 49.82 g (365.5 mmol) of 2-chloro-2-methylpropane (also known as tertiary-butyl chloride), dropwise from the addition funnel, over the period of 2.5 h. After completing the addition, the resulting slurry was stirred for an additional 18 h, and the reaction mixture was poured into 800 mL of ice cold water, and extracted with $CH_2Cl_2$ (3×500 mL). The combined extracts were dried with anhydrous $MgSO_4$, filtered, and concentrated, first by rotary evaporation, and then by evaporation under high vacuum to remove nitromethane. The resulting residue was dissolved in hot $CH_2Cl_2$ (70 mL), followed by hot hexanes (50 mL), and the resulting solution was cooled to room temperature, and then placed it in a refrigerator overnight. The resulting solids which formed were isolated, washed with cold hexanes, and then dried under high vacuum to yield 10.80 g (32.0%) of the desired product as off-white crystals. $^1H$ NMR (400 MHz, $CDCl_3$) δ 8.11 (d, J=1.6 Hz, 2H), 7.75 (s, 1H), 7.48 (dd, J=8.5, 1.9 Hz, 2H), 7.31 (d, J=8.5 Hz, 2H), 1.48 (s, 18H). $^{13}C\{^1H\}$ NMR (101 MHz, $CDCl_3$) δ 142.17 (s), 137.96 (s), 123.45 (s), 123.28 (s), 116.11 (s), 109.97 (s), 34.73 (s), 32.09 (s).

C2-2. Preparation of 2-iodo-4-(2,4,4-trimethylpentan-2-yl)phenol

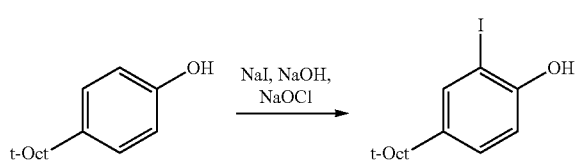

To a stirred solution of 10.30 g (50.00 mmol) of 4-(2,4,4-trimethylpentan-2-yl)phenol in 125 mL of methanol at 0° C., was added 7.48 g (50.00 mmol) of NaI and 2.00 g (50.0 mmol) of NaOH. To the resulting mixture, was added, 86 mL of 5% aqueous NaOCl solution (commercial bleach) over a one hour period. The resulting slurry was stirred for one more hour at 0° C., then 30 mL of aqueous 10% $Na_2S_2O_3$ solution was added, and the resulting reaction mixture was acidified with the addition of dilute hydrochloric acid. The resulting mixture was extracted with $CH_2Cl_2$, and the resulting organic layer was washed with brine, and then dried over anhydrous $MgSO_4$. The volatiles were removed under vacuum, and the resulting residue was purified by flash chromatography on $SiO_2$, eluting with 5 volume percent (vol %) ethyl acetate in hexanes to yield 11.00 g (66%) of the desired product as a viscous oil. $^1H$ NMR (400 MHz, $CDCl_3$) δ 7.60 (d, J=2.5 Hz, 1H), 7.25 (dd, J=8.5 and 2.2 Hz, 1H), 6.90 (d, J=8.5 Hz, 1H), 5.13 (s, 1H), 1.69 (s, 2H), 1.32 (s, 6H) and 0.74 (s, 9H). $^{13}C\{^1H\}$ NMR (101 MHz, $CDCl_3$) δ 152.21, 144.52, 135.56, 128.03, 114.17, 85.36, 56.92, 38.01, 32.43, 31.90 and 31.64. GC/MS (m/e): 332 ($M^+$).

C2-3. Preparation of 2-(2-iodo-4-(2,4,4-trimethyl-pentan-2-yl)phenoxy)tetrahydro-2H-pyran

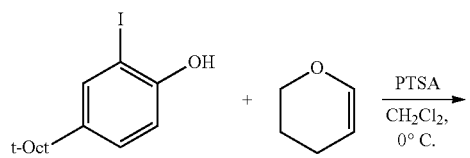

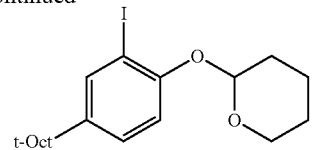

To a stirred solution of 4.91 g (14.8 mmol) of 2-iodo-4-(2,4,4-trimethylpentan-2-yl)phenol and 1.50 g (17.8 mmol) of 3,4-dihydropyran, in 5 mL of $CH_2Cl_2$, at 0° C., was added, 0.039 g (0.205 mmol) of PTSA monohydrate. The resulting solution was allowed to warm to room temperature, and stirred thereat for approximately 10 min. Then triethylamine (0.018 g, 0.178 mmol) was added, and the resulting mixture was diluted with 50 mL of $CH_2Cl_2$, and successively washed with 50 mL each of 1M NaOH, water, and brine. The organic phase was dried with anhydrous $MgSO_4$, filtered, and concentrated to give a crude material, which was purified by flash chromatography on $SiO_2$, using 5 vol % ethyl acetate in hexanes, to yield 5.18 g (93.12%) of the desired product as a golden oil. $^1H$ NMR (400 MHz, $CDCl_3$) δ 7.74 (d, J=2.3 Hz, 1H), 7.27 (dd, J=2.3 and 8.6 Hz, 1H), 6.99 (d, J=8.6 Hz, 1H), 5.49 (m, 1H), 3.91 (m, 1H), 3.61 (m, 1H), 2.20-1.60 (m, 6H), 1.69 (s, 2H), 1.34 (s, 6H) and 0.75 (s, 9H). $^{13}C\{^1H\}$ NMR (101 MHz, $CDCl_3$) δ 153.27, 145.49, 136.98, 127.08, 114.44, 96.72, 87.09, 61.69, 56.91, 37.95, 32.33, 31.81, 31.52, 31.44, 30.26, 25.27, 18.36.

C2-4. Preparation of 3,6-di-tert-butyl-9-(2-(tetra-hydro-2H-pyran-2-yloxy)-5-(2,4,4-trimethyl-pentan-2-yl)phenyl)-9H-carbazole

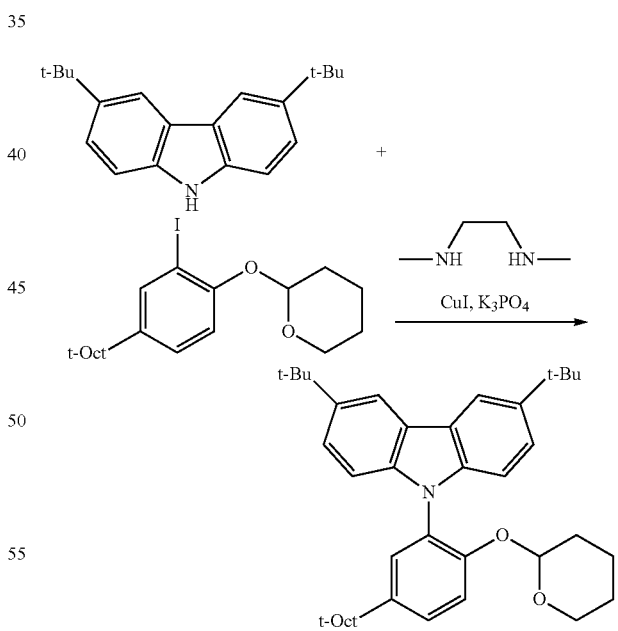

To a 50 mL, three necked, round bottom flask, equipped with a stir bar and condenser, under $N_2$ atmosphere, was added the following: 20 mL of dry toluene, 5.00 g (12.01 mmol) of 2-(2-iodo-4-(2,4,4-trimethylpentan-2-yl)phenoxy) tetrahydro-2H-pyran; 3.56 g (12.01 mmol) of 3,6-di-tert-butyl carbazole, 0.488 g (2.56 mmol) of CuI, 7.71 g (36.2 mmol) of $K_3PO_4$, and 0.338 g (3.84 mmol) of N,N-dimethylethylenediamine. The resulting reaction mixture was heated, under reflux, for 48 h, cooled, and filtered through a bed of SiO$_2$. The SiO$_2$ was rinsed with THF, and the resulting solution was concentrated to give a crude residue. Purification was accomplished by recrystallization from CH$_3$CN, to yield 4.57 g (67.0%) of the desired product as a white solid. $^1$H NMR (400 MHz, CDCl$_3$) δ 8.13 (t, J=1.71 Hz, 1H), 7.48 (d, J=2.4 Hz, 1H), 7.40 (m, 3H), 7.31 (d, J=8.68 Hz, 1H), 7.14 (d, J=8.68 Hz, 1H), 7.08 (d, J=8.56 Hz, 1H), 5.22 (t, J=2.81 Hz, 1H), 3.72 (td, J=11.12 and 2.8 Hz, 1H), 3.47 (dt, J=11.12 and 3.47 Hz, 1H), 1.75 (s, 2H), 1.474 (s, 9H), 1.472 (s, 9H), 1.394 (s, 3H), 1.391 (s, 3H), 1.37-1.12 (m, 6H), 0.82 (s, 9H). $^{13}$C{$^1$H} NMR (101 MHz, CDCl$_3$) δ 150.96, 144.22, 142.07, 140.02, 127.49, 126.60, 126.56, 123.14, 123.12, 122.96, 116.37, 115.88, 115.72, 110.18, 109.52, 97.02, 61.56, 57.03, 38.23, 34.69, 32.41, 32.07, 31.86, 31.72, 31.50, 29.98, 25.06, 17.61.

C2-5. Preparation of 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole

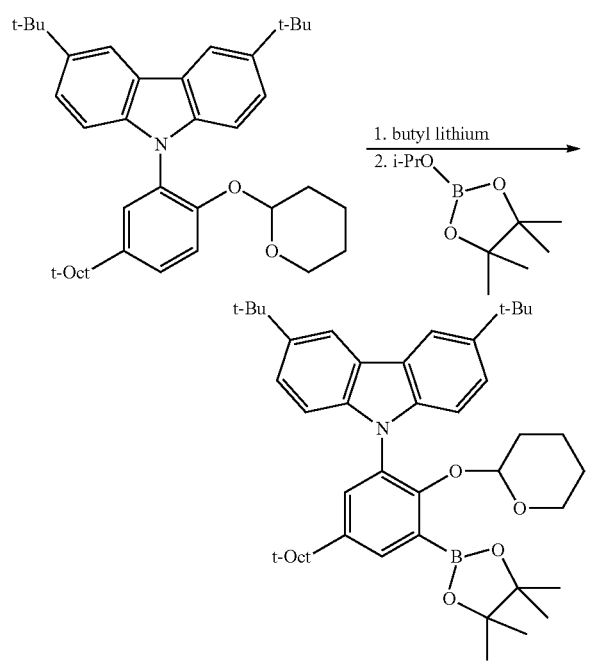

To a stirred solution of 2.5 g (4.4 mmol) of carbazole derivative, in 40 mL of THF, at 0° C., under N$_2$ atmosphere, 2.8 mL (7.0 mmol) of n-butyl lithium (2.5 M solution in hexanes) was added, over a period of 5 min. The solution was stirred at 0° C. for 3 more h. 2-Isopropoxy-4,4,5,5-tetramethyl-1,3,2-dioxaborolane (1.44 mL, 7.0 mmol) was added to this, and the stirring continued at 0° C. for 1 more hour. The reaction mixture was slowly warmed to room temperature, and stirred for 18 hrs. The reaction mixture was concentrated to dryness by rotary evaporation, and 100 mL of ice cold water was added. The mixture was extracted with CH$_2$Cl$_2$. The organic layer was washed with brine, and dried over anhydrous MgSO$_4$. Removal of the solvent, followed by recrystallization from CH$_3$CN, gave 2.4 g (78.6%) of titled product as white solid. $^1$H NMR (400 MHz, CDCl$_3$) δ 8.30-7.96 (m, 2H), 7.81 (d, J=2.5 Hz, 1H), 7.58-7.32 (m, 3H), 7.14 (d, J=8.6 Hz, 2H), 4.85 (d, J=2.8 Hz, 1H), 2.76 (td, J=11.0, 2.7 Hz, 1H), 2.59 (dd, J=7.9, 3.5 Hz, 1H), 1.73 (s, 2H), 1.67-0.87 (m, 6H), 1.46 (s, 9H), 1.45 (s, 9H), 1.38 (s, 9H), 1.37 (s, 9H), 0.78 (s, 9H); $^{13}$C{$^1$H} NMR (101 MHz, CDCl$_3$) δ 156.25, 145.86, 142.05, 142.01, 139.79, 139.78, 133.82, 130.61, 129.72, 123.39, 123.37, 123.05, 115.59, 115.55, 110.20, 110.11, 101.41, 83.64, 61.20, 56.95, 38.37, 34.68, 32.42, 32.08, 31.90, 31.45, 29.97, 25.06, 25.04, 24.79, 18.16.

C2-6. Preparation of 1,4-bis(4-fluoro-2-iodophenoxy)butane

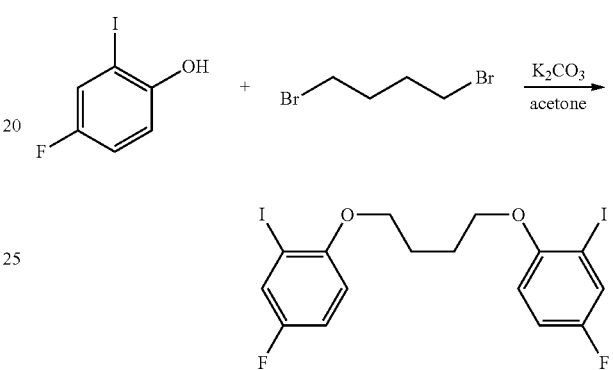

4-fluoro-2-iodophenol (25.0 g, 105 mmol), 1,4-dibromobutane (11.3 g, 52.5 mmol), and K$_2$CO$_3$ (18.1 g, 131 mmol) were added to a 500 mL flask containing 250 mL of acetone. The reaction mixture was heated under reflux overnight. GC/MS of the mixture showed the reaction was ~4:1 bis to mono substituted product. The mixture was filtered while hot, and the filtered solids taken up in acetone, warmed at 50° C. for 15 min and filtered again. The combined filtrates were reduced to a solid by rotary evaporation. The solid thus obtained was dissolved in hot CH$_3$CN, and cooled down to afford 14.0 g of white crystals. The mother liquor was placed in the freezer (−13° C.) and an additional 3.0 g of product was collected. The mother liquor of this material was recrystallized twice at low temperature and an additional 3.0 g of product was obtained for a total of 20.0 g (72% yield). $^1$H NMR (400 MHz, CDCl$_3$) δ 7.47 (dd, J=7.6, 3.0 Hz, 2H), 6.99 (ddd, J=8.8, 8.0, 3.0 Hz, 2H), 6.73 (dd, J=9.0, 4.6 Hz, 2H), 4.06 (m, 4H), 2.08 (m, 4H). $^{13}$C{$^1$H} NMR (101 MHz, CDCl$_3$) δ 156.7 (d, J=243.4 Hz), 154.1 (d, J=2.5 Hz), 126.0 (d, J=25.1 Hz), 115.6 (d, J=22.6 Hz), 112.2 (d, J=8.1 Hz), 86.0 (d, J=8.6 Hz), 69.4, 26.1.

C2-7. Preparation of Comparative Ligand C2

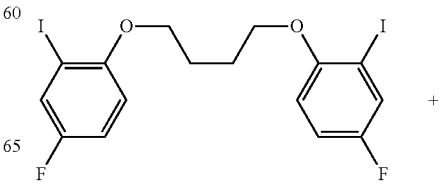

-continued

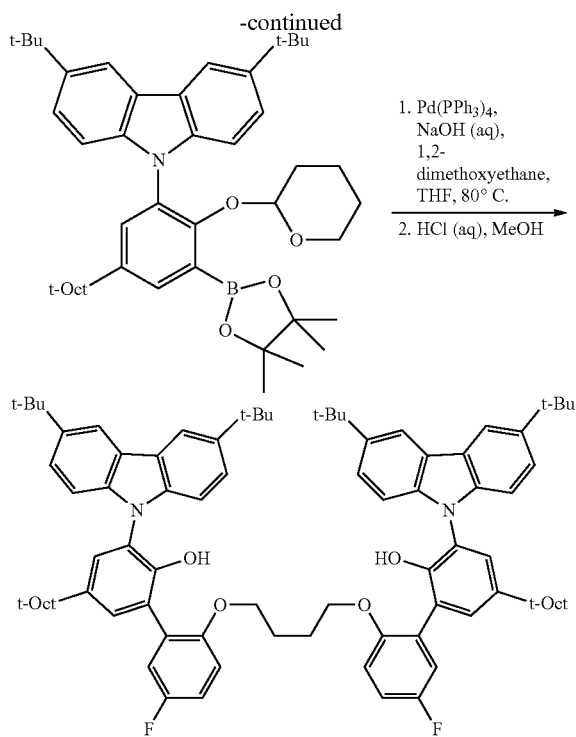

The borylated fragment (20.8 g, 30.0 mmol) was dissolved in 65 mL 1,2-dimethoxyethane. The solution was then treated with a solution of NaOH (3.5 g, 86.6 mmol) in 45 mL water, 65 mL of THF and the diiodo compound 7 (7.65 g, 14.4 mmol). The system was sparged for 30 min with $N_2$ and $Pd(PPh_3)_4$ (0.58 g, 0.51 mmol) was added. The mixture was heated to 85° C. for 36 h under $N_2$ atmosphere. The reaction mixture was cooled and volatiles were removed by rotary evaporation. The residue was taken up in 225 mL $CH_2Cl_2$ and washed with 200 mL brine. The organic layer was dried over anhydrous $MgSO_4$, filtered and passed through a small bed of $SiO_2$ and concentrated by rotary evaporation. The residue was dissolved in 170 mL of THF and treated with 170 mL of methanol and 2.15 mL of concentrated HCl. The yellow solution was then heated at 50° C. for 30 min. The solution was reduced to a yellow solid (20.38 g). This material was recrystallized from $Et_2O$/MeOH at −15° C., affording the product as a white solid (14.44 g, 81%). $^1$H NMR (400 MHz, $CDCl_3$) δ 8.12 (d, J=1.7 Hz, 4H), 7.40-7.34 (m, 6H), 7.31 (d, J=2.4 Hz, 2H), 7.10 (dd, J=8.9, 3.3 Hz, 2H), 7.02 (d, J=8.6 Hz, 4H), 6.96-6.90 (m, 2H), 6.72 (dd, J=9.0, 4.5 Hz, 2H), 5.89 (s, 2H), 3.73 (br m, 4H), 1.68 (s, 4H), 1.59 (br m, 4H), 1.41 (s, 36H), 1.32 (s, 12H), 0.76 (s, 18H).

C2-8. Preparation of Comparative Example C2

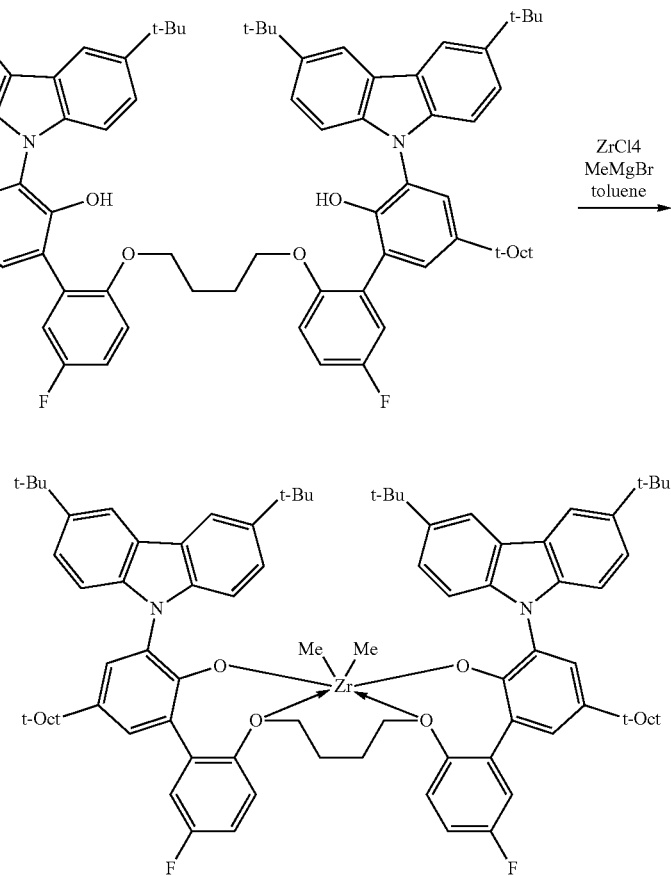

C2

To a jar equipped with a stir bar in a glovebox was added ZrCl$_4$ (0.059 g, 0.254 mmol, 1.05 equiv) dissolved in toluene (10 mL). The jar was cooled to −30° C. and to this was added MeMgBr (0.32 mL, 0.966 mmol, 4 equiv). The resultant solution was stirred 15 min after which ligand C2 (0.300 g, 0.241 mmol, 1 equiv) was added to the cold suspension with stirring. The reaction was warmed to 20-25° C. and stirred for 3 h. The reaction was filtered and concentrated and then extracted with hexanes. The hexanes layers were combined and concentrated to provide the catalyst as an off-white solid (0.181 g, 55%). $^1$H NMR (400 MHz, C$_6$D$_6$) δ 8.47-8.41 (m, 2H), 8.26 (dd, J=1.9, 0.6 Hz, 2H), 7.57-7.45 (m, 8H), 7.30 (dd, J=8.8, 1.9 Hz, 2H), 7.12 (d, J=2.4 Hz, 2H), 7.00 (p, J=1.0 Hz, 6H), 6.79 (dd, J=8.9, 3.1 Hz, 2H), 6.51-6.42 (m, 2H), 4.83 (dd, J=9.0, 4.8 Hz, 2H), 3.96 (t, J=9.7 Hz, 2H), 3.34 (d, J=11.7 Hz, 2H), 1.46 (s, 4H), 1.33 (s, 14H), 1.23-0.99 (m, 30H), 0.83-0.70 (m, 8H), 0.68 (s, 12H), −0.92 (s, 6H). $^{19}$F{$^1$H} NMR (376 MHz, C$_6$D$_6$) δ: −115.93.

Comparative Example C3

C3-1. Preparation of 1-(methoxymethoxy)-4-(2,4,4-trimethylpentan-2-yl)benzene

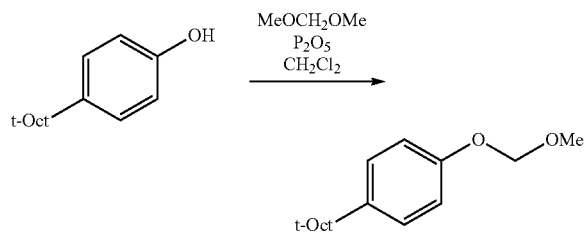

In a 500 mL flask 4-tert-octylphenol (10.0 g, 48.5 mmol) and dimethoxymethane (42.9 mL, 485 mmol) were dissolved in 240 mL CH$_2$Cl$_2$ under N$_2$. Added P$_2$O$_5$ in ca. 3 g portions over 0.5 h. The resulting mixture was stirred for an additional 2.5 h. Filtered reaction through a SiO$_2$ plug to remove P$_2$O$_5$. Washed filtrate with 150 mL H$_2$O, then 150 mL brine sequentially. The organic layer was dried over MgSO$_4$, filtered and concentrated. Purified by column chromatography on SiO$_2$, eluting with 30→50% CH$_2$Cl$_2$/hexane gradient. Collected 9.07 g product (74.7% yield) as a clear oil. $^1$H NMR (400 MHz, CDCl$_3$) δ 7.27 (d, J=8.8 Hz, 2H), 6.94 (d, J=8.8 Hz, 2H), 5.16 (s, 2H), 3.48 (s, 3H), 1.70 (s, 2H), 1.34 (s, 6H), 0.72 (s, 9H). $^{13}$C{$^1$H} NMR (101 MHz, CDCl$_3$) δ 155.04, 143.74, 127.22, 115.61, 94.79, 57.15, 56.10, 38.18, 32.48, 31.93, 31.76.]

C3-2. Preparation of 2-(2-(methoxymethoxy)-5-(2,4,4-trimethylpentan-2-yl)phenyl)-4,4,5,5-tetramethyl-1,3,2-dioxaborolane

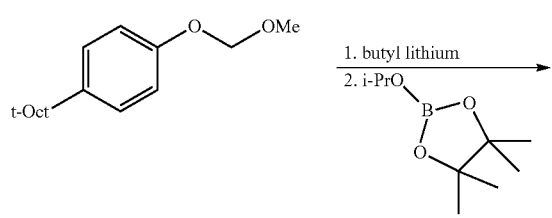

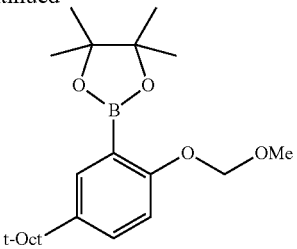

In an oven dried 1 L flask under N$_2$ the protected phenolic substrate (9.07 g, 36.2 mmol) was dissolved in THF (362 mL, degassed and stored over alumina under N$_2$). This solution was cooled to 0° C., and n-BuLi (18.8 mL, 2.5M solution in hexane, 47.1 mmol) was added slowly via syringe. The resulting solution was allowed to warm slowly to room temperature with stirring over 2 h. Isopropoxy (pinacolborane) (10.3 mL, 50.7 mmol) was then added via syringe and the mixture was stirred overnight at room temperature. The reaction was quenched with H$_2$O (6 mL), and the volatiles were removed under vacuum, taking care not to heat the mixture excessively. The resulting residue was dissolved in CH$_2$Cl$_2$ (300 mL), and this solution was washed with brine (3×300 mL). The organic layer was dried over MgSO$_4$, filtered and concentrated to afford a light yellow oil. By $^1$H NMR the material is a mixture of product and starting material, ca. 10:1 ratio. This material was used without further purification. $^1$H NMR (400 MHz, CDCl$_3$) δ 7.63 (d, J=2.6 Hz, 1H), 7.36 (dd, J=8.7, 2.7 Hz, 1H), 6.93 (d, J=8.7 Hz, 1H), 5.15 (s, 2H), 3.51 (s, 3H), 1.71 (s, 2H), 1.36 (s, 6H), 1.35 (s, 12H), 0.73 (s, 9H). $^{13}$C{$^1$H} NMR (101 MHz, CDCl$_3$) δ 159.68, 143.46, 133.92, 130.22, 115.33, 95.73, 83.46, 57.05, 56.21, 38.20, 32.48, 31.99, 31.70, 24.98.

C3-3. Preparation of 9-(2-(methoxymethoxy)-5-(2,4,4-trimethylpentan-2-yl)phenyl)anthracene

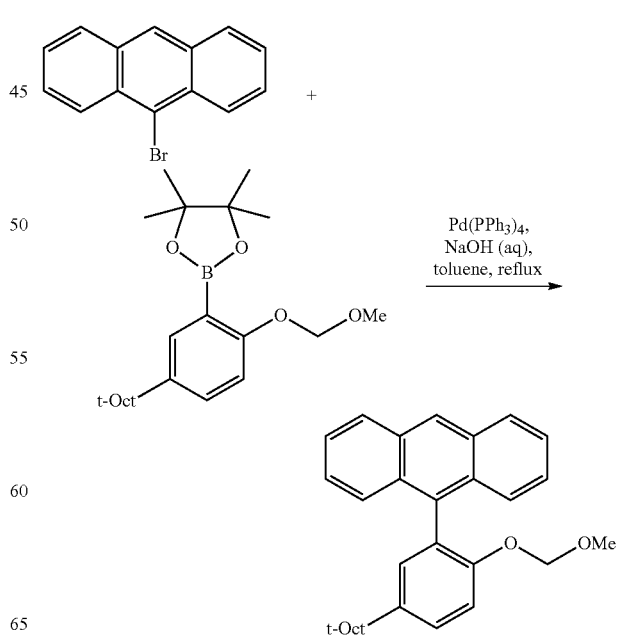

To a 200 mL flask containing the boronate ester (5.00 g, 13.3 mmol) under $N_2$ was added 9-bromoanthracene (3.11 g, 12.1 mmol), NaOH (2.90 g, 72.5 mmol), Pd(PPh$_3$)$_4$ (279 mg, 0.242 mmol), 50 mL of degassed toluene, and 10 mL of degassed water. The system was sparged with $N_2$. The reaction was heated to 110° C. for 72 h. The reaction was then cooled and the volatiles were removed by rotary evaporation. The residue was taken up in Et$_2$O, washed with brine, dried over anhydrous MgSO$_4$, filtered through a pad of SiO$_2$ then concentrated to provide the crude product. This material was purified by recrystallization from CH$_3$CN, providing the product as yellow-orange needles (3.93 g, 76.3% yield). $^1$H NMR (400 MHz, CDCl$_3$) δ 8.49 (s, 1H), 8.05 (d, J=8.3 Hz, 2H), 7.64 (d, J=8.8 Hz, 2H), 7.49 (dd, J=8.7, 2.6 Hz, 1H), 7.45 (ddd, J=8.5, 6.5, 1.2 Hz, 2H), 7.33 (ddd, J=8.8, 6.5, 1.3 Hz, 2H), 7.26 (m, 2H), 4.87 (s, 2H), 3.01 (s, 3H), 1.72 (s, 2H), 1.37 (s, 6H), 0.80 (s, 9H).

C3-3. Preparation of 2-(3-(anthracen-9-yl)-2-(methoxymethoxy)-5-(2,4,4-trimethylpentan-2-yl)phenyl)-4,4,5,5-tetramethyl-1,3,2-dioxaborolane

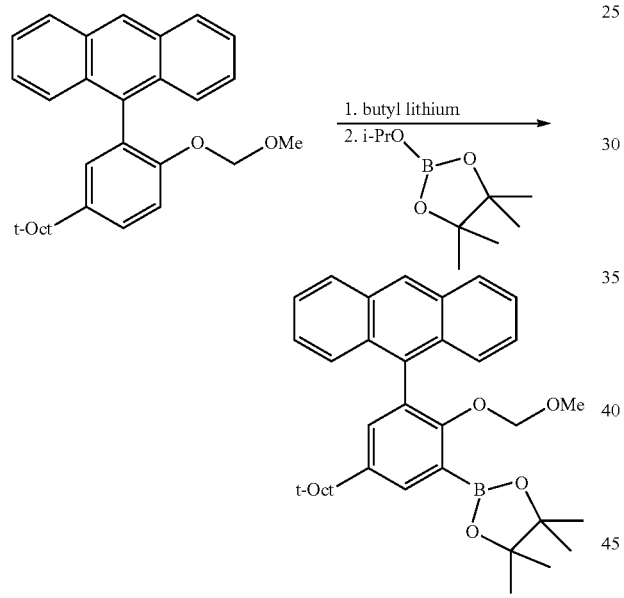

In an oven dried 250 mL flask under $N_2$ the substrate (3.93 g, 9.21 mmol) was dissolved in 92 mL anhydrous THF, and the resulting solution was cooled to 0° C. To this was added n-BuLi (4.79 mL, 2.5M solution in hexane, 12.0 mmol) dropwise via syringe. The solution was allowed to warm slowly to room temperature with stirring over 2 h, at which point isopropoxy(pinacolborane) (2.63 mL, 12.9 mmol) was added via syringe and the resulting mixture was stirred overnight at room temperature. The reaction was quenched with 2 mL H$_2$O, and then the solvents were removed under vacuum, taking care not to heat the mixture excessively. The resulting residue was dissolved in 100 mL CH$_2$Cl$_2$, washed with 100 mL brine, then dried over MgSO$_4$, filtered and concentrated to afford a yellow solid. This material was triturated with MeOH. The solid softened and turned to an oil upon initial addition of MeOH, then the product precipitated as a light yellow powder (3.55 g product, 69.7% yield). $^1$H NMR (400 MHz, CDCl$_3$) δ 8.47 (s, 1H), 8.01 (d, J=9.1 Hz, 2H), 7.92 (d, J=2.7 Hz, 1H), 7.65 (d, J=8.8 Hz, 2H), 7.43 (m, 3H), 7.34 (ddd, J=8.8, 6.5, 1.3 Hz, 2H), 4.63 (s, 2H), 1.86 (s, 3H), 1.75 (s, 2H), 1.40 (s, 6H), 1.37 (s, 12H), 0.81 (s, 9H). $^{13}$C{$^1$H} NMR (101 MHz, CDCl$_3$) δ 159.09, 145.39, 135.02, 134.56, 134.26, 131.51, 131.41, 130.88, 128.17, 127.51, 126.39, 125.34, 125.19, 100.22, 83.79, 57.03, 55.37, 38.53, 32.61, 32.17, 31.86, 25.03.

C3-4. Preparation of Comparative Ligand C3

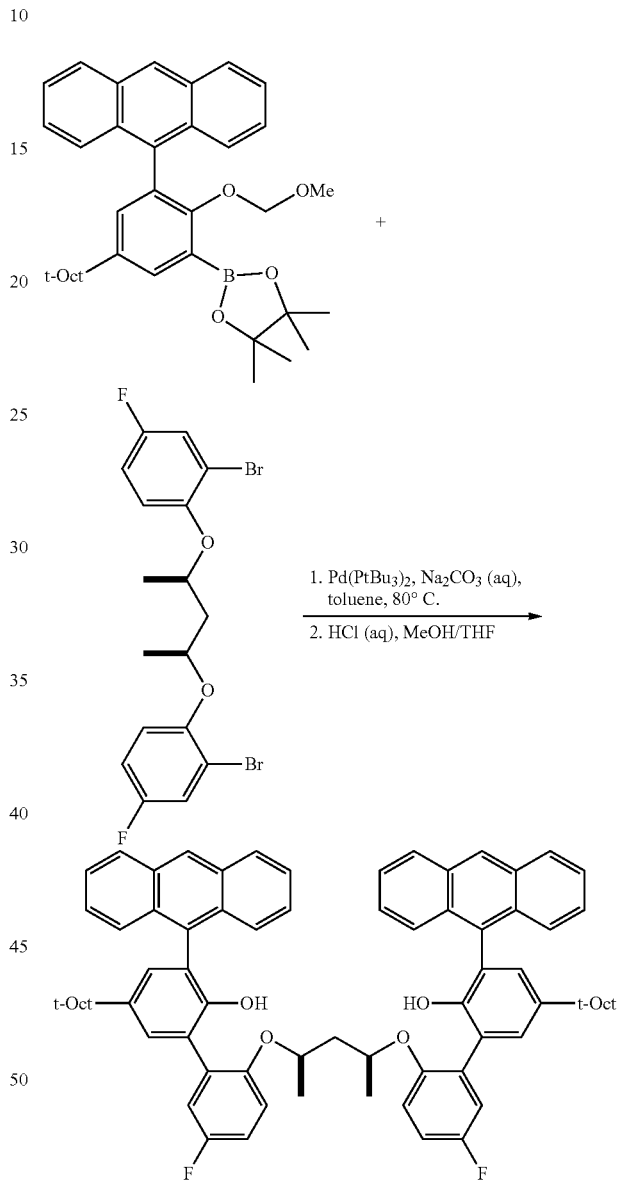

To a 100 mL flask containing the top group boronate ester (1.08 g, 1.96 mmol) under $N_2$ was added the di-bromo fragment (0.400 g, 0.889 mmol), Na$_2$CO$_3$ (0.565 g, 5.33 mmol), Pd(P$^t$Bu$_3$)$_2$ (0.018 g, 0.036 mmol), 30 mL of degassed THF, and 10 mL of degassed water. The system was sparged with $N_2$, and then was heated under reflux for 24 h. The reaction was cooled and the volatiles were removed by rotary evaporation. The residue was taken up in Et$_2$O, washed with brine, dried over anhydrous MgSO$_4$, filtered through a pad of SiO$_2$ then concentrated to give protected ligand. For THP deprotection, THF (20 mL) was added, and the mixture was stirred until ligand was dissolved. To this was added 20 mL of MeOH and 2 drops of concentrated HCl. This mixture was heated under reflux for 1 hour, then removed from heat, and concentrated under vacuum. Added 50 mL water, and extracted with 80 mL Et$_2$O. The organic layer was collected and dried over MgSO$_4$, filtered, and concentrated under vacuum. This material was purified by column chromatography, eluting with 1→15% EtOAc/hexane; however, the isolated material contained an impurity, possibly singly coupled product. This material was subjected to a second column chromatography, eluting with 1→15% acetone/hexane, furnishing the desired product as a light yellow powder (0.228 g, 24.4% yield). $^1$H NMR (400 MHz, CDCl$_3$) δ 8.52 (s, 2H), 8.04 (dd, J=15.5, 8.5 Hz, 4H), 7.68 (dd, J=13.9, 8.8 Hz, 4H), 7.42 (m, 2H), 7.38 (d, J=2.5 Hz, 2H), 7.34 (m, 2H), 7.30 (d, J=2.4 Hz, 2H), 7.26 (m, 4H), 7.16 (dd, J=9.1, 3.1 Hz, 2H), 6.68 (td, J=8.4, 8.0, 3.2 Hz, 2H), 6.54 (dd, J=9.0, 4.7 Hz, 2H), 5.96 (s, 2H), 4.39 (q, J=6.1 Hz, 2H), 2.08 (dt, J=14.2, 7.0 Hz, 1H), 1.74 (s, 4H), 1.62 (dt, J=14.3, 5.4 Hz, 1H), 1.40 (s, 6H), 1.39 (s, 6H), 1.03 (d, J=6.1 Hz, 6H), 0.81 (s, 18H). $^{13}$C{$^1$H} NMR (101 MHz, CDCl$_3$) δ 159.07, 156.68, 149.59, 149.57, 142.29, 133.69, 131.74, 131.70, 131.68, 130.71, 130.67, 129.22, 128.67, 126.94, 126.77, 126.69, 126.16, 125.55, 125.52, 125.28, 125.23, 118.98, 118.75, 116.78, 116.69, 115.42, 115.20, 73.92, 57.32, 42.65, 38.32, 32.62, 32.13, 31.98, 31.94, 19.57. $^{19}$F{$^1$H} NMR (376 MHz, CDCl$_3$) δ −121.15.

C3-4. Preparation of Comparative Procatalyst C3

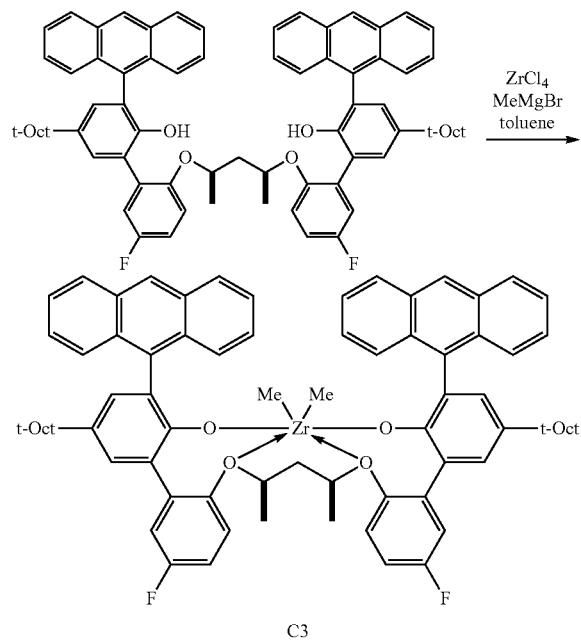

C3

In a glovebox, in an oven dried 40 mL scintillation vial with a stir bar was suspended ZrCl$_4$ (0.077 g, 0.332 mmol) in 8.3 mL toluene (anhydrous). The suspension was cooled to −30° C. MeMgBr (0.465 mL, 3.0M solution in Et$_2$O, 1.40 mmol) was added to the cold suspension with stirring. After 2 min, the solution darkened, and ligand C3 (0.350 g, 0.332 mmol), was added. This mixture was allowed to warm to room temperature, and stirred overnight. The solvent was removed under vacuum to yield a brown solid, which was washed with ca. 80 mL hexane, then extracted with ca. 80 mL toluene, and filtered. The filtrate was concentrated to afford the product as a light brown powder (0.229 g, 58.8% yield). $^1$H NMR (400 MHz, C$_6$D$_6$) δ 8.37-8.25 (m, 4H), 8.21 (d, J=8.8 Hz, 2H), 7.95 (m, 2H), 7.80 (dd, J=8.5, 4.1 Hz, 2H), 7.55 (dd, J=4.9, 2.5 Hz, 2H), 7.40 (d, J=2.5 Hz, 1H), 7.34 (d, J=2.5 Hz, 1H), 7.32-7.19 (m, 4H), 7.14-6.99 (m, 6H), 6.48 (dddd, J=9.0, 7.4, 3.2, 1.6 Hz, 2H), 4.27 (dd, J=8.9, 5.3 Hz, 1H), 4.13 (dd, J=8.9, 5.0 Hz, 1H), 4.00 (m, 2H), 1.65-1.56 (m, 4H), 1.47 (dt, J=16.8, 8.9 Hz, 1H), 1.31 (s, 3H), 1.29 (s, 3H), 1.27 (s, 3H), 1.25 (s, 3H), 1.12 (d, J=15.7 Hz, 1H), 0.88 (s, 9H), 0.83 (s, 9H), 0.43 (d, J=6.3 Hz, 3H), 0.29 (d, J=6.5 Hz, 3H), −1.21 (s, 3H), −1.29 (s, 3H). $^{19}$F{$^1$H} NMR (376 MHz, C$_6$D$_6$) δ −115.36, −115.68.

Comparative Example C4

C4-1. Preparation of Comparative Example C4

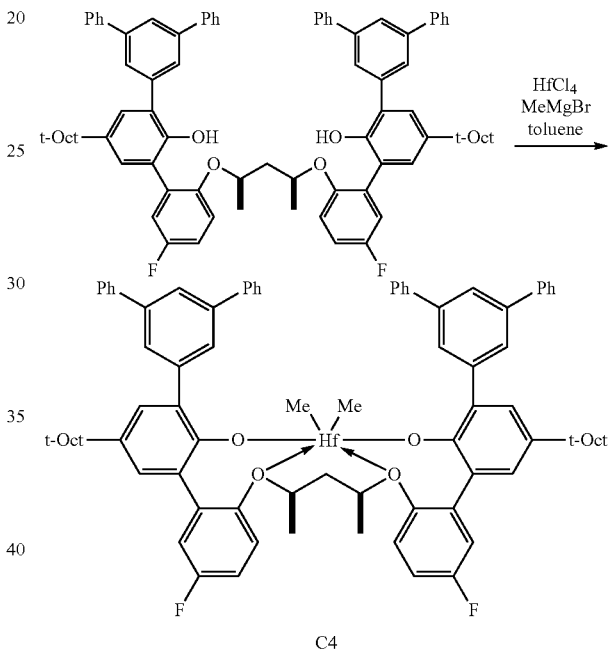

C4

To a vial equipped with a stir bar in a glovebox was added HfCl$_4$ (0.277 g, 0.864 mmol) and anhydrous toluene (22 mL). The mixture was cooled to −30° C. and to this was added MeMgBr (1.21 mL, 3.0M solution in Et$_2$O, 3.63 mmol). The resultant suspension was stirred for 10 min after which ligand C1 (1.00 g, 0.864 mmol) was added to the cold suspension with stirring. The reaction was warmed to room temperature and stirred overnight. The reaction was then concentrated to afford a dark solid, which was washed with hexane (100 mL). To the resulting solid material was added toluene (100 mL), and the resulting suspension was filtered. The filtrate was concentrated to furnish the produce as a tan solid (0.801 g, 68%). $^1$H NMR (400 MHz, C$_6$D$_6$) δ 8.34 (s, 2H), 8.23 (s, 2H), 7.98 (t, J=1.8 Hz, 1H), 7.92 (t, J=1.7 Hz, 1H), 7.75 (d, J=2.5 Hz, 1H), 7.70 (d, J=2.6 Hz, 1H), 7.66 (m, 8H), 7.23 (m, 9H), 7.12 (m, 5H), 7.02 (dd, J=8.9, 3.1 Hz, 1H), 6.63 (m, 2H), 5.82 (dd, J=8.9, 5.1 Hz, 1H), 5.57 (dd, J=8.9, 5.1 Hz, 1H), 4.40 (p, J=7.1 Hz, 1H), 3.65 (m, 1H), 1.78-1.53 (m, 4H), 1.42 (m, 1H), 1.34 (s, 6H), 1.32 (s, 3H), 1.31 (s, 3H), 0.80 (s, 9H), 0.72 (s, 9H), 0.67 (d, J=6.0 Hz, 3H), 0.63 (m, 1H), 0.40 (d, J=6.8 Hz, 3H), −0.28 (s, 3H), −0.44 (s, 3H). $^{19}$F{$^1$H} NMR (376 MHz, C$_6$D$_6$) δ −114.21, −114.35.

Comparative Example C5

C5-1. Preparation of Comparative Example C5

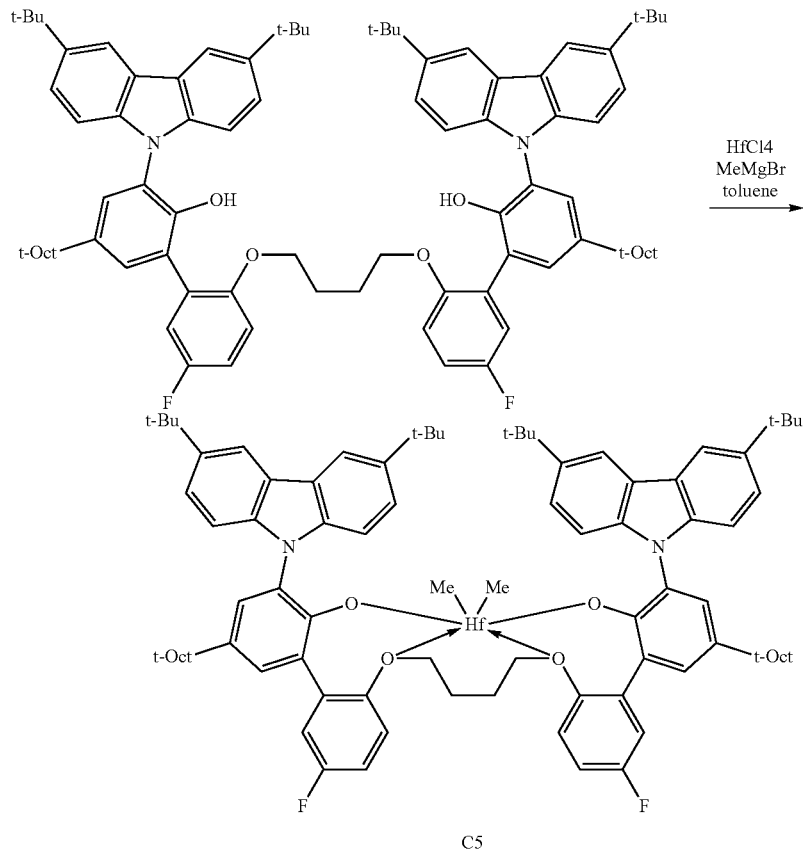

Ligand C2 (7.41 g, 5.96 mmol) and HfCl$_4$ (1.91 g, 5.96 mmol) were suspended in 280 mL toluene in a jar in a glove-box. The Grignard reagent (3.0 M in Et$_2$O, 11.9 mL, 35.8 mmol) was slowly added dropwise to the yellow mixture via syringe. After the addition of the Grignard reagent, the solution turned slightly dark tan. The solution was stirred at room temperature overnight (black in color the next morning). The solution was reduced to dryness under vacuum, and the solids were extracted with 250 mL hexane. The mixture was filtered and the remaining dark solids were washed with an additional 250 mL hexane. The combined filtrates were filtered once more and reduced to dryness to give pure product (6.957 g, 80.5%). $^1$H NMR (400 MHz, CDCl$_3$) δ 8.31 (d, J=1.6 Hz, 2H), 8.07 (d, J=1.5 Hz, 2H), 7.59 (d, J=2.3 Hz, 2H), 7.45 (dd, J=8.6, 1.7 Hz, 2H), 7.37 (dd, J=8.8, 1.8 Hz, 2H), 7.34 (d, J=8.6 Hz, 2H), 7.25 (d, J=2.3 Hz, 2H), 7.22 (d, J=8.6 Hz, 2H), 6.92 (dd, J=9.1, 3.1 Hz, 2H), 6.36 (m, 2H), 4.59 (dd, J=9.1, 4.9 Hz, 2H), 4.02 (br m, 2H) 3.46 (d, J=12.2 Hz, 2H), 1.75 (s, 4H), 1.55 (s, 18H), 1.40 (s, 6H), 1.38 (s, 18H), 1.33 (s, 6H), 1.12 (br s, 4H), 0.79 (s, 18H), −1.79 (s, 6H).

Comparative Example C6

The preparation of this compound was previously reported in PCT Int. Appl. Publication No. WO2011025784.

Inventive Example I1a

I1a-1. Preparation of 5,5'-(((meso)-pentane-2,4-diyl)bis(oxy))bis(4-bromo-1,2-difluorobenzene)

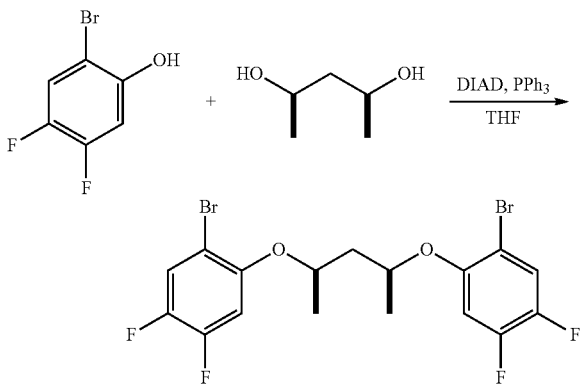

THF (25 mL) was added to a 250 mL round-bottomed flask charged with 2-bromo-4,5-difluorophenol (2.53 g, 12.1 mmol) and (meso)-pentane-2,4-diol (0.6 g, 5.76 mmol). The mixture was cooled to 0° C. then the PPh$_3$ (3.17 g, 12.1 mmol) and DIAD (2.38 mL, 12.1 mmol) were added sequentially. The reaction was stirred for 18 h while the cold bath slowly expired. The volatiles were then removed under reduced pressure. Pentane (10 mL) was added to the crude residue, which was subsequently removed under reduced pressure, this was then repeated. Pentane (25 mL) was added again, and solid triphenylphosphine oxide precipitated. The solid was removed by filtration then washed with pentane (25 mL). The pentane layers were combined and the solvent was removed under reduced pressure. The desired product was crystallized from pentane (8 mL) to afford 1.75 grams of the product. The mother liquor was concentrated, and the resulting material was treated with pentane/Et$_2$O (3:1, 2 mL) and cooled to −15° C. for 17 h. The yellow solvent was removed, leaving white crystals behind (300 mg). The crystals were washed with cold pentane (2 mL) to afford a combined total of 2 g (71%) of the title compound as a white solid. $^1$H NMR (400 MHz, CDCl$_3$) δ 7.40 (dd, J=9.5, 8.4 Hz, 2H), 6.89 (dd, J=11.9, 7.0 Hz, 2H), 4.54 (h, J=6.2 Hz, 2H), 2.37 (dt, J=13.7, 6.7 Hz, 1H), 1.87 (dt, J=14.3, 5.9 Hz, 1H), 1.38 (d, J=6.1 Hz, 6H). $^{13}$C{$^1$H} NMR (101 MHz, CDCl$_3$) δ 150.49 (dd, J$_{CF}$=7.6, 2.7 Hz), 149.61 (dd, J$_{CF}$=248.7, 13.5 Hz), 144.49 (dd, J$_{CF}$=245.3, 13.5 Hz), 121.51 (dd, J$_{CF}$=20.8, 1.4 Hz), 106.48 (dd, J$_{CF}$=7.0, 3.9 Hz), 104.25 (d, J$_{CF}$=21.3 Hz), 73.27, 42.41, 19.69. $^{19}$F{$^1$H} NMR (376 MHz, CDCl$_3$) δ −135.23 (d, J=21.8 Hz), −145.32 (d, J=21.7 Hz).

I1a-2. Preparation of Inventive Ligand I1a

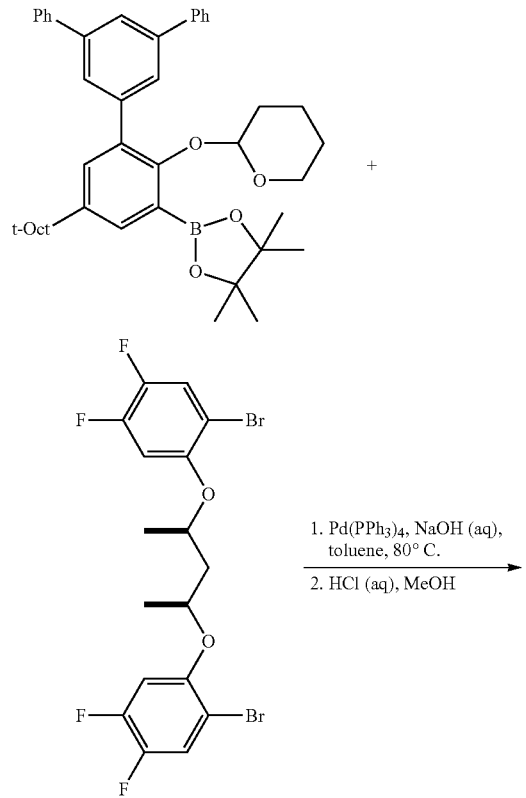

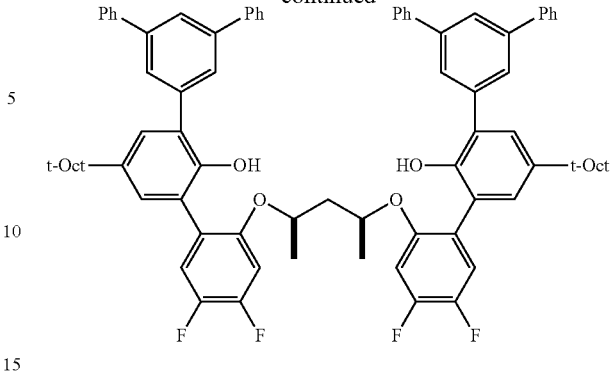

Degassed toluene (10 mL) and degassed water (2 mL) were added to a 40 mL vial charged with 4,4,5,5-tetramethyl-2-(5'-phenyl-2-((tetrahydro-2H-pyran-2-yl)oxy)-5-(2,4,4-trimethylpentan-2-yl)-[1,1':3',1''-terphenyl]-3-yl)-1,3,2-dioxaborolane (2.51 g, 3.89 mmol), 5,5'-(((meso)-pentane-2,4-diyl)bis(oxy))bis(4-bromo-1,2-difluorobenzene) (0.84 g, 1.73 mmol), and solid NaOH (0.410 g, 10.4 mmol). The mixture was sparged with N$_2$ for 5 min then solid Pd(PPh$_3$)$_4$ (0.100 g, 0.090 mmol) was added to the vial. The reaction was heated to 85° C. and maintained at this temperature for 17 h while stirring vigorously. After this time, the reaction was cooled to room temperature. The mixture was transferred to a separatory funnel, toluene (10 mL) and water (8 mL) were added, and the layers were separated. The organics were washed with water (5 mL), brine (5 mL), dried (Na$_2$SO$_4$), and filtered. MeOH (10 mL) was added to the toluene solution from above then concentrated HCl (8 drops from a glass pipet) was added. The flask was fitted with a condenser then the mixture was heated to 75° C. and maintained at this temperature for 3 h. After this time, the reaction was cooled to room temperature, and about half of the solvent volume was removed under reduced pressure. Water (10 mL) and CH$_2$Cl$_2$ (15 mL) were added to the crude residue, then the phases were transferred to a separatory funnel and separated. The aqueous phase was further extracted with CH$_2$Cl$_2$ (15 mL) and the combined organic extracts were washed with brine (10 mL), dried (Na$_2$SO$_4$) then passed through a SiO$_2$ plug. The plug was washed with CH$_2$Cl$_2$ (65 mL) to ensure all material was collected (monitored by TLC). Three purifications were needed to obtain product. CH$_2$Cl$_2$ (15 mL) was added to the concentrate then CELITE was added to the organic phase. The solvent was removed under reduced pressure and the resulting solid material was directly loaded onto a precolumn and purified using flash column chromatography (80 g SiO$_2$, 0% EtOAc to 20% EtOAc in hexanes). The isolated material was then purified using SiO$_2$ chromatography (40 g SiO$_2$, 0% acetone to 10% acetone in hexanes). A final reverse phase C18 chromatography purification, starting with water/CH$_3$CN, then switching to CH$_3$CN/THF afforded 1.00 g (49%) of the ligand as a white powder. $^1$H NMR (400 MHz, CDCl$_3$) δ 7.79 (t, J=1.7 Hz, 2H), 7.73 (d, J=1.7 Hz, 4H), 7.70-7.63 (m, 8H), 7.48-7.42 (m, 10H), 7.39-7.33 (m, 4H), 7.17-7.10 (m, 4H), 6.63 (dd, J=11.5, 6.8 Hz, 2H), 5.83 (s, 2H), 4.32-4.20 (m, 2H), 2.08-1.92 (m, 1H), 1.73 (s, 4H), 1.65-1.46 (m, 1H), 1.38 (app d, J=6.1 Hz, 12H), 1.06 (app d, J=6.1 Hz, 6H), 0.76 (s, 18H). $^{13}$C{$^1$H} NMR (101 MHz, CDCl$_3$) δ 149.83 (dd, J$_{CF}$=250.1, 13.7 Hz), 149.76 (dd, J$_{CF}$=7.4, 2.0 Hz), 147.87, 145.41 (dd, J$_{CF}$=243.5, 12.5 Hz), 142.43, 141.91, 141.10, 139.61, 128.99, 128.80, 128.75, 128.61, 127.47, 127.32, 127.28, 125.77 (dd, J$_{CF}$=5.3, 3.6 Hz), 125.08, 124.33, 120.24 (d, $J_{CF}$=18.4 Hz), 105.27 (d, $J_{CF}$=19.7 Hz), 74.06, 57.03, 42.03, 38.12, 32.45, 31.93, 31.72, 31.57, 19.51. $^{19}F\{^1H\}$ NMR (376 MHz, CDCl$_3$) δ −134.76 (d, J=22.4 Hz), −145.15 (d, J=22.4 Hz).

I1a-3. Preparation of Inventive Catalyst I1a

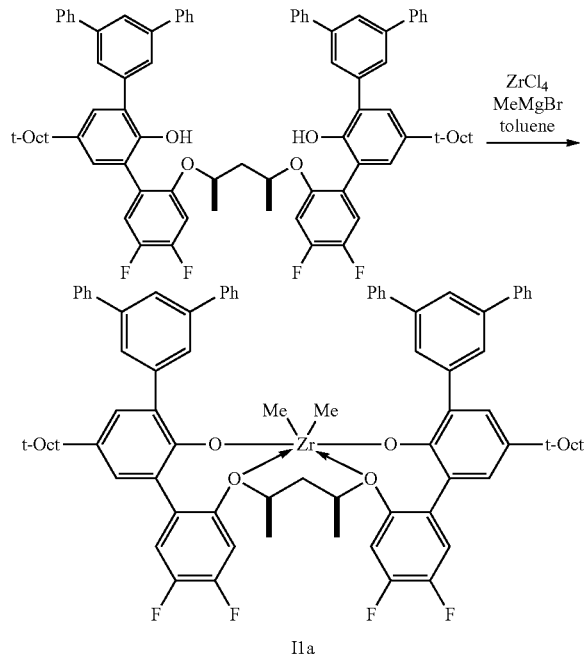

In a glovebox, in an oven dried 40 mL scintillation vial with a stir bar, suspended ZrCl$_4$ (0.06 g, 0.25 mmol) in toluene (8 mL, anhydrous). Cooled mixture to −30° C. in a freezer, removed from the freezer, then added 3M MeMgBr in Et$_2$O (0.38 mL) with stirring. The solution was stirred for 5 min, then solid ligand I1a (0.3 g, 0.25 mmol) was added. The reaction was stirred while slowly warming to room temperature, and stirring was continued for 18 h. The reaction was filtered through a fritted funnel containing a pad of CELITE, and the solid was washed with toluene (5 mL). The solvent was removed under reduced pressure to yield a tan solid. Hexane (15 mL) was added to the solid, then the solution was filtered through a fritted funnel containing a pad of CELITE. The filter cake was washed with hexanes (10 mL), then the combined hexanes layer was concentrated under reduced pressure to provide 80 mg of the procatalyst. The filter cake was then extracted with CH$_2$Cl$_2$ (10 mL). The CH$_2$Cl$_2$ extract was concentrated to dryness to afford a powder. This powder was again treated with CH$_2$Cl$_2$ (10 mL), and the solution was passed through a syringe filter to remove the insolubles. The solvent was removed to provide 100 mg of procatalyst for a total of 0.18 g (53%) of the I1a as an off-white powder. $^1H$ NMR (400 MHz, C$_6$D$_6$) δ 8.39 (br s, 2H), 8.29 (br s, 2H), 8.23-8.17 (m, 1H), 8.17-8.12 (m, 1H), 7.85-7.70 (m, 10H), 7.28-7.18 (m, 8H), 7.14-7.09 (m, 5H), 7.05-6.92 (m, 2H), 6.87 (dd, J=10.6, 8.9 Hz, 1H), 5.52 (dd, J=10.6, 7.2 Hz, 1H), 5.33 (dd, J=10.6, 7.1 Hz, 1H), 4.29-4.21 (m, 1H), 3.60-3.47 (m, 1H), 1.77 (dd, J=14.6, 7.6 Hz, 2H), 1.63 (dd, J=28.7, 14.6 Hz, 2H), 1.41-1.24 (m, 14H), 0.81 (s, 9H), 0.72 (s, 9H), 0.53 (d, J=6.1 Hz, 3H), 0.28 (d, J=6.8 Hz, 3H), −0.10 (s, 3H), −0.25 (s, 3H). $^{19}F\{^1H\}$ NMR (376 MHz, C$_6$D$_6$) δ −136.63 (d, J=22.8 Hz), −137.27 (d, J=23.0 Hz), −137.67 (d, J=22.9 Hz), −137.91 (d, J=22.7 Hz).

Inventive Example I1b

I1b-1. Preparation of 2-bromo-3,4,5-trifluorophenol

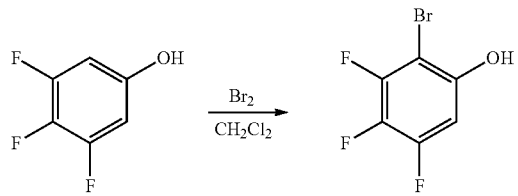

To a jar equipped with a stir bar was added the trifluorophenol (25 g, 168 mmol, 1 equiv) dissolved in CH$_2$Cl$_2$ (500 mL). Bromine (12.9 mL, 253 mmol, 1.5 equiv) was added dropwise at room temperature and the solution allowed to the stir overnight. The reaction monitored by $^1H$ NMR, and quenched with saturated aqueous NaHSO$_3$ when complete. The biphasic solution was stirred until the red color completely dissipated and the layers were then separated. The organic layer was washed with brine, was filtered through a SiO$_2$ plug and eluted with CH$_2$Cl$_2$. The filtrate was concentrated to give the product as a clear colorless compound (36.5 g, 95%). $^1H$ NMR (400 MHz, C$_6$D$_6$) δ 5.98 (ddd, J=11.3, 6.5, 2.3 Hz, 1H), and 4.65 (s, 1H). $^{19}F\{^1H\}$ NMR (376 MHz, C$_6$D$_6$) δ −126.15 (dd, J=21.8, 6.0 Hz), −134.45 (dd, J=22.0, 5.4 Hz), and −167.51 (t, J=20.8 Hz). $^{13}C\{^1H\}$ NMR (101 MHz, CDCl$_3$) δ 151.02 (ddd, $J_{CF}$=248, 11, 5 Hz), 148.82 (ddd, $J_{CF}$=249, 12, 6 Hz), 148.70 (dt, $J_{CF}$=13, 4 Hz), 135.20 (dt, $J_{CF}$=249, 16 Hz), 99.85 (ddd, $J_{CF}$=22, 4, 2 Hz), 94.00 (dd, $J_{CF}$=21, 4 Hz).

I1b-2. Preparation of 5,5'-(((meso)-pentane-2,4-diyl)bis(oxy))bis(4-bromo-1,2,3-trifluorobenzene)

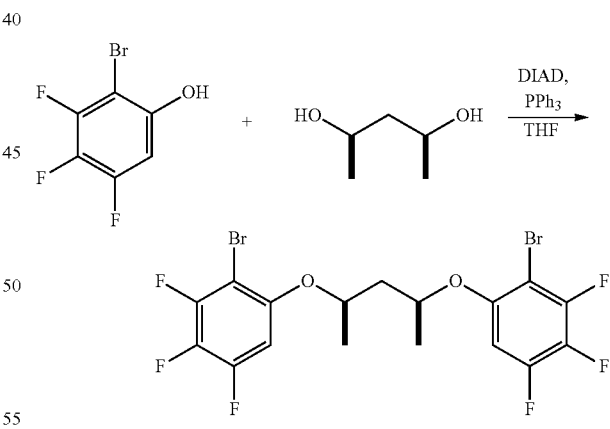

In a 100 mL round bottomed flask was placed the diol (0.5 g, 4.8 mmol, 1 equiv) dissolved in THF (30 mL). The flask was cooled to 0° C., add the phenol (2.3 g, 10.1 mmol, 2.1 equiv) followed by PPh$_3$ (2.64 g, 10.1 mmol, 2.1 equiv) and DIAD (1.96 g, 10.1 mmol, 2.1 equiv). The reaction was allowed to warm to 23° C. and stirred overnight. When complete by TLC, the reaction was quenched with sat. aq. NH$_4$Cl, extracted with Et$_2$O, dried with brine and MgSO$_4$, filtered and concentrated. Trituration with pentanes to remove triphenylphosphine oxide followed by concentration to remove the pentanes provided the bottom group as a white solid. (61% yield). $^1$H NMR (400 MHz, C$_6$D$_6$) δ 6.20 (ddd, J=11.9, 6.3, 2.3 Hz, 2H), 3.89 (sextet, J=6.2 Hz, 2H), 1.92 (dt, J=14.2, 6.6 Hz, 1H), 1.25 (dt, J=14.2, 5.8 Hz, 1H), 0.83 (d, J=6.0 Hz, 6H). $^{19}$F{$^1$H} NMR (376 MHz, C$_6$D$_6$) δ −123.98 (dd, J=22.3, 4.3 Hz), −134.54 (dd, J=22.8, 5.5 Hz), and −166.82 (t, J=22.3 Hz). $^{13}$C{$^1$H} NMR (101 MHz, CDCl$_3$) δ 151.57, 151.52, 151.47, 151.42, 150.96, 150.90, 150.84, 150.78, 150.10, 150.06, 150.02, 150.00, 149.96, 149.93, 149.11, 149.06, 149.00, 148.95, 148.50, 148.45, 148.39, 148.33, 136.35, 136.19, 133.89, 133.73, 98.21, 98.18, 97.99, 97.96, 96.81, 96.76, 96.62, 96.57, 72.62, 41.55, 18.91.

I1b-3. Preparation of Inventive Ligand I1b

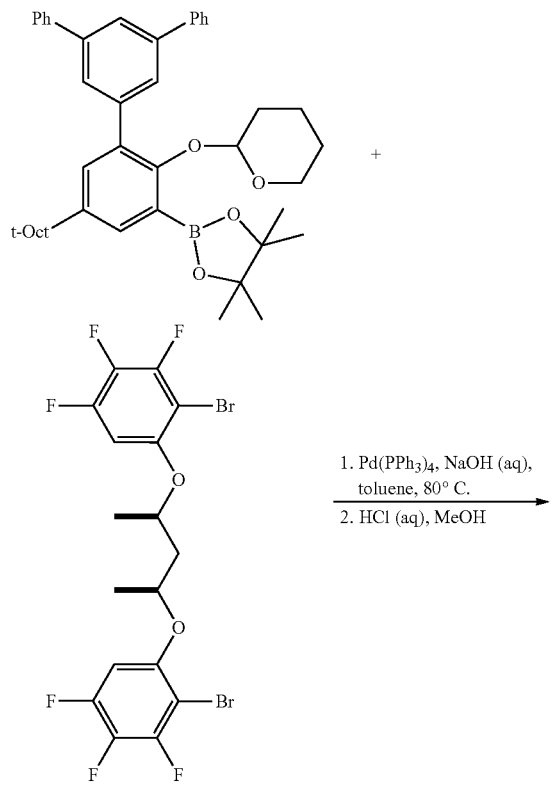

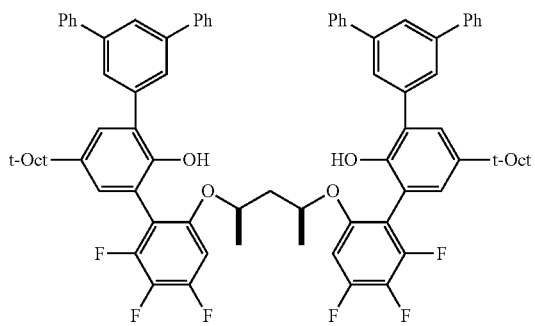

To a 250 mL flask containing the boronate ester (1.78 g, 2.95 mmol) under N$_2$ was added the aryl bromide (0.70 g, 1.34 mmol), NaOH (0.322 g, 8.04 mmol), Pd(PPh$_3$)$_4$ (0.062 g, 0.054 mmol), 5.6 mL of degassed toluene, and 1.1 mL of degassed water. The system was sparged with N$_2$. The reaction was heated to 110° C. for 72 h. The reaction was cooled and the volatiles were removed by rotary evaporation. The residue was taken up in Et$_2$O (100 mL), washed with brine (100 mL), dried over MgSO$_4$, filtered through a pad of SiO$_2$, then concentrated to give protected ligand. For THP deprotection step, this material was dissolved in 20 mL of THF, and 20 mL of MeOH was added, followed by approximately 5 drops of concentrated HCl. This mixture was heated under reflux for 1 hour, then cooled and concentrated under vacuum. Et$_2$O (250 mL) was added, and the resulting solution was washed with water (200 mL). The organic portion was separated and dried over MgSO$_4$, filtered and concentrated under vacuum. This crude material was further purified by column chromatography on SiO$_2$, eluting with a 0→10% EtOAc/hexane gradient, furnishing the product (1.18 g, 72% yield) as a white solid. $^1$H NMR (400 MHz, CDCl$_3$) δ 7.81 (m, 2H), 7.67 (m, 12H), 7.42 (m, 14H), 7.11 (m, 2H), 6.41 (m, 2H), 5.25 (m, 2H), 4.25 (m, 2H), 1.96 (m, 1H), 1.72 (m, 4H), 1.50 (m, 1H), 1.36 (m, 12H), 1.08 (m, 6H), 0.75 (m, 18H). $^{19}$F{$^1$H} NMR (376 MHz, CDCl$_3$) δ −132.22 (m, 2F), −133.50 (m, 1F), −133.77 (m, 1F), −168.33 (m, 1F), −169.14 (m, 1F).

I1b-4. Preparation of Inventive Example I1b

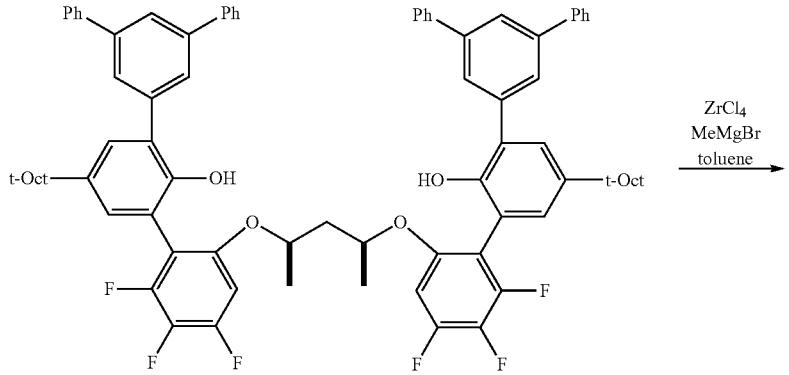

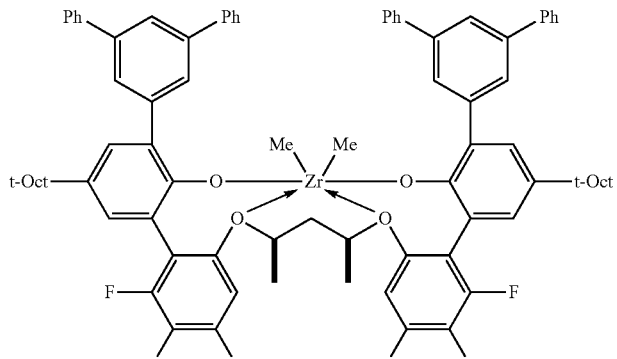

I1b

To a vial equipped with a stir bar in a glovebox was added $ZrCl_4$ (0.147 g, 0.631 mmol) and anhydrous toluene (16 mL). The mixture was cooled to −30° C. and to this was added MeMgBr (0.884 mL, 3.0M solution in $Et_2O$, 2.65 mmol). The resultant suspension was stirred for 2 min after which ligand I1b (0.776 g, 0.631 mmol) was added to the cold suspension with stirring. The reaction was warmed to room temperature and stirred overnight. The reaction was then concentrated to afford a dark solid, which was washed with hexane (100 mL), and filtered. The filtrate was concentrated to furnish the product as a yellow solid, which was washed with hexane (20 mL), affording the product as a white powder (0.171 g). Extracting the remaining filter cake with toluene (100 mL), followed by filtering and drying the filtrate under vacuum, afforded an additional 0.485 g of the product as a tan solid. The combined yield was 0.656 g (77%). $^1H$ NMR (400 MHz, $C_6D_6$) δ 8.34 (br s, 2H), 8.23 (br s, 2H), 8.16 (s, 1H), 8.11 (s, 1H), 7.80 (d, J=2.5 Hz, 1H), 7.74 (m, 9H), 7.39-7.17 (m, 12H), 7.15 (m, 2H), 5.28 (m, 1H), 5.06 (m, 1H), 4.15 (m, 1H), 3.53 (m, 1H), 1.86-1.60 (m, 4H), 1.41 (s, 3H), 1.40 (s, 3H), 1.35 (s, 3H), 1.32 (s, 3H), 1.05 (ddd, J=16.3, 11.6, 8.7 Hz, 1H), 0.86 (s, 9H), 0.77 (s, 9H), 0.52 (d, J=6.1 Hz, 3H), 0.50 (m, 1H), 0.26 (d, J=6.7 Hz, 3H), −0.15 (s, 3H), −0.28 (s, 3H). $^{19}F\{^1H\}$ NMR (376 MHz, $C_6D_6$) δ −133.93 (dd, J=22.5, 5.1 Hz, 1F), −134.57 (m, 2F), −135.35 (dd, J=22.7, 4.9 Hz, 1F), −158.99 (t, J=22.7 Hz, 1F), −159.49 (t, J=22.6 Hz, 1F).

Inventive Example I2

I2-1. Preparation of 1,4-bis(2-bromo-3,4,5-trifluorophenoxy)butane

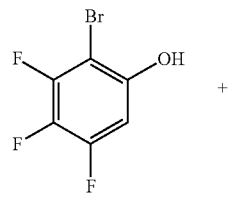

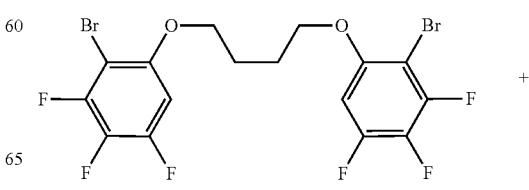

To a 500 mL round bottom flask was added 2-bromo-3,4,5-trifluorophenol (15.00 g, 66.09 mmol), 1,4-dibromobutane (2.631 mL, 22.03 mmol), $K_2CO_3$ (12.178 g, 88.11 mmol) and DMSO (240 mL). The flask was affixed with the Stevens condenser and heated to 50° C. overnight. The following day it was then heated to 100° C. for 1 hour. The reaction mixture was added to water that formed an emulsion. The aqueous suspension was extracted with $CH_2Cl_2$. The organic layer was dried over $MgSO_4$, filtered and concentrated. The solid was washed with hexane to remove impurities, yielding an off white powder. Collected 7.68 g, 68.7% yield. $^1H$ NMR (400 MHz, $C_6D_6$) δ 5.92 ((ddd, J=11.1, 6.1, 1.8 Hz, 2H),), 3.12 (m, 4H), and 1.50 (m, 4H). $^{19}F\{^1H\}$ NMR (376 MHz, $C_6D_6$) δ −124.7 (dd, J=22.8, 5.8 Hz), −134.79 (dd, J=22.0, 5.9 Hz), and −167.39 (t, J=21.5 Hz).

I2-2. Preparation of Inventive Ligand I2

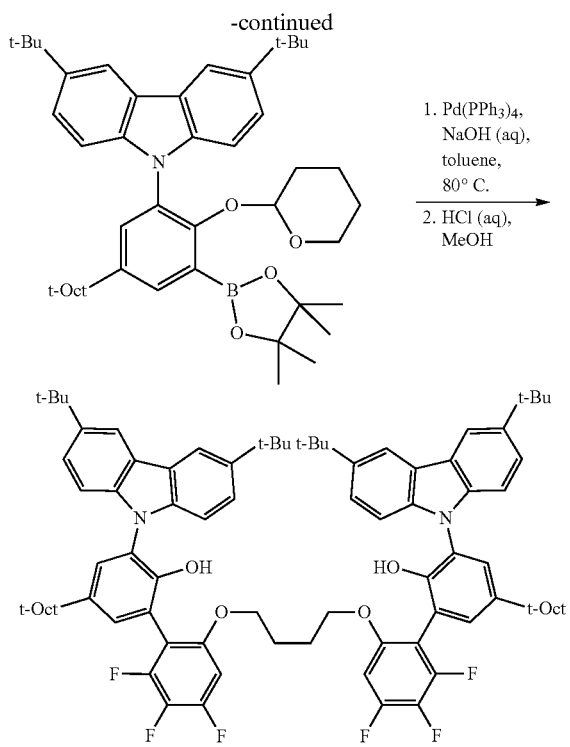

To a 40 mL vial equipped with a stir bar was added the borylated fragment (6.009 g, 8.66 mmol) and the dibromo fragment (2.00 g, 3.94 mmol), $N_2$-sparged toluene (15 mL) and a solution of NaOH (0.945 g, 23.62 mmol) dissolved in water (1 mL) were added to the vial followed quickly by the $Pd(PPh_3)_4$ (0.182 g, 0.16 mmol) dissolved in $N_2$-sparged toluene (1 mL). The vial was heated under $N_2$ at 80° C. and monitored by LCMS until complete. When complete, the aqueous bottom layer was removed and a 20% aqueous solution of HCl (1 mL) was added. The reaction mixture was heated at 80° C. overnight. When complete, it was cooled to room temperature, the aqueous layer was removed, then washed with brine, dried over $MgSO_4$, filtered and concentrated under vacuum. The thick oil was taken up in MeOH and filtered to collect the solid. Purified via flash chromatography on $SiO_2$, eluting with 9:1 hexane: acetone. Collected 2.73 g (52.8% yield) as a white solid. $^1H$ NMR (400 MHz, $C_6D_6$) δ 8.38 (ddd, J=11.1, 6.1, 1.8 Hz, 2H), 7.55-7.22 (m, 20H), 3.33 (tq, J=9.0, 4.0 Hz, 4H), 1.61-1.32 (m, 36H), 1.31-1.11 (m, 14H), 0.93-0.78 (m, 21H). $^{13}C\{^1H\}$ NMR (101 MHz, $CDCl_3$) δ 148.77, 148.71, 143.54, 143.49, 143.41, 143.35, 142.46, 139.98, 139.87, 130.22, 124.65, 124.52, 124.45, 124.37, 124.28, 124.24, 124.01, 123.67, 118.23, 116.80, 116.73, 116.51, 109.80, 109.39, 68.42, 56.74, 37.85, 34.50, 34.47, 32.14, 32.11, 31.74, 31.71, 31.67, 31.64, 31.34, 31.12, 31.02, 25.44. $^{19}F\{^1H\}$ NMR (376 MHz, $C_6D_6$) δ −133.62 (m), −134.52 (m), and −169.9 (m)

I2-3. Preparation of Inventive Example I2

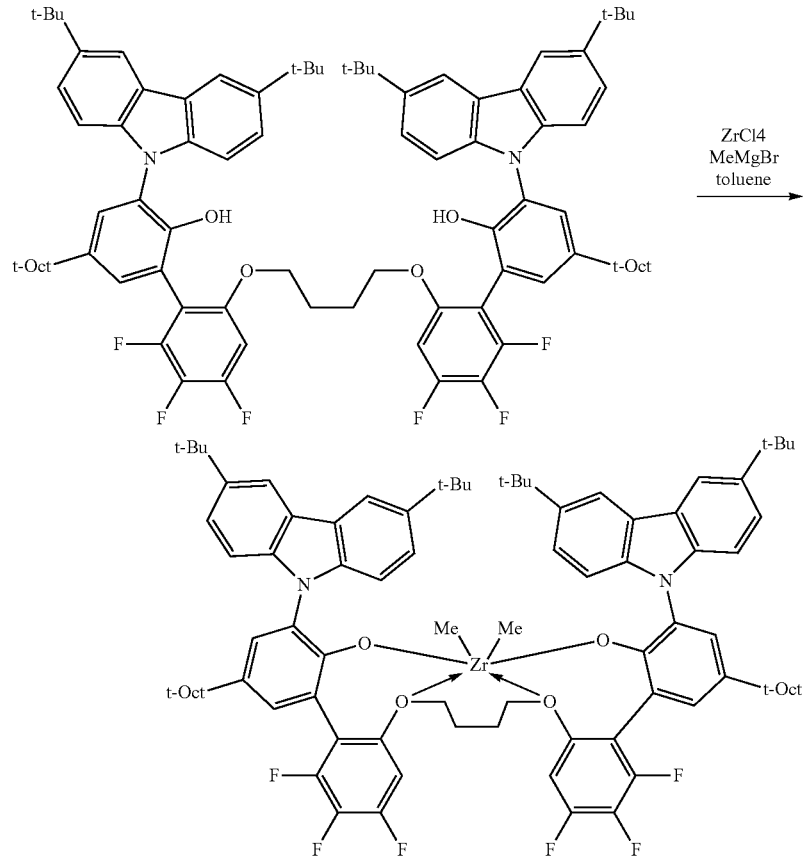

I2

To a jar equipped with a stir bar in a glovebox was added ZrCl$_4$ (0.056 g, 0.228 mmol) dissolved in (10 mL). The jar was cooled to −30° C. and to this was added MeMgBr (0.304 mL, 0.913 mmol) and the resultant solution was stirred 15 min after which the I2 ligand (0.300 g, 0.228 mmol) was added to the cold suspension with stirring. The reaction was warmed to 20-25° C. and stirred for 3 h. The reaction was filtered and concentrated and then extracted with hexanes. The hexanes layers were combined and concentrated to provide the procatalyst as an off-white solid (0.28 g, 84%). $^1$H NMR (400 MHz, C$_6$D$_6$) δ 8.71-8.66 (m, 2H), 8.44-8.38 (m, 2H), 7.73-7.49 (m, 8H), 7.38 (dd, J=8.8, 1.9 Hz, 4H), 7.31 (dd, J=3.7, 2.3 Hz, 2H), 7.16 (p, J=1.1 Hz, 4H), 4.84-4.74 (m, 2H), 3.88-3.80 (m, 2H), 3.32 (d, J=11.7 Hz, 2H), 1.57 (s, 24H), 1.40-1.16 (m, 28H), 0.94-0.79 (m, 16H), −0.76 (s, 6H). $^{19}$F{$^1$H} NMR (376 MHz, C$_6$D$_6$) δ −131.4 (dd, J=22.4, 5.0 Hz), −133.47 (dd, J=22.6, 5.4 Hz), and −160.99 (t, J=22.9 Hz).

Inventive Example I3

I3-1. Preparation of 6',6'''-(((meso)-pentane-2,4-diyl)bis(oxy))bis(2',3',4'-trifluoro-5-(2,4,4-trimethyl-pentan-2-yl)-[1,1'-biphenyl]-2-ol)

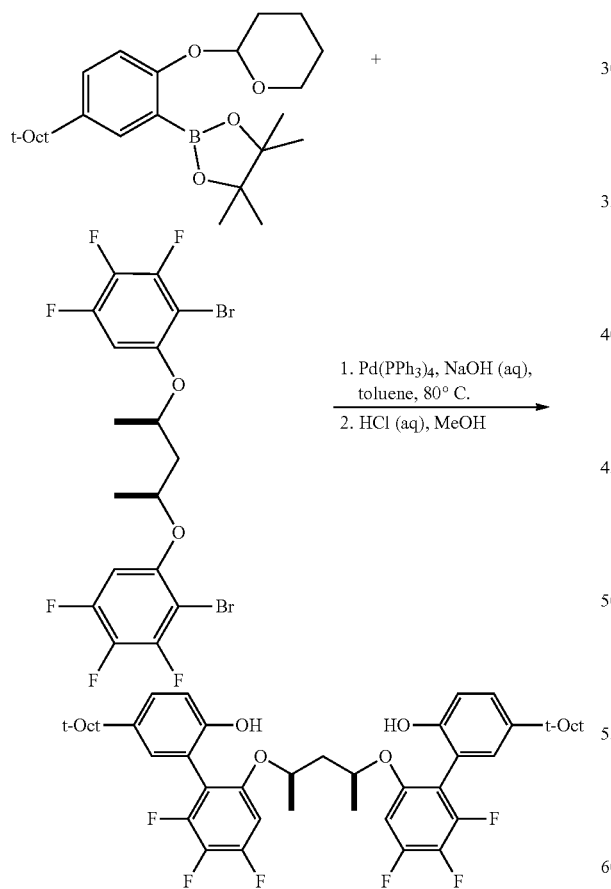

To a two-necked 500 mL round bottom flask equipped with a stir bar was added the THP-protected fragment (9.16 g, 22.0 mmol) followed by the multi-flourinated fragment (5.22 g, 10.0 mmol). Toluene (30 mL) and aqueous NaOH (2.40 g, 60.0 mmol, in 8 mL H$_2$O) were added to the flask followed by N$_2$ sparging for 15 min. Pd(PPh$_3$)$_4$ (0.462 g, 0.40 mmol) was dissolved in 17 mL dry, degassed toluene and injected into the reaction mixture. The reaction was heated under an atmosphere of N$_2$ at 80° C. for 18 h. HPLC and GC-MS analyses indicated the formation of product, but incomplete conversion. An additional quantity of the THP-protected fragment (4.50 g, 1.08 equiv.) was added in 10 mL dry, degassed toluene, along with 0.02 additional equivalents of Pd(PPh$_3$)$_4$, also in 109 mL of dry, degassed toluene. The resulting mixture was heated to 80° C. until complete conversion as indicated by GC-MS and HPLC. The reaction was worked up with the addition of EtOAc and water. The organic layer was separated and washed thoroughly with brine, dried with anhydrous MgSO$_4$, filtered, and concentrated. The resulting residue was dissolved in 60 mL THF, and was added to 60 mL water containing several drops of concentrated HCl, followed by heating at 80° C. for 3 h. The cooled reaction mixture was worked up with the addition of EtOAc and brine. The organic layer was separated and washed thoroughly with brine, dried with anhydrous MgSO$_4$, filtered, and concentrated. SiO$_2$ flash column chromatography on the concentrated mixture using a gradient mixture of EtOAc and hexanes provided 7.67 g of the desired product in 99% yield. $^1$H NMR (400 MHz, C$_6$D$_6$) δ 7.37-7.28 (m, 2H), 7.15-7.03 (m, 2H), 6.98-6.88 (m, 2H), 6.61-6.50 (m, 1H), 6.45-6.36 (m, 1H), 5.33-5.04 (m, 2H), 4.37-4.23 (m, 1H), 4.20-4.06 (m, 1H), 1.75-1.64 (m, 4H), 1.41-1.20 (m, 16H), 1.10-1.01 (m, 3H), 0.93-0.81 (m, 3H), 0.80-0.59 (m, 18H). $^{19}$F{$^1$H} NMR (376 MHz, C$_6$D$_6$) δ −131.97, −132.74 (m, 2F), −133.23, −133.77 (m, 2F), −167.57 (dt, J=83.7, 22.4 Hz, 1F), −168.24 (dt, J=109.9, 22.4 Hz, 1F).

I3-2. Preparation of Inventive Ligand I3

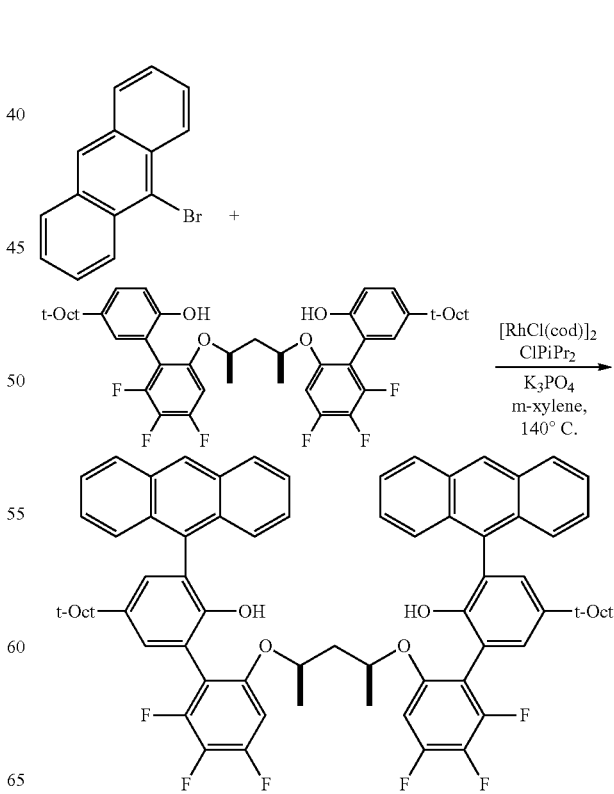

A solution of chlorodiisopropylphosphine (0.197 g, 0.5 equiv.) and Rh precursor (0.25 equiv. of Rh monomer or 0.125 equiv of Rh dimer) in m-xylene (2 mL) was added to a mixture of 9-bromoanthracene (2.00 g, 7.78 mmol), the bisphenolic fragment (2.00 g, 2.59 mmol), and $K_3PO_4$ (2.20 g, 10.37 mmol) in 8 mL m-xylene. The mixture was heated at 140° C. for 15 h. HPLC analysis of the reaction mixture indicated the formation of desired product along with a minor amount of the reaction intermediate (ortho-arylation on only one side of the bisphenolic substrate). The reaction was cooled to ambient temperature, and dried under vacuum. The crude residue was subjected to normal phase flash column chromatography using a gradient mixture of acetone and hexanes (up to ca. 15% acetone), yielding 1.08 g (37% yield) of the L3 ligand. $^1H$ NMR (400 MHz, $C_6D_6$) δ 8.62-8.49 (m, 2H), 8.15-7.97 (m, 4H), 7.80-7.19 (m, 15H), 7.17-7.08 (m, 1H), 6.52-6.40 (m, 1H), 6.30-6.13 (m, 1H), 4.73-4.51 (m, 2H), 4.44-4.26 (m, 2H), 2.16-1.98 (m, 2H), 1.84-1.61 (m, 4H), 1.49-1.28 (m, 12H), 1.25-0.95 (m, 6H), 0.92-0.72 (m, 18H). $^{19}F\{^1H\}$ NMR (376 MHz, $C_6D_6$) δ −132.86 (ddd, J=44.6, 23.0, 6.0 Hz, 1F), −133.39 (ddd, J=23.1, 17.1, 5.9 Hz, 1F), −134.36 (ddd, J=22.0, 10.5, 5.9 Hz, 1F), −135.03 (ddd, J=23.2, 18.1, 5.9 Hz, 1F), −169.22-169.73 (m, 2F).

In a glove box, $ZrCl_4$ (0.025 g, 0.107 mmol) was suspended in 2.8 mL anhydrous toluene in a scintillation vial equipped with a stir bar. The reaction vial was then chilled to −36° C. in the freezer. To the chilled mixture was added MeMgBr (0.15 mL of 3.0 M solution in ether, 0.44 mmol) with stirring. The mixture turned dark after 3 to 4 min. Ligand 13 (0.120 g, 0.107 mmol) was added to the mixture followed by stirring for 3 h. The volatiles were removed under vacuum and the brown residue was washed thoroughly with hexanes and separated by vacuum filtration. The filtrate was concentrated to yield 0.022 g of the desired complex as a light yellow solid. The brown residue on the filter was washed with toluene. Upon removal of toluene from the filtrate under vacuum, 0.101 g of a yellow solid was isolated and subsequently identified as desired product. The combined yield was 0.123 g (93%). $^1H$ NMR (400 MHz, $C_6D_6$) δ 8.54-8.46 (m, 2H), 8.32-8.25 (m, 1H), 8.24-8.13 (m, 5H), 7.84-7.78 (m, 2H), 7.60-7.54 (m, 2H), 7.48-7.19 (m, 7H), 7.13-6.93 (m, 5H), 4.07-3.88 (m, 3H), 3.84-3.74 (m, 1H), 1.67-1.54 (m, 4H), 1.50-1.35 (m, 2H), 1.35-1.21 (m, 12H), 0.86 (d, J=17.8 Hz, 18H), 0.35 (d, J=6.3 Hz, 3H), 0.22 (d, J=6.3 Hz, 3H), −1.14 (s, 3H), −1.22 (s, 3H). $^{19}F\{^1H\}$ NMR (376 MHz, $C_6D_6$) δ −133.57 (ddd, J=46.6, 22.4, 5.4 Hz, 2F), −134.68 (dd, J=22.4, 5.1 Hz, 1F), −135.13 (dd, J=22.5, 5.4 Hz, 1F), −160.58 (t, J=22.4 Hz, 1F), −161.02 (t, J=22.5 Hz, 1F).

I3-3. Preparation of Inventive Procatalyst I3

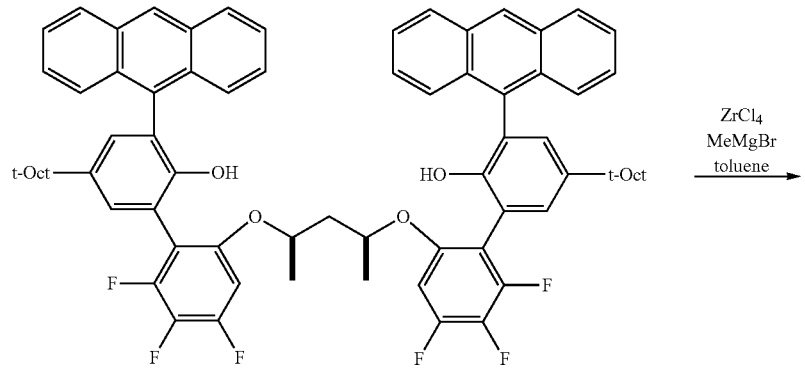

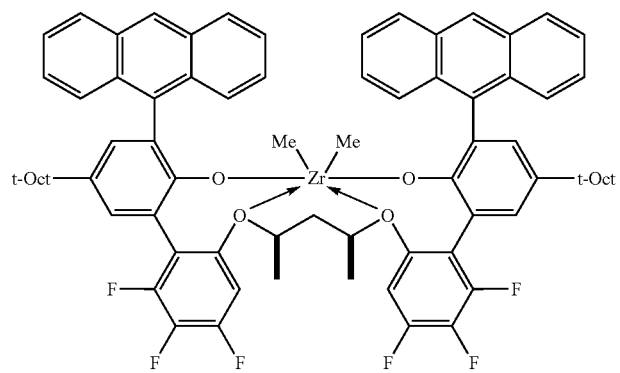

I3

Inventive Example I4

I1b-4. Preparation of Inventive Example I4

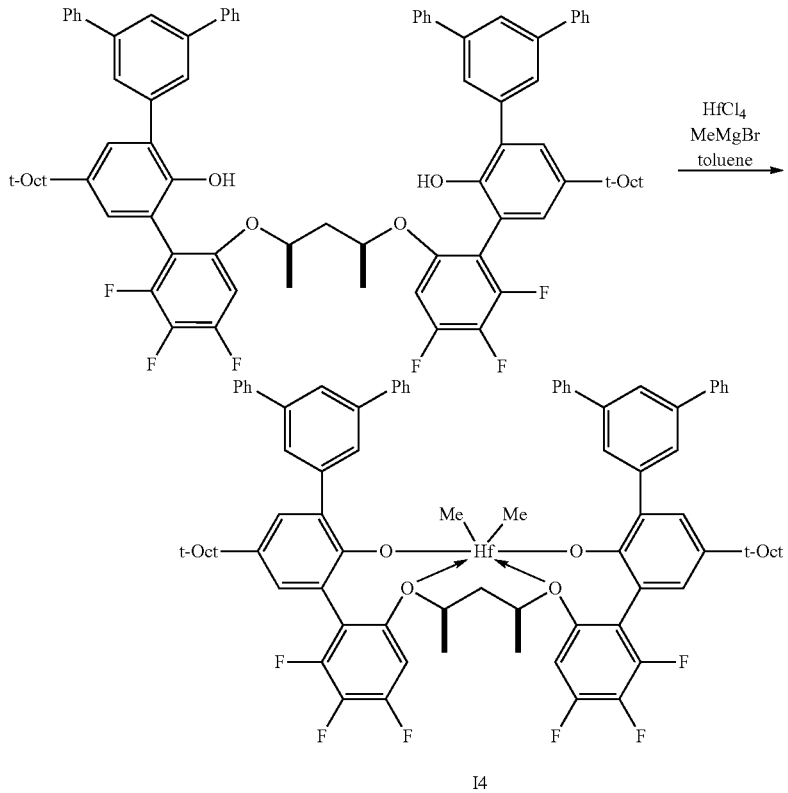

I4

To a vial equipped with a stir bar in a glovebox was added HfCl$_4$ (0.078 g, 0.244 mmol) and anhydrous toluene (6 mL). The mixture was cooled to −30° C. and to this was added MeMgBr (0.342 mL, 3.0M solution in Et$_2$O, 1.02 mmol). The resultant suspension was stirred for 10 min after which ligand I1b (0.300 g, 0.244 mmol) was added to the cold suspension with stirring. The reaction was warmed to room temperature and stirred for 4 h. The reaction was then concentrated to afford a dark solid, which was washed with hexane (100 mL), and filtered. The filtrate was dried, affording the product as a tan powder (0.126 g). Extracting the remaining filter cake with toluene (80 mL), followed by filtering and drying the filtrate under vacuum, afforded an additional 0.217 g of the product as a tan solid. The combined yield was 0.343 g (98%). $^1$H NMR (400 MHz, C$_6$D$_6$) δ 8.32 (s, 2H), 8.19 (s, 2H), 8.17 (s, 1H), 8.11 (s, 1H), 7.82 (d, J=2.5 Hz, 1H), 7.80-7.68 (m, 9H), 7.38-7.17 (m, 11H), 7.13 (m, 3H), 5.29 (m, 1H), 5.08 (m, 1H), 4.22 (p, J=7.3 Hz, 1H), 3.58 (m, 1H), 1.85-1.60 (m, 4H), 1.41 (s, 3H), 1.40 (s, 3H), 1.35 (s, 3H), 1.32 (s, 3H), 1.12 (m, 1H), 0.86 (s, 9H), 0.76 (s, 9H), 0.53 (d, J=5.8 Hz, 3H), 0.50 (m, 1H), 0.27 (d, J=6.7 Hz, 3H), −0.35 (s, 3H), −0.49 (s, 3H). $^{19}$F{$^1$H} NMR (376 MHz, C$_6$D$_6$) δ −133.92 (dd, J=22.5, 5.0 Hz, 1F), −134.64 (d, J=22.7 Hz, 2F), −135.45 (dd, J=22.9, 4.9 Hz, 1F), −158.81 (t, J=22.4 Hz, 1F), −159.36 (t, J=22.3 Hz, 1F).

Inventive Example I5

I5-1. Preparation of Inventive Example I5

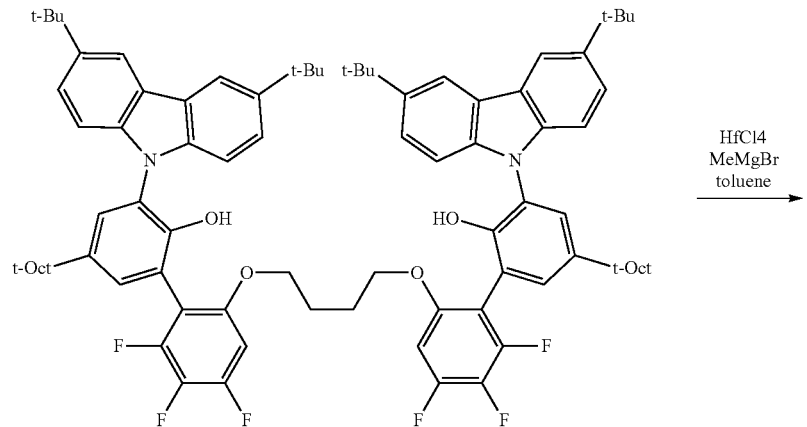

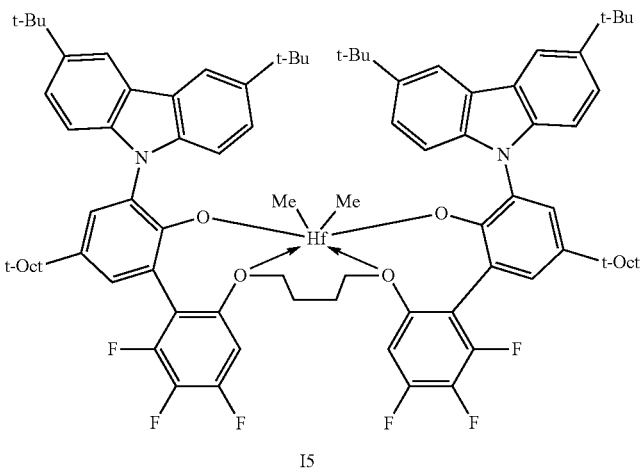

I5

To a jar equipped with a stir bar in a glovebox was added HfCl₄ (0.066 g, 0.205 mmol) dissolved in toluene (10 mL). The jar was cooled to −30° C. and to this was added MeMgBr (0.26 mL, 0.779 mmol). The resultant solution was stirred 15 min after which the I2 ligand (0.256 g, 0.195 mmol) was added to the cold suspension with stirring. The reaction was warmed to 20-25° C. and stirred for 3 h. The reaction was filtered and concentrated and then extracted with hexanes. The hexanes layers were combined and concentrated to provide the catalyst as an off-white solid (0.27 g, 91%). ¹H NMR (400 MHz, C₆D₆) δ 8.69 (d, J=1.8 Hz, 2H), 8.44-8.38 (m, 2H), 7.73-7.65 (m, 4H), 7.61 (d, J=8.5 Hz, 2H), 7.49 (dd, J=8.7, 0.7 Hz, 2H), 7.40-7.27 (m, 4H), 7.15 (p, J=1.0 Hz, 6H), 4.80 (ddd, J=10.7, 6.5, 1.9 Hz, 2H), 3.94 (dd, J=11.1, 5.6 Hz, 2H), 3.40 (d, J=11.5 Hz, 2H), 1.57 (s, 24H), 1.43-1.17 (m, 28H), 0.96-0.76 (m, 16H), −0.99 (s, 6H). ¹⁹F{¹H} NMR (376 MHz, C₆D₆) δ −131.12 (dd, J=23.3, 5.2 Hz), −133.38 (dd, J=22.4, 5.4 Hz), and −160.81 (t, J=22.4 Hz).

Inventive Example I6

I6-1. Preparation of 1,3-bis(2-bromo-3,4,5-trifluorophenoxy)propane

To a 40 mL vial equipped with a stir bar was added 2-bromo-3,4,5-trifluorophenol (5.86 g, 25.8 mmol), 1,3-dibromo propane (0.874 mL, 8.6 mmol), K₂CO₃ (4.76 g, 34.4 mmol) and DMSO (15 mL). The vial was heated to 50° C. overnight, then heated to 100° C. for 1 hour. The following day the reaction mixture was cooled and water (8 mL) added that resulted in the formation of a white precipitate. The solid was filtered, washed with water and dissolved in CH₂Cl₂ where it was dried over MgSO₄. The filtrate was then collected and concentrated under vacuum. The resultant pale pink solid was passed through a plug of SiO₂ with toluene as the eluent to provide the desired compound as a white solid (3.57 g, 84%). ¹H NMR (400 MHz, C₆D₆) δ 5.92 (m, 2H), 3.32 (t, J=5.9 Hz, 4H), and 1.59 (p, J=5.9 Hz, 2H). ¹⁹F{¹H} NMR (376 MHz, C₆D₆) δ −124.68, (dd, J=22.7, 6.1 Hz), −134.5 (dd, J=22.1, 5.8 Hz), and −167.05 (t, J=22.1 Hz). ¹³C{¹H} NMR (101 MHz, CDCl₃) δ 151.76-151.87 (m), 151.34-151.71 (m), 150.99-151.11 (m), 149.35-149.4 (m), 148.54-148.71 (m), 136.59-136.92 (m), 134.13-134.46 (m), 97.30-97.07 (m), 95.87-96.12 (m), 65.71, and 28.39.

I6-1. Preparation of Inventive Ligand I6

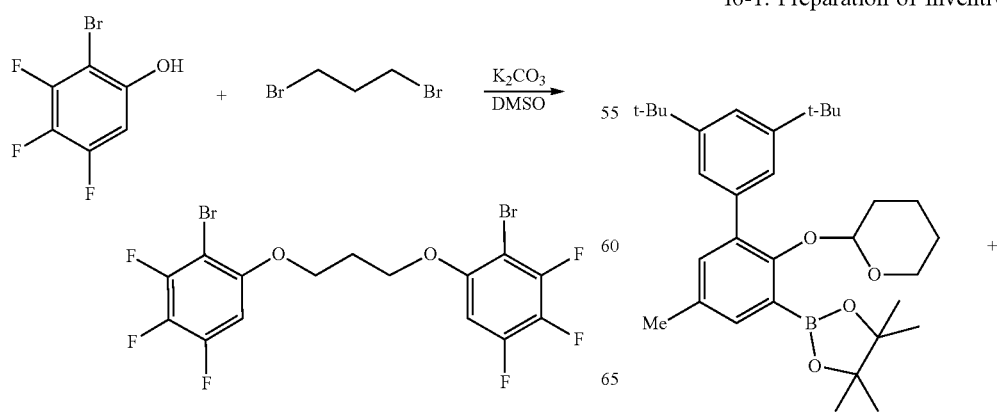

-continued

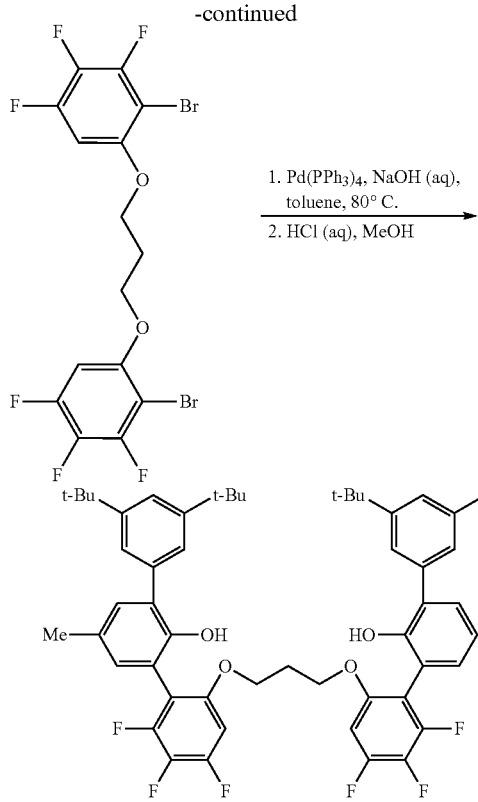

To a 40 mL vial equipped with a stir bar was added the borylated fragment (1.88 g, 4.45 mmol) and the dibromo- compound (1.00 g, 2.02 mmol). $N_2$ sparged toluene (15 mL) and a solution of NaOH (0.486 g, 12.1 mmol) dissolved in water (1 mL) were added to the vial followed quickly by the $Pd(PPh_3)_4$ (0.094 g, 0.08 mmol) dissolved in $N_2$-sparged toluene (1 mL). The vial was heated under $N_2$ at 80° C. and monitored by LCMS until complete. When complete, the aqueous bottom layer was removed and a 20% aqueous solution of HCl (1.00 mL) was added. The reaction mixture was heated at 80° C. overnight. When complete, it was cooled to room temperature, the aqueous layer was removed, then washed with brine, dried over $MgSO_4$, filtered and concentrated on the rotovap. Purification was accomplished via flash chromatography on $SiO_2$ using a gradient of 9:1 hexane: acetone followed by a reverse phase C18 column with water:$CH_3CN$, 70 to 100% $CH_3CN$ gradient. Collected 1.37 g (89.4% yield) of product as a white solid. $^1H$ NMR (400 MHz, $C_6D_6$) δ 7.55-7.54 (m, 2H), 7.47-7.37 (m, 4H), 7.23-7.17 (m, 4H), 6.87 (td, J=5.7, 2.1 Hz, 2H), 6.07 (dtd, J=7.9, 5.9, 2.9 Hz, 2H), 5.26 (d, J=2.4 Hz, 2H), 3.35-3.21 (m, 4H), 2.17-2.11 (m, 6H), 1.40 (d, J=3.6 Hz, 2H), 1.37-1.29 (m, 2H), 1.29-1.17 (m, 32H). $^{19}F\{^1H\}$ NMR (376 MHz, $C_6D_6$) δ −132.48 (m), −134.52 (m), and −170.32 (m). $^{13}C\{^1H\}$ NMR (101 MHz, $CDCl_3$) δ 151.79, 151.76, 148.76, 148.68, 136.88, 136.84, 136.82, 131.80, 131.72, 131.50, 131.43, 129.95, 129.93, 129.86, 129.25, 129.22, 129.19, 128.31, 127.91, 127.79, 127.67, 127.55, 127.43, 123.49, 121.73, 117.33, 117.28, 113.32, 96.83, 65.54, 64.96, 64.79, 34.67, 34.60, 34.49, 31.58, 31.28, 31.14, 27.91, 27.77, 27.61, 26.87, 25.27, 22.67, 20.51, 20.11, 20.06, 13.97.

I6-1. Preparation of Inventive Procatalyst I6

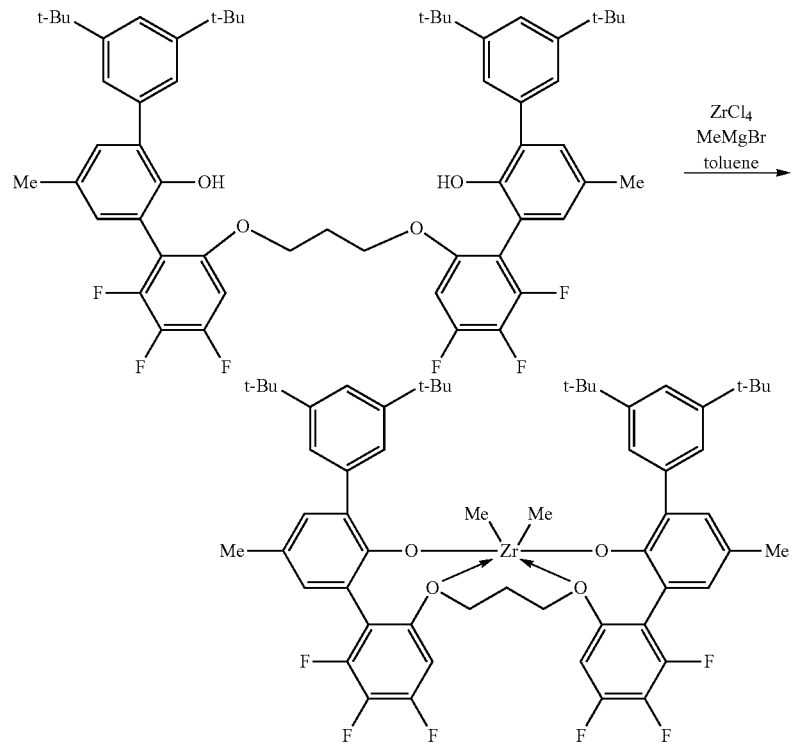

I6

To a jar equipped with a stir bar in a glovebox was added ZrCl$_4$ (0.079 g, 0.34 mmol), and toluene (10 mL) and was cooled to −30° C. To this was added MeMgBr (0.432 mL of a 3M solution in Et$_2$O, 1.29 mmol) and the resultant solution was stirred 15 min after which the ligand (0.300 g, 0.324 mmol) was added to the cold suspension with stirring. The reaction was warmed to 20-25° C. and stirred for 3 h. The reaction was filtered and concentrated and then extracted with hexanes. The hexanes layers were combined and concentrated to provide the procatalyst as an off-white solid (0.22 g, 59%). $^1$H NMR (400 MHz, C$_6$D$_6$) δ 7.78 (t, J=1.9 Hz, 2H), 7.56 (s, 1H), 7.31 (d, J=2.3 Hz, 2H), 7.16 (t, J=1.3 Hz, 3H), 6.91 (t, J=2.8 Hz, 2H), 4.96 (ddd, J=9.9, 6.7, 2.0 Hz, 2H), 3.40 (dt, J=9.8, 4.7 Hz, 2H), 2.96 (dt, J=10.6, 5.6 Hz, 2H), 2.16 (s, 6H), 1.49-1.21 (m, 33H), 0.93-0.85 (m, 1H), 0.60-0.50 (m, 2H), 0.14 (s, 6H). $^{19}$F{$^1$H} NMR (376 MHz, C$_6$D$_6$) δ −132.64 (dd, J=22.1, 5.3 Hz), −133.65 (dd, J=22.5, 5.1 Hz), and −160.19 (t, J=22.7 Hz).

Inventive Examples

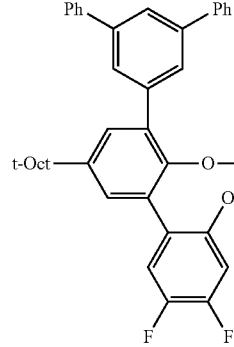

I1a

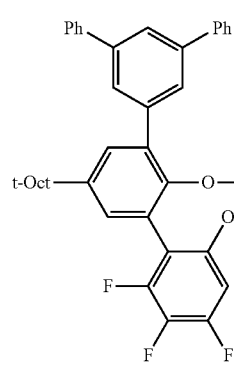

I1b

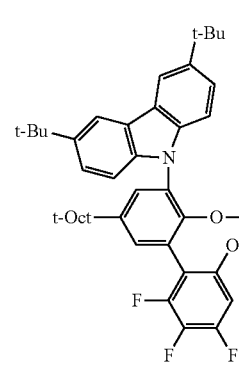

I2

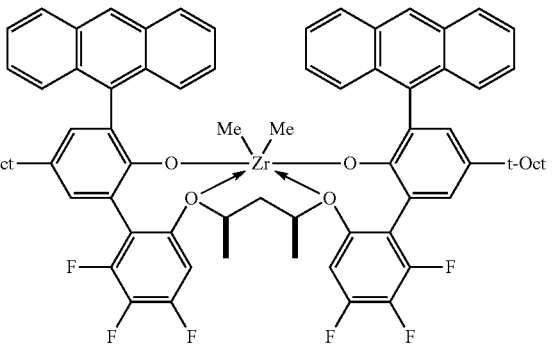

I3

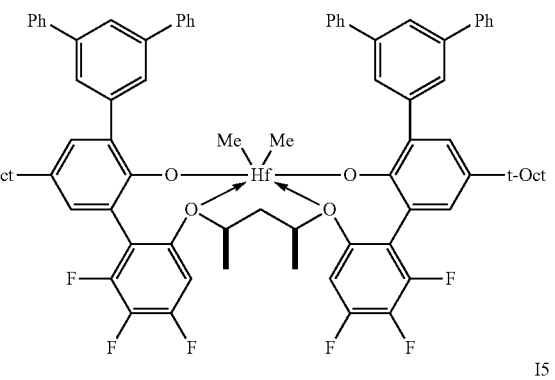

I4

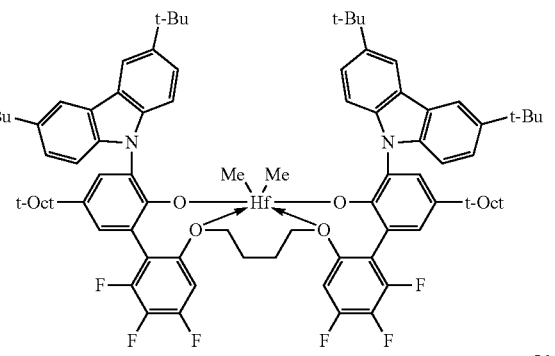

I5

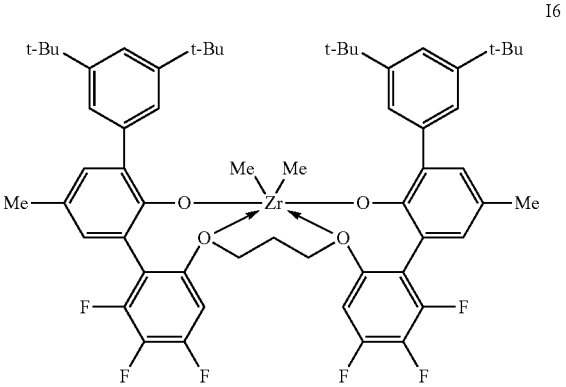

I6

Polymerization

Comparative Catalysts 1-6 and Inventive Catalysts 1-6 were used to polymerize ethylene and 1-octene in a 2-liter Parr batch polymerization reactor. All feeds were passed through columns of alumina and Q-5 catalyst (available from Engelhard Chemicals Inc.) prior to introduction into the polymerization reactor. Procatalyst and activator solutions were handled in a glove box under $N_2$ atmosphere prior to addition to the polymerization reactor.

Table 1 illustrates the batch polymerizations and resulting polymer information under the following conditions: reactor temperature: 147° C.; ISOPAR-E: 1325 mL; 1-octene: 250 g; ethylene pressure: 450 psi; Run time: 10 min. bis(hydrogenated tallow alkyl)methyl, tetrakis(pentafluorophenyl)borate(1-) amine: 1.1 equiv; MMAO: 50 equiv. ISOPAR-E is an isoparaffinic solvent which is commercially available from ExxonMobil Chemical Company (Bayport Tex.). Table 1 provides the polymerization results for such batch polymerization.

TABLE 1

| Catalyst | Efficiency | $T_C$ (° C.) | $T_M$ (° C.) | Density (g/cc) | MWD | Mw (g/mole) |
|---|---|---|---|---|---|---|
| C1 | 600,719 | 60.9 | 70.4 | 0.881 | 2.07 | 953,614 |
| I1a | 580,257 | 44.2 | 56.6 | 0.872 | 2.24 | 1,089,333 |
| I1b | 1,019,469 | 28.9 | 45.3 | 0.862 | 2.14 | 1,177,777 |
| C2 | 4,346,682 | 70.1 | 90.1 | 0.890 | 2.13 | 262,402 |
| I2 | 1,270,306 | 54.4 | 68.1 | 0.879 | 1.98 | 161,162 |
| C3 | 3,805,390 | 76.0 | 90.6 | 0.891 | 2.30 | 563,880 |
| I3 | 2,405,556 | 58.0 | 70.3 | 0.880 | 2.12 | 612,736 |
| C4 | 112,178 | 62.8 | 72.6 | 0.883 | 2.26 | 370,312 |
| I4 | 47,958 | 25.8 | 42.8 | 0.864 | 2.47 | 391,543 |
| C5 | 831,046 | 64.4 | 76.0 | 0.884 | 2.06 | 1,340,810 |
| I5 | 349,226 | 48.9 | 61.1 | 0.875 | 2.68 | 719,492 |
| C6 | 3,580,929 | 74.4 | 89.4 | 0.891 | 2.10 | 546,212 |
| I6 | 2,626,319 | 36.8 | 52.5 | 0.867 | 2.43 | 468,871 |

Additional polymerization reactions were conducted in a continuous process under the following conditions:

Raw materials (ethylene, 1-octene) and the process solvent (a narrow boiling range high-purity isoparaffinic solvent trademarked ISOPAR E commercially available from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to above reaction pressure at 525 psig. The solvent and comonomer (1-octene) feed is pressurized via mechanical positive displacement pump to above reaction pressure at 525 psig. Modified methylaluminoxane (MMAO), commercially available from AkzoNobel, is used as an impurity scavenger. The individual catalyst components (procatalyst cocatalyst) are manually batch diluted to specified component concentrations with purified solvent (Isopar E) and pressured to above reaction pressure at 525 psig. The cocatalyst is $[HNMe(C_{18}H_{37})_2][B(C_6F_5)_4]$, commercially available from Boulder Scientific, and is used at a 1.2 molar ratio relative to the procatalyst. All reaction feed flows are measured with mass flow meters and independently controlled with computer automated valve control systems.

The continuous solution polymerizations are carried out in a 1 gallon continuously stirred-tank reactor (CSTR). The combined solvent, monomer, comonomer and hydrogen feed to the reactor is temperature controlled between 5° C. and 30° C. and is typically 15° C. All of these materials are fed to the polymerization reactor with the solvent feed. The catalyst is fed to the reactor to reach a specified conversion of ethylene. The cocatalyst is fed separately based on a calculated specified molar ratio (1.2 molar equivalents) to the catalyst component. The MMAO shares the same line as the cocatalyst and flow is based on either an Al concentration in the reactor or a specified molar ratio to the catalyst component. The effluent from the polymerization reactor (containing solvent, monomer, comonomer, hydrogen, catalyst components, and molten polymer) exits the reactor and is contacted with water to terminate polymerization. In addition, various additives such as antioxidants, can be added at this point. The stream then goes through a static mixer to evenly disperse the catalyst kill and additives.

Following additive addition, the effluent (containing solvent, monomer, comonomer, hydrogen, catalyst components, and molten polymer) passes through a heat exchanger to raise the stream temperature in preparation for separation of the polymer from the other lower-boiling reaction components. The stream then passes through the reactor pressure control valve, across which the pressure is greatly reduced. From there, it enters a two stage separation system consisting of a devolatizer and a vacuum extruder, where solvent and unreacted hydrogen, monomer, comonomer, and water are removed from the polymer. At the exit of the extruder, the strand of molten polymer formed goes through a cold-water bath, where it solidifies. The strand is then fed through a strand chopper, where the polymer is cut into pellets after being air-dried.

TABLE 2

| Pro-catalyst | Temp. (° C.) | Ethylene Conversion | $C_8$/olefin[A] | Eff. | $H_2$ (mol %)[C] | MI (dg/min) | $I_{10}/I_2$ | MWD | Density (g/cc) | Reactivity Ratio (r1) |
|---|---|---|---|---|---|---|---|---|---|---|
| C1 | 150 | 77 | 36.8 | 0.8 | 0.53 | 0.48 | 5.82 | 1.97 | 0.900 | 9.9 |
| I1b | 150 | 78 | 36.8 | 1.6 | 0.23 | 0.39 | 6.21 | 2.05 | 0.890 | 5.7 |

[A]$C_8$/olefin is defined as: (moles 1-octene/(total moles 1-octene and ethylene)) × 100, where the molar values are taken from the respective feed rates.

Test Methods

Test methods include the following:
Density

Samples that are measured for density are prepared according to ASTM D-1928. Measurements are made within one hour of sample pressing using ASTM D-792, Method B. Melt Indeces are measured according to ASTM D-1238.
Reactivity Ratio Reactivity ratios of catalysts may be obtained by known methods, for example, the technique described in "Linear Method for Determining Monomer Reactivity Ratios in Copolymerication," M. Fineman and S. D. Ross, J. Polymer Science, 5, 259 (1950) or "Copolymerization," F. R. Mayo and C. Walling, Chem. Rev., 46, 191 (1950). One widely used copolymerization model is based on the following equations:

$$M_1^* + M_1 \xrightarrow{K_{11}} M_1^* \quad (1)$$

$$M_1^* + M_2 \xrightarrow{K_{12}} M_2^* \quad (2)$$

wherein $M_1$ refers to a monomer molecule which is arbitrarily designated as "i" wherein i=1, 2; and $M_2^*$ refers to a growing polymer chain to which monomer i has most recently attached.

The K values are the rate constants for the indicated reactions. For example, in ethylene/propylene copolymerization, $K_{11}$ represents the rate at which an ethylene unit inserts into a growing polymer chain in which the previously inserted monomer unit was also ethylene. The reactivity ratios follow as: $r_1=K_{11}/K_{12}$ and $r_2=K_{22}/K_{21}$ wherein $K_{11}$, $K_{12}$ and $K_{21}$ are the rate constants for ethylene (1) or propylene (2) addition to a catalyst site where the last polymerized monomer is an ethylene ($K_{1x}$) or propylene ($K_{2x}$)

$T_C$ and $T_M$ Determination

Differential Scanning calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a $N_2$ purge gas flow of 50 mL/min is used. Each sample is melt pressed into a thin film at about 175° C.; the melted sample is then air-cooled to room temperature (25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 min in order to remove its thermal history. Next, the sample is cooled to −40° C. at a 10° C./minute cooling rate and held isothermal at −40° C. for 3 min. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature ($T_m$), and peak crystallization temperature ($T_c$).

Catalyst Efficiency (Efficiency)

The catalyst efficiency is calculated by dividing the number of grams of the polyolefin copolymer prepared by the total number of grams of metal M of ingredient (a) employed (i.e., metal M of the at least one metal-ligand complex of formula (I)) (i.e., catalyst efficiency=g polyolefin copolymer prepared/g metal M of metal-ligand complex(es) of formula (I) employed).

$M_w$ and MWD Determination

Number and weight-average molecular weights ($M_n$ and $M_w$, respectively) of the polymers were determined by Gel Permeation Chromatography (GPC). The chromatographic system consisted of either a Polymer Laboratories Model PL-210 or a Polymer Laboratories Model PL-220. The column and carousel compartments were operated at 140° C. Three Polymer Laboratories 10-micron Mixed-B columns were used with a solvent of 1,2,4-trichlorobenzene. The samples were prepared at a concentration of 0.1 g of polymer in 50 mL of solvent. The solvent used to prepare the samples contained 200 ppm of butylated hydroxytoluene (BHT). Samples were prepared by agitating lightly for 2 h at 160° C. The injection volume used was 100 µL and the flow rate was 1.0 mL/min. Calibration of the GPC column set was performed with narrow MWD polystyrene standards purchased from Polymer Laboratories. The polystyrene standard peak molecular weights were converted to polyethylene molecular weights using:

$$M_{polyethylene}=A(M_{polystyrene})^B$$

Where M is the molecular weight, A has a value of 0.4316, and B is equal to 1.0. Polyethylene equivalent molecular weight calculations were performed using Viscotek TriSEC software Version 3.0. The molecular weight distribution (MWD) is defined as $M_w/M_n$.

The present invention may be embodied in other forms without departing from the spirit and the essential attributes thereof, and, accordingly, reference should be made to the appended claims, rather than to the foregoing specification, as indicating the scope of the invention.

We claim:

1. A procatalyst for the polymerization of ethylene and optionally one or more alpha olefins having the structure shown in formula (I) below:

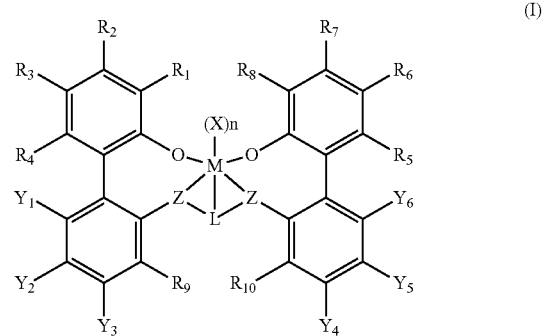

wherein:
M is titanium, zirconium, or hafnium, each independently being in a formal oxidation state of +2, +3, or +4; and n is an integer of from 0 to 3, and wherein when n is 0, X is absent; and each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (I) is, overall, neutral; and each Z independently is O, S, N($C_1$-$C_{40}$)hydrocarbyl, or P($C_1$-$C_{40}$)hydrocarbyl;

L is ($C_2$-$C_{40}$)hydrocarbylene or ($C_2$-$C_{40}$)heterohydrocarbylene, wherein the ($C_2$-$C_{40}$)hydrocarbylene has a portion that comprises a 2-carbon atom to 10-carbon atom linker backbone linking the Z atoms in formula (I) (to which L is bonded) and the ($C_2$-$C_{40}$)heterohydrocarbylene has a portion that comprises a 3-atom to 10-atom linker backbone linking the Z atoms in formula (I), wherein each of the 3 to 10 atoms of the 3-atom to 10-atom linker backbone of the $(C_2-C_{40})$heterohydrocarbylene independently is a carbon atom or heteroatom, wherein each heteroatom independently is O, S, S(O), S(O)$_2$, Si(R$^C$)$_2$, Ge(R$^C$)$_2$, P(R$^P$), or N(R$^N$), wherein independently each R$^C$ is selected from the group consisting of $(C_1-C_{40})$hydrocarbyl, each R$^P$ is $(C_1-C_{40})$hydrocarbyl; and each R$^N$ is $(C_1-C_{40})$hydrocarbyl or absent; and $R_{1-10}$ are each independently selected from the group consisting of a $(C_1-C_{40})$hydrocarbyl, $(C_1-C_{40})$heterohydrocarbyl, Si(R$^C$)$_3$, Ge(R$^C$)$_3$, P(R$^P$)$_2$, N(R$^N$)$_2$, OR$^C$, SR$^C$, NO$_2$, CN, CF$_3$, R$^C$S(O)—, R$^C$S(O)$_2$—, (R$^C$)$_2$C=N—, R$^C$C(O)O—, R$^C$OC(O)—, R$^C$C(O)N(R)—, (R$^C$)$_2$NC(O)—, halogen atom, hydrogen atom, and any combination thereof, $Y_1$ is fluorine or hydrogen atom; $Y_2$ and $Y_3$ are fluorine; $Y_6$ is fluorine or hydrogen atom; $Y_5$ and $Y_4$ are fluorine;

each of the hydrocarbyl, heterohydrocarbyl, Si(R$^C$)$_3$, Ge(R$^C$)$_3$, P(R$^P$)$_2$, N(R$^N$)$_2$, OR$^C$, SR$^C$, R$^C$S(O)—, R$^C$S(O)$_2$—, (R$^C$)$_2$C=N—, R$^C$C(O)O—, R$^C$OC(O)—, R$^C$C(O)N(R)—, (R$^C$)$_2$NC(O)—, hydrocarbylene, and heterohydrocarbylene groups independently is unsubstituted or substituted with one or more R$^S$ substituents, each R$^S$ independently is a halogen atom, polyfluoro substitution, perfluoro substitution, unsubstituted $(C_1-C_{18})$alkyl, F$_3$C—, FCH$_2$O—, F$_2$HCO—, F$_3$CO—, R$_3$Si—, R$_3$Ge—, RO—, RS—, RS(O)—, RS(O)$_2$—, R$_2$P—, R$_2$N—, R$_2$C=N—, NC—, RC(O)O—, ROC(O)—, RC(O)N(R)—, or R$_2$NC(O)—, or two of the R$^S$ are taken together to form an unsubstituted $(C_1-C_{18})$hydrocarbylene wherein each R independently is an unsubstituted $(C_1-C_{18})$hydrocarbyl; and optionally two or more R groups of the $R_{1-10}$ groups can combine together into ring structures with such ring structures having from 2 to 50 atoms in the ring excluding any hydrogen atoms.

2. The procatalyst according to claim 1, having the structure shown below:

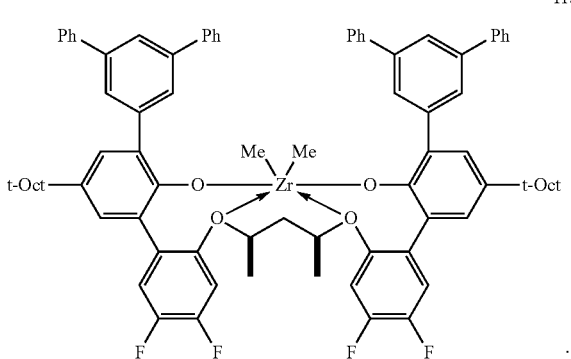

3. The procatalyst according to claim 1, having the structure shown below:

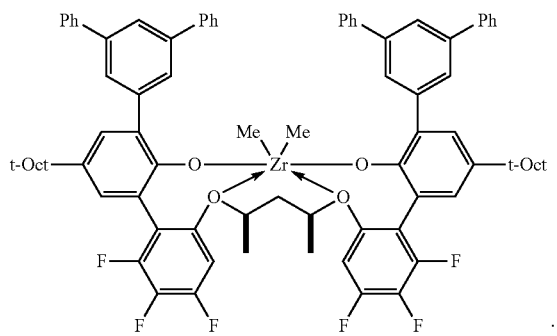

4. The procatalyst according to claim 1, having the structure shown below:

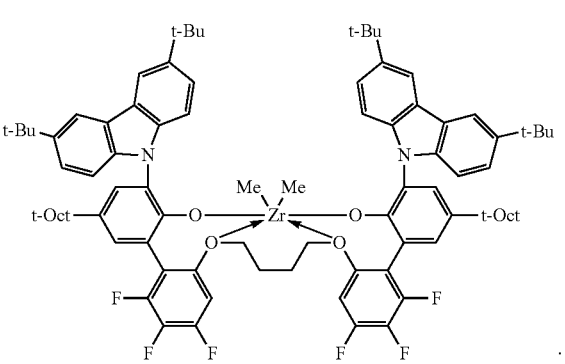

5. The procatalyst according to claim 1, having the structure shown below:

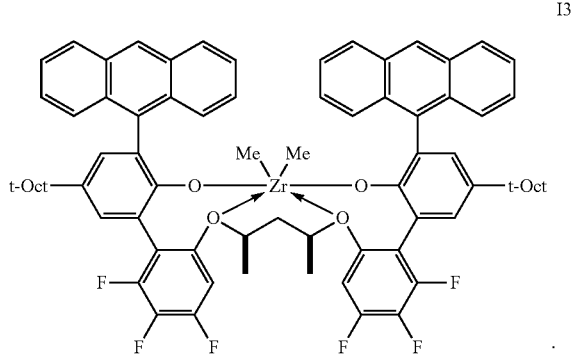

6. The procatalyst according to claim 1, having the structure shown below:

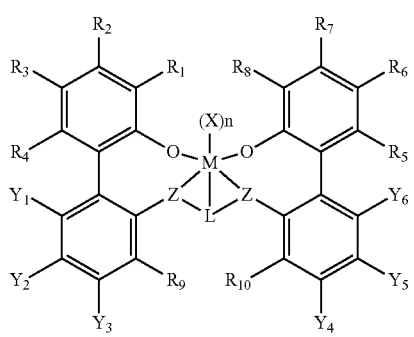

(I)

7. The procatalyst according to claim 1, having the structure shown below:

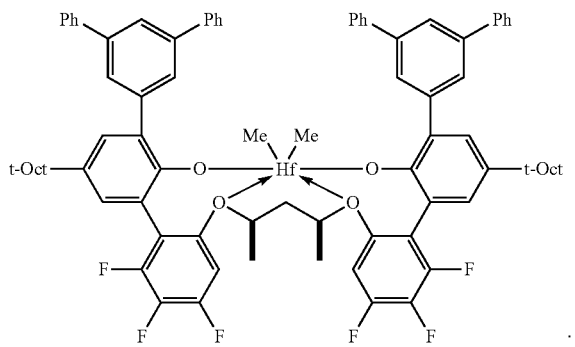

8. The procatalyst according to claim 1, having the structure shown below:

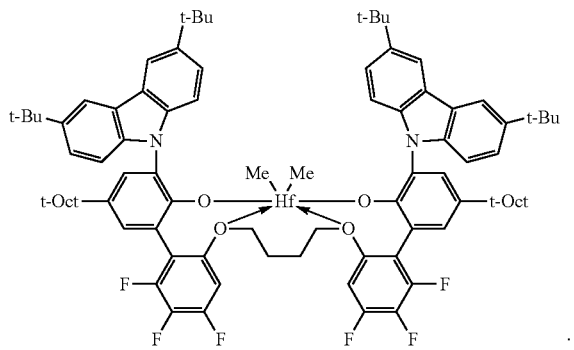

9. A polymerization process for producing ethylene based polymers comprising polymerizing ethylene and optionally one or more α-olefins in the presence of a catalyst systems in a reactor system having one or more reactors, wherein the catalyst system comprises;

(a) one or more procatalysts comprising a metal-ligand complex of formula (I) below:

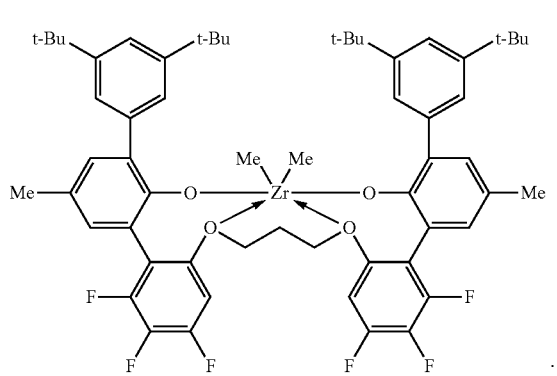

wherein:
M is titanium, zirconium, or hafnium, each independently being in a formal oxidation state of +2, +3, or +4; and n is an integer of from 0 to 3, and wherein when n is 0, X is absent; and each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (I) is, overall, neutral; and each Z independently is O, S, N($C_1$-$C_{40}$)hydrocarbyl, or P($C_1$-$C_{40}$)hydrocarbyl;

L is ($C_2$-$C_{40}$)hydrocarbylene or ($C_2$-$C_{40}$)heterohydrocarbylene, wherein the ($C_2$-$C_{40}$)hydrocarbylene has a portion that comprises a 2-carbon atom to 10-carbon atom linker backbone linking the Z atoms in formula (I) (to which L is bonded) and the ($C_2$-$C_{40}$)heterohydrocarbylene has a portion that comprises a 3-atom to 10-atom linker backbone linking the Z atoms in formula (I), wherein each of the 3 to 10 atoms of the 3-atom to 10-atom linker backbone of the ($C_2$-$C_{40}$)heterohydrocarbylene independently is a carbon atom or heteroatom, wherein each heteroatom independently is O, S, S(O), S(O)$_2$, Si($R^C$)$_2$, Ge($R^C$)$_2$, P($R^P$), or N($R^N$), wherein independently each $R^C$ is selected from the group consisting of ($C_1$-$C_{40}$)hydrocarbyl, each $R^P$ is ($C_1$-$C_{40}$)hydrocarbyl; and each $R^N$ is ($C_1$-$C_{40}$)hydrocarbyl or absent; and $R_{1-10}$ are each independently selected from the group consisting of a ($C_1$-$C_{40}$)hydrocarbyl, ($C_1$-$C_{40}$)heterohydrocarbyl, Si($R^C$)$_3$, Ge($R^C$)$_3$, P($R^P$)$_2$, N($R^N$)$_2$, OR$^C$, SR$^C$, NO$_2$, CN, CF$_3$, R$^C$S(O)—, R$^C$S(O)$_2$—, (R$^C$)$_2$C=N—, R$^C$C(O)O—, R$^C$OC(O)—, R$^C$C(O)N(R)—, (R$^C$)$_2$NC(O)—, halogen atom, hydrogen atom, and any combination thereof, and $Y_1$ is fluorine or hydrogen atom; $Y_2$ and $Y_3$ are fluorine; $Y_6$ is fluorine or hydrogen atom; $Y_5$ and $Y_4$ are fluorine; each of the hydrocarbyl, heterohydrocarbyl, Si($R^C$)$_3$, Ge($R^C$)$_3$, P($R^P$)$_2$, N($R^N$)$_2$, OR$^C$, SR$^C$, R$^C$S(O)—, R$^C$S(O)$_2$—, (R$^C$)$_2$C=N—, R$^C$C(O)O—, R$^C$OC(O)—, R$^C$C(O)N(R)—, (R$^C$)$_2$NC(O), hydrocarbylene, and heterohydrocarbylene groups independently is unsubstituted or substituted with one or more $R^S$ substituents, each $R^S$ independently is a halogen atom, polyfluoro substitution, perfluoro substitution, unsubstituted ($C_1$-$C_{18}$) alkyl, F$_3$C—, FCH$_2$O—, F$_2$HCO—, F$_3$CO—, R$_3$Si—, R$_3$Ge—, RO—, RS—, RS(O)—, RS(O)$_2$—, R$_2$P—, R$_2$N—, R$_2$C=N—, NC—, RC(O)O—, ROC(O)—, RC(O)N(R)—, or R$_2$NC(O)—, or two of the R$^S$ are taken together to form an unsubstituted ($C_1$-$C_{18}$)hydrocarbylene wherein each R independently is an unsubstituted $(C_1-C_{18})$hydrocarbyl; and optionally two or more R groups of the $R_{1-10}$ groups (for example, from $R_{1-4}$, $R_{5-8}$) can combine together into ring structures with such ring structures having from 2 to 50 atoms in the ring excluding any hydrogen atoms.

10. The polymerization process according to claim 9 wherein one or more alpha-olefins are present in the one or more reactors.

11. The polymerization process according to claim 10 wherein the procatalyst exhibits a reactivity ratio of less than or equal to 8.

12. The polymerization process according to claim 10 wherein the procatalyst exhibits a reactivity ratio which is less than a reactivity ratio of a comparative catalysts having an identical structure to the procatalyst except that the comparative catalyst does not include two or more F atoms on each of $Y_1$-$Y_3$ and $Y_4$-$Y_6$.

13. The procatalyst according to claim 1, wherein $Y_1$, $Y_2$, $Y_3$, $Y_4$, $Y_5$, and $Y_6$ are fluorine.

\* \* \* \* \*